(12) United States Patent
Stephenson et al.

(10) Patent No.: US 10,947,051 B2
(45) Date of Patent: Mar. 16, 2021

(54) CONVEYOR SYSTEM ASSEMBLY

(71) Applicant: Stephenson Technologies Inc., Barrie (CA)

(72) Inventors: Robert Roy Stephenson, Barrie (CA); Paul Adams, Barrie (CA); Bartholomew John Boelryk, Barrie (CA)

(73) Assignee: Stephenson Technologies Inc., Barrie (CA)

(*) Notice: Subject to any disclaimer, the term of this patent is extended or adjusted under 35 U.S.C. 154(b) by 387 days.

(21) Appl. No.: 15/878,073

(22) Filed: Jan. 23, 2018

(65) Prior Publication Data
US 2019/0225427 A1  Jul. 25, 2019

(51) Int. Cl.
| | |
|---|---|
| *B65G 23/04* | (2006.01) |
| *B65G 21/00* | (2006.01) |
| *B60S 3/00* | (2006.01) |
| *B65G 45/10* | (2006.01) |
| *B65G 39/10* | (2006.01) |
| *B65G 23/06* | (2006.01) |
| *B65G 45/22* | (2006.01) |
| *B65G 15/62* | (2006.01) |
| *B65G 21/02* | (2006.01) |

(52) U.S. Cl.
CPC ............. *B65G 23/04* (2013.01); *B60S 3/004* (2013.01); *B65G 15/62* (2013.01); *B65G 21/00* (2013.01); *B65G 21/02* (2013.01); *B65G 23/06* (2013.01); *B65G 39/10* (2013.01); *B65G 45/10* (2013.01); *B65G 45/22* (2013.01)

(58) Field of Classification Search
CPC ........ B65G 23/04; B65G 23/06; B65G 21/00; B65G 21/02; B65G 39/10; B65G 45/10; B65G 45/22; B60S 3/004
See application file for complete search history.

(56) References Cited

U.S. PATENT DOCUMENTS 2,446,936 A * 8/1948 Leithmann, Jr. ....... B65G 17/06
  198/841
4,226,325 A   10/1980 Vandas
(Continued)

FOREIGN PATENT DOCUMENTS

CA    2929335 A1   8/2017
FR    2068986 A5   9/1971
(Continued)

OTHER PUBLICATIONS

International Search Report and Written Opinion for PCT/CA2018/051594 dated Apr. 15, 2019.
(Continued)

*Primary Examiner* — Jason C Smith
(74) *Attorney, Agent, or Firm* — Millman IP Inc.

(57) ABSTRACT

In an aspect, a wear plate for use with a conveyor system is provided. The wear plate has a plate mount, having a fastener retainer having a retention hole extending through the wear plate, and a retainer support being defined by at least one cut in the wear plate adjacent to and at least partially defining the fastener retainer, the retainer support connecting the fastener retainer to a main portion of the wear plate and enabling the fastener support to be depressed relative to a top surface of the wear plate.

8 Claims, 54 Drawing Sheets

(56) References Cited

U.S. PATENT DOCUMENTS

| | | | |
|---|---|---|---|
| 5,040,549 A | 8/1991 | Ray | |
| 5,040,670 A * | 8/1991 | Mendoza | B65G 17/08 198/834 |
| 5,111,929 A | 5/1992 | Pierick et al. | |
| 5,779,027 A | 7/1998 | Ensch et al. | |
| 6,270,305 B1 | 8/2001 | Orbeck et al. | |
| 6,360,879 B1 | 3/2002 | Crawford | |
| 6,528,908 B1 * | 3/2003 | Lee | B65G 15/02 198/619 |
| 6,978,880 B2 | 12/2005 | Barrett | |
| D514,755 S | 2/2006 | Essenberg | |
| 7,527,144 B2 | 5/2009 | Ostman | |
| D616,565 S | 5/2010 | Essenberg | |
| 8,413,669 B2 | 4/2013 | Barreyre | |
| 8,662,292 B2 * | 3/2014 | Brackemyer | B65G 41/006 198/841 |
| 9,650,218 B1 * | 5/2017 | Stephenson | B60S 3/004 |
| 9,745,142 B2 * | 8/2017 | Stephenson | B65G 45/22 |
| 2002/0112940 A1 * | 8/2002 | Dickover | B65G 23/06 198/835 |
| 2005/0015986 A1 * | 1/2005 | Stebnicki | B29C 48/18 29/895.32 |
| 2006/0118386 A1 * | 6/2006 | Kim | B65G 23/44 198/459.1 |
| 2006/0191773 A1 * | 8/2006 | Horn | B65G 15/22 198/817 |
| 2007/0068554 A1 | 3/2007 | Essenberg | |
| 2010/0206341 A1 | 8/2010 | Essenburg | |
| 2010/0328399 A1 | 12/2010 | Williams et al. | |
| 2011/0272256 A1 | 11/2011 | Warren, Jr. et al. | |
| 2012/0216835 A1 | 8/2012 | Essenburg | |
| 2013/0200061 A1 | 8/2013 | Barreyre | |
| 2014/0116856 A1 * | 5/2014 | DeGroot | B65G 15/60 198/832.2 |
| 2014/0151197 A1 * | 6/2014 | Lachenmaier | H02K 7/116 198/832 |
| 2015/0075949 A1 * | 3/2015 | Whelan | B65G 23/44 198/813 |
| 2015/0101910 A1 * | 4/2015 | Cribiu | B65G 41/001 198/592 |
| 2015/0232281 A1 * | 8/2015 | Heitplatz | B65G 23/04 198/835 |
| 2018/0168104 A1 * | 6/2018 | Johnson | A01D 61/02 |
| 2019/0225427 A1 * | 7/2019 | Stephenson | B65G 21/02 |
| 2019/0291964 A1 * | 9/2019 | Boelryk | B65G 41/005 |

FOREIGN PATENT DOCUMENTS

| | | |
|---|---|---|
| GB | 1100583 A | 1/1968 |
| GB | 1114418 A | 5/1968 |
| GB | 1185331 A | 3/1970 |
| GB | 1385800 A | 2/1975 |
| GB | 1398266 A | 6/1975 |
| GB | 1432772 A | 4/1976 |
| GB | 8429035 | 12/1984 |
| GB | 2150093 B1 | 11/1986 |

OTHER PUBLICATIONS

Notice of Allowance of U.S. Appl. No. 16/281,653 dated May 6, 2019.

* cited by examiner

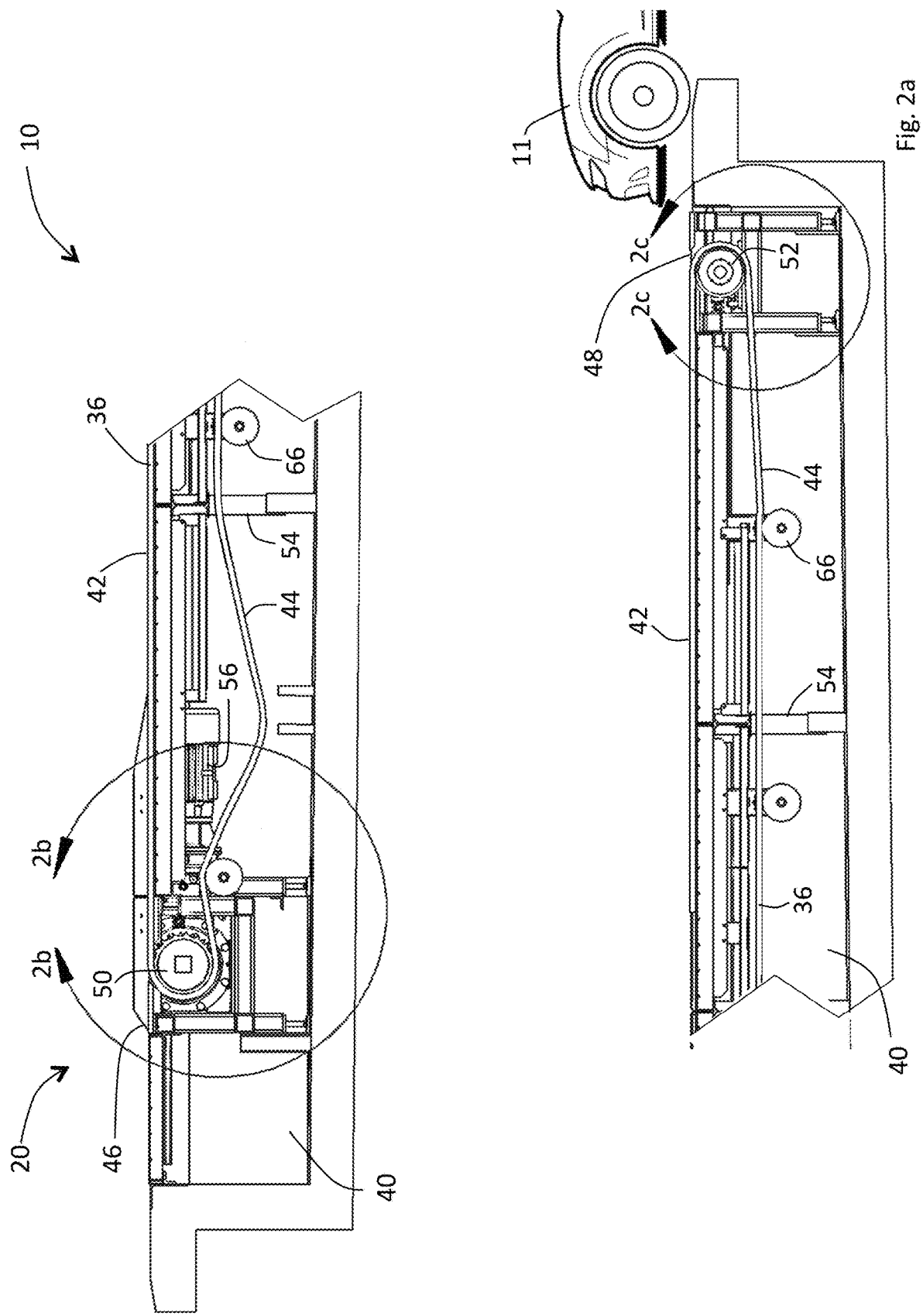

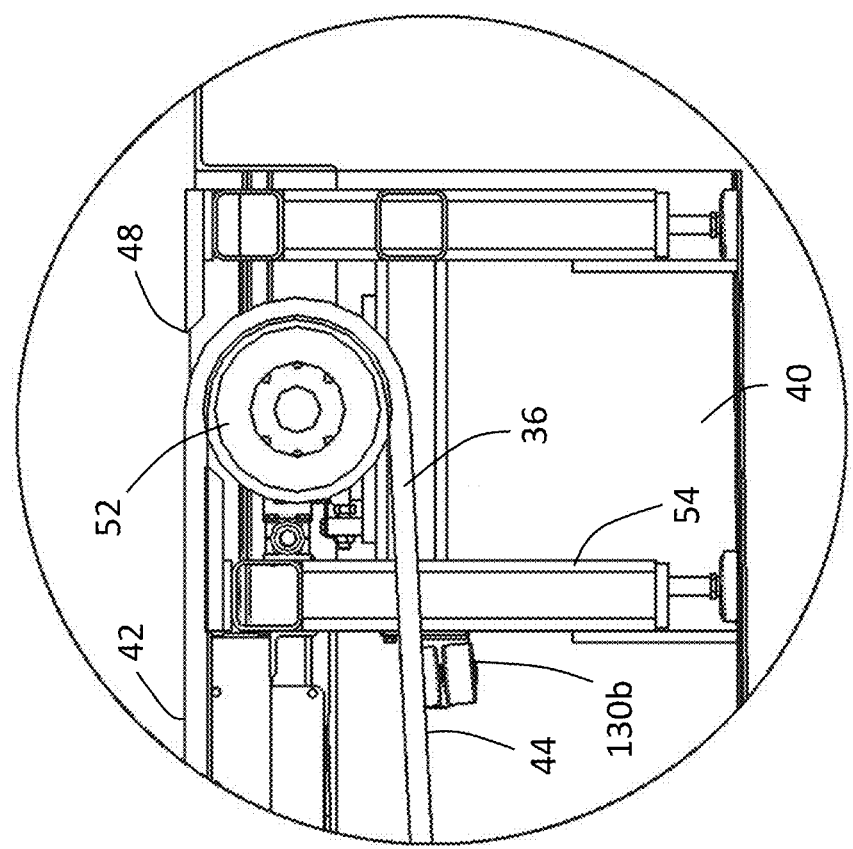

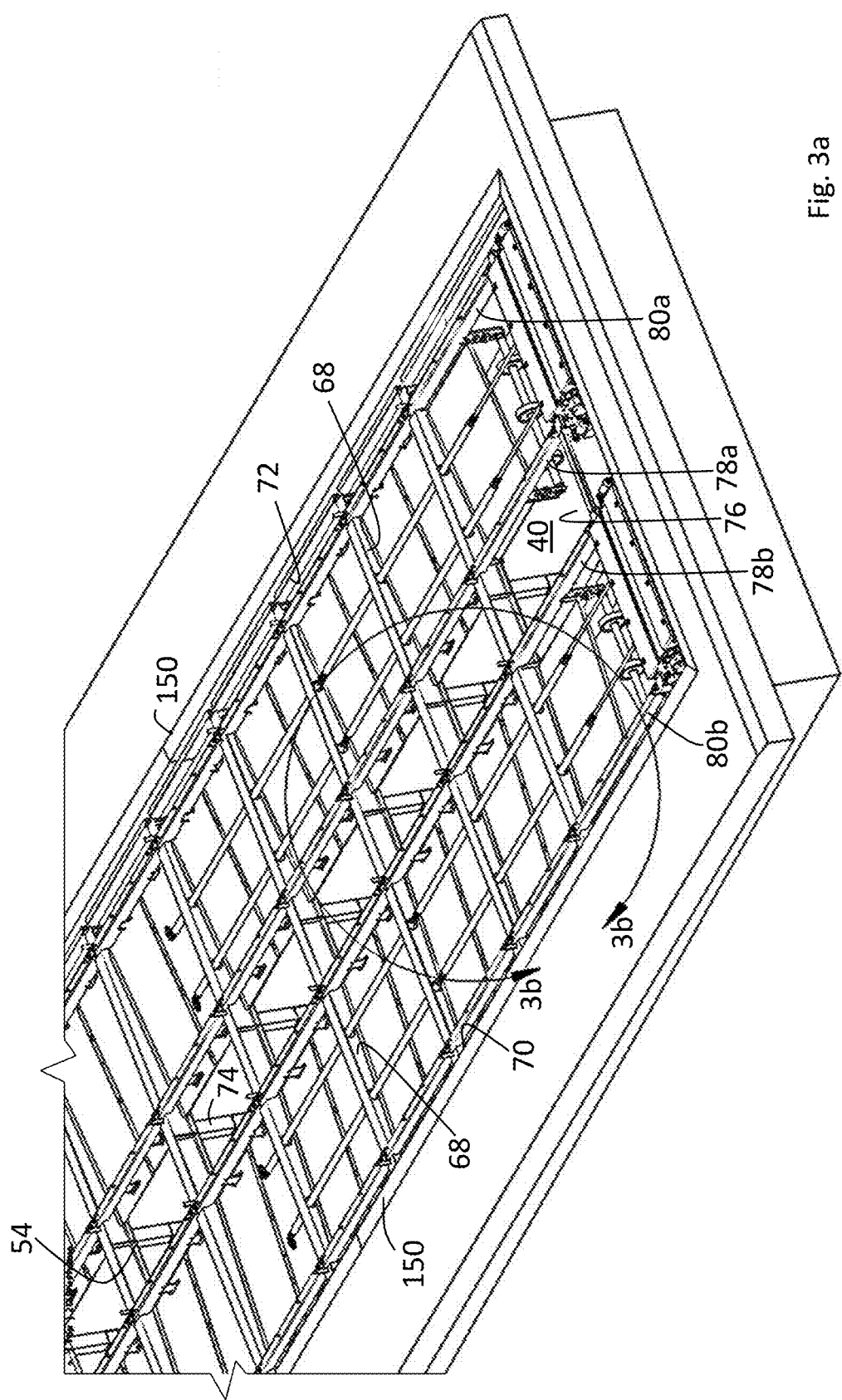

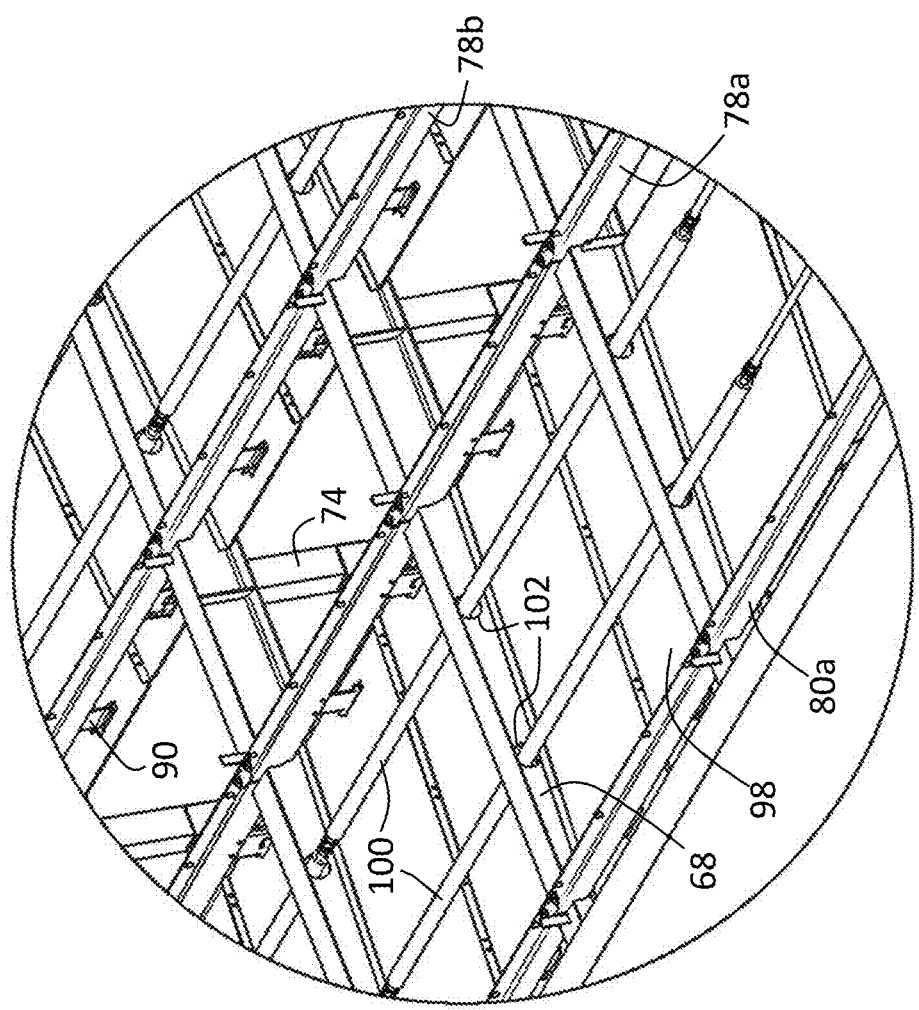

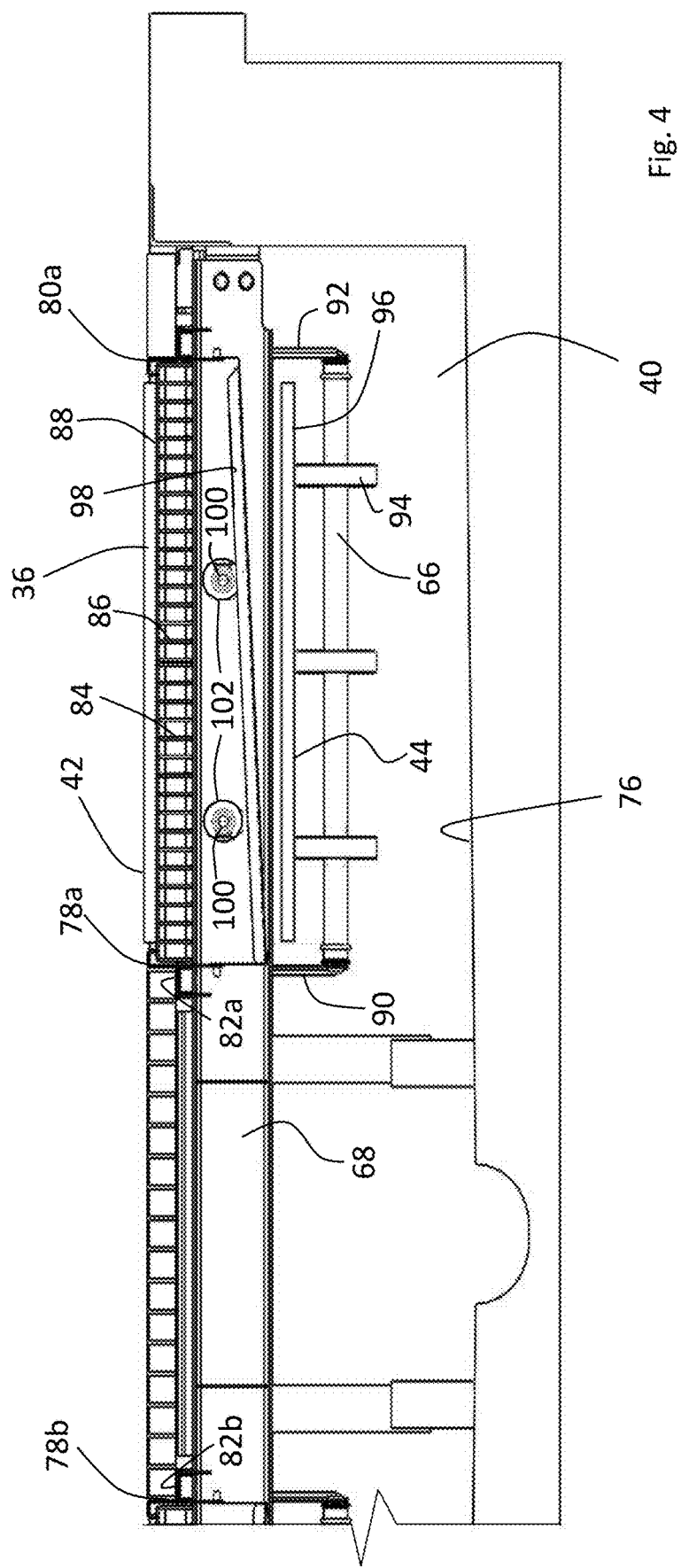

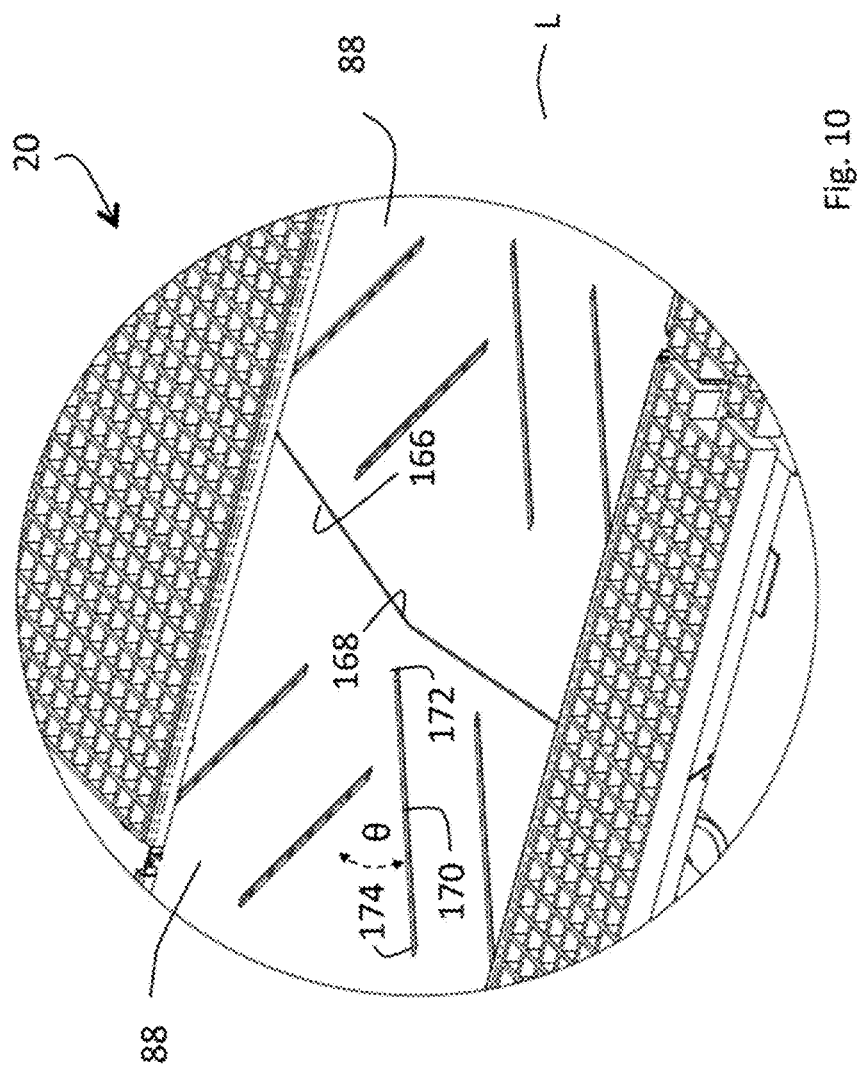

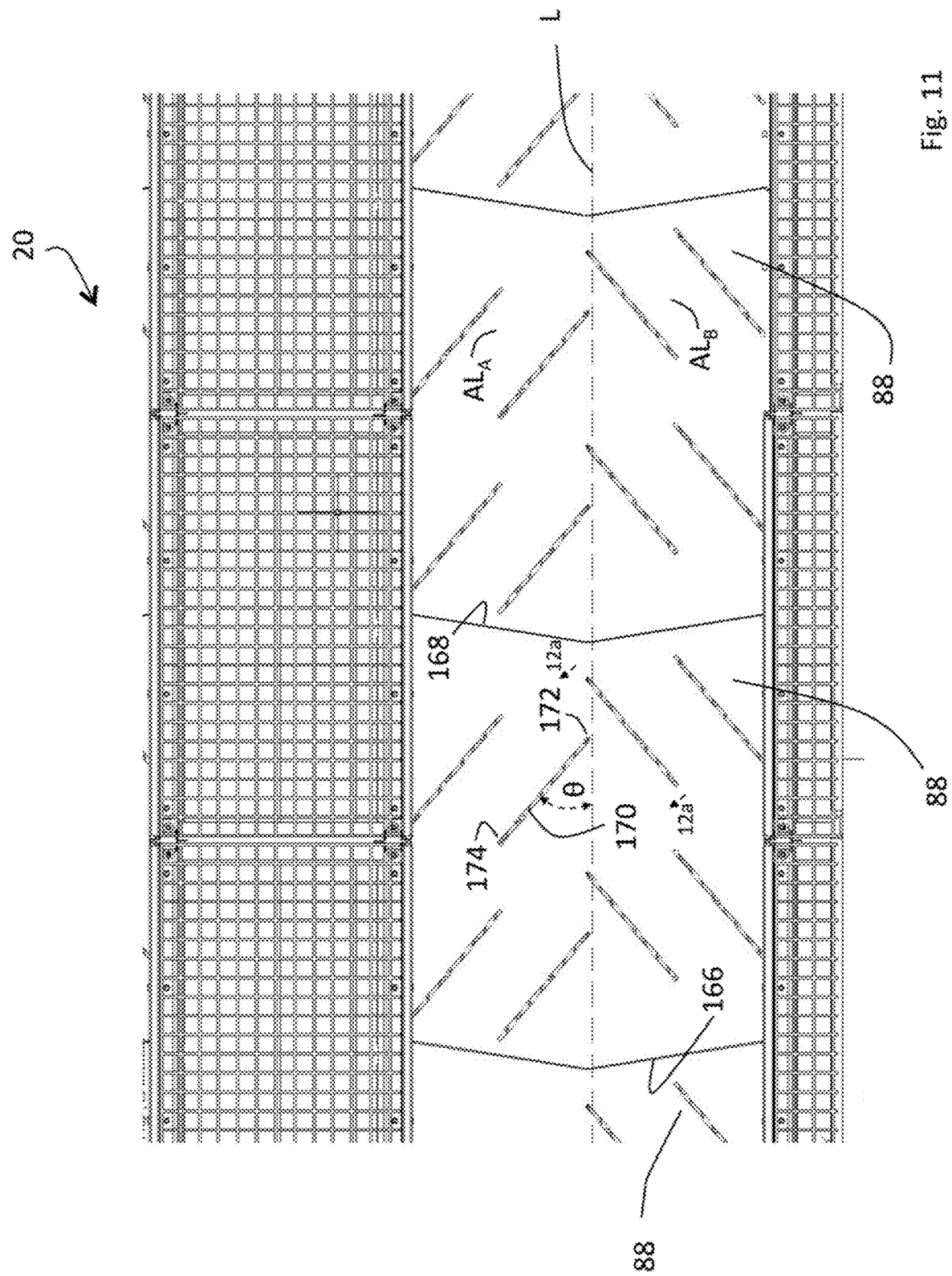

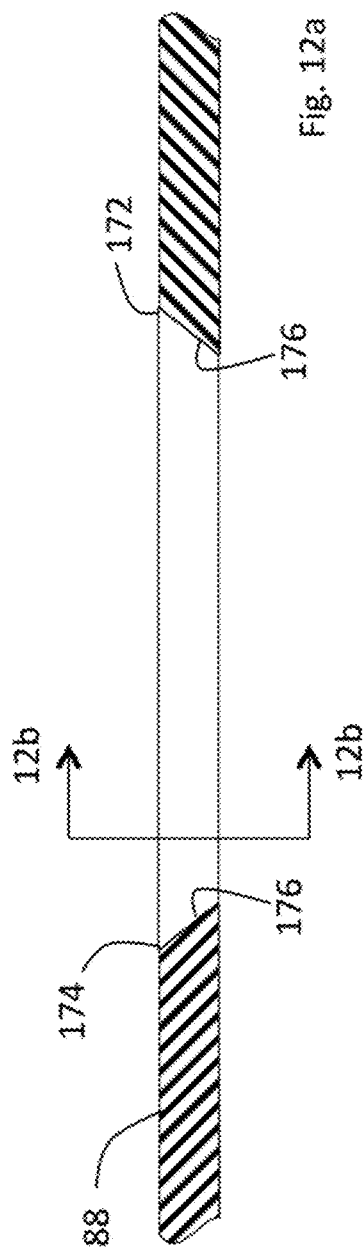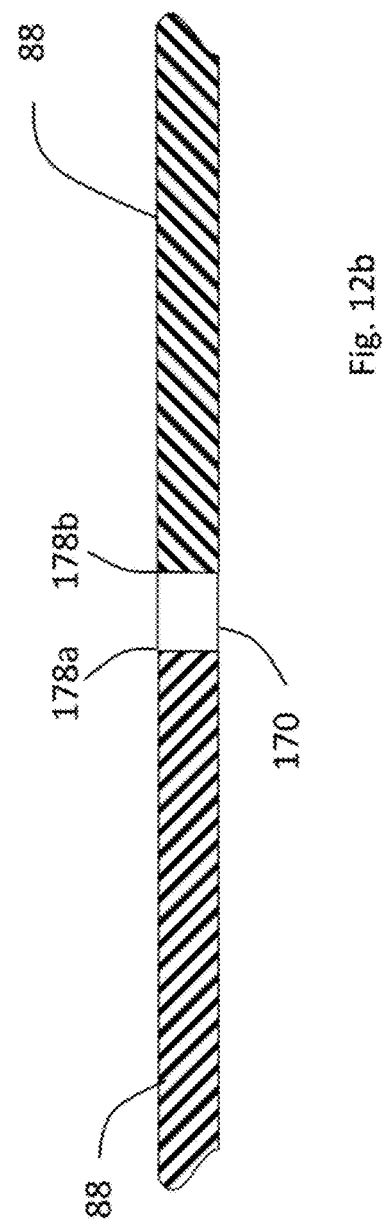

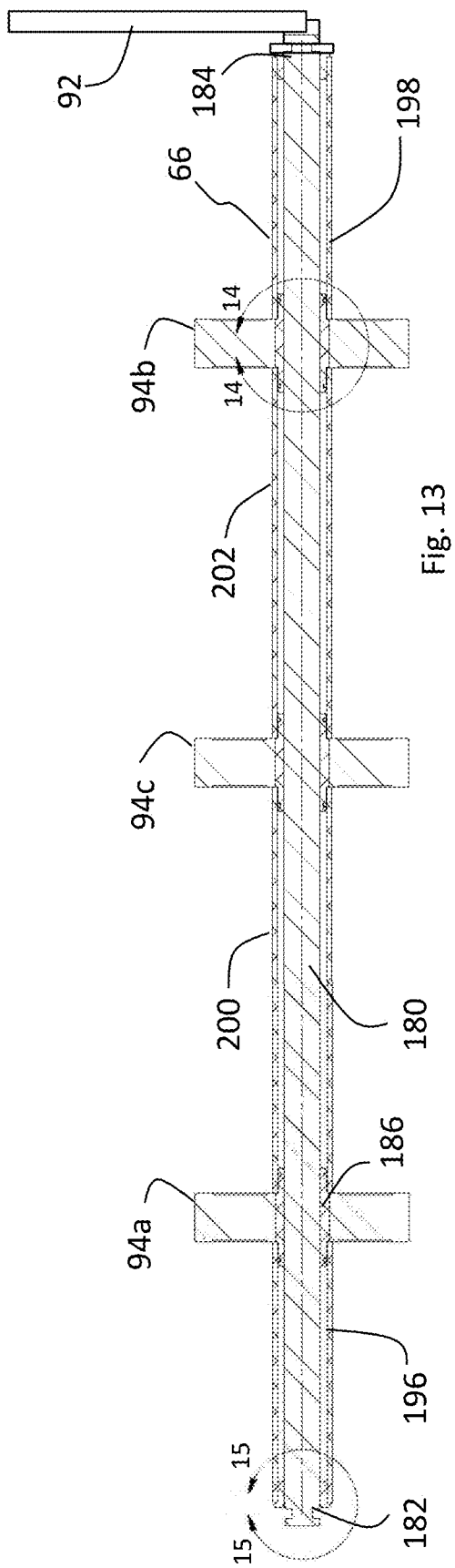
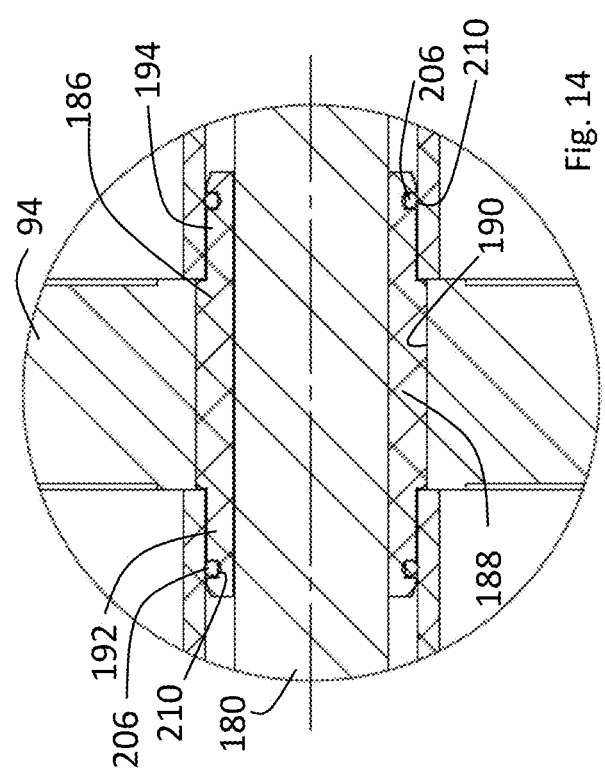
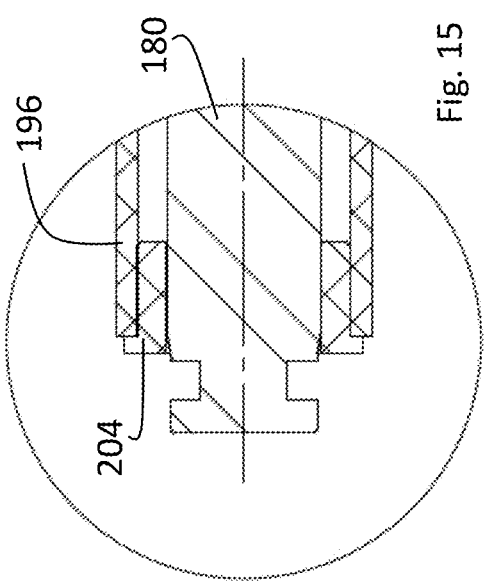

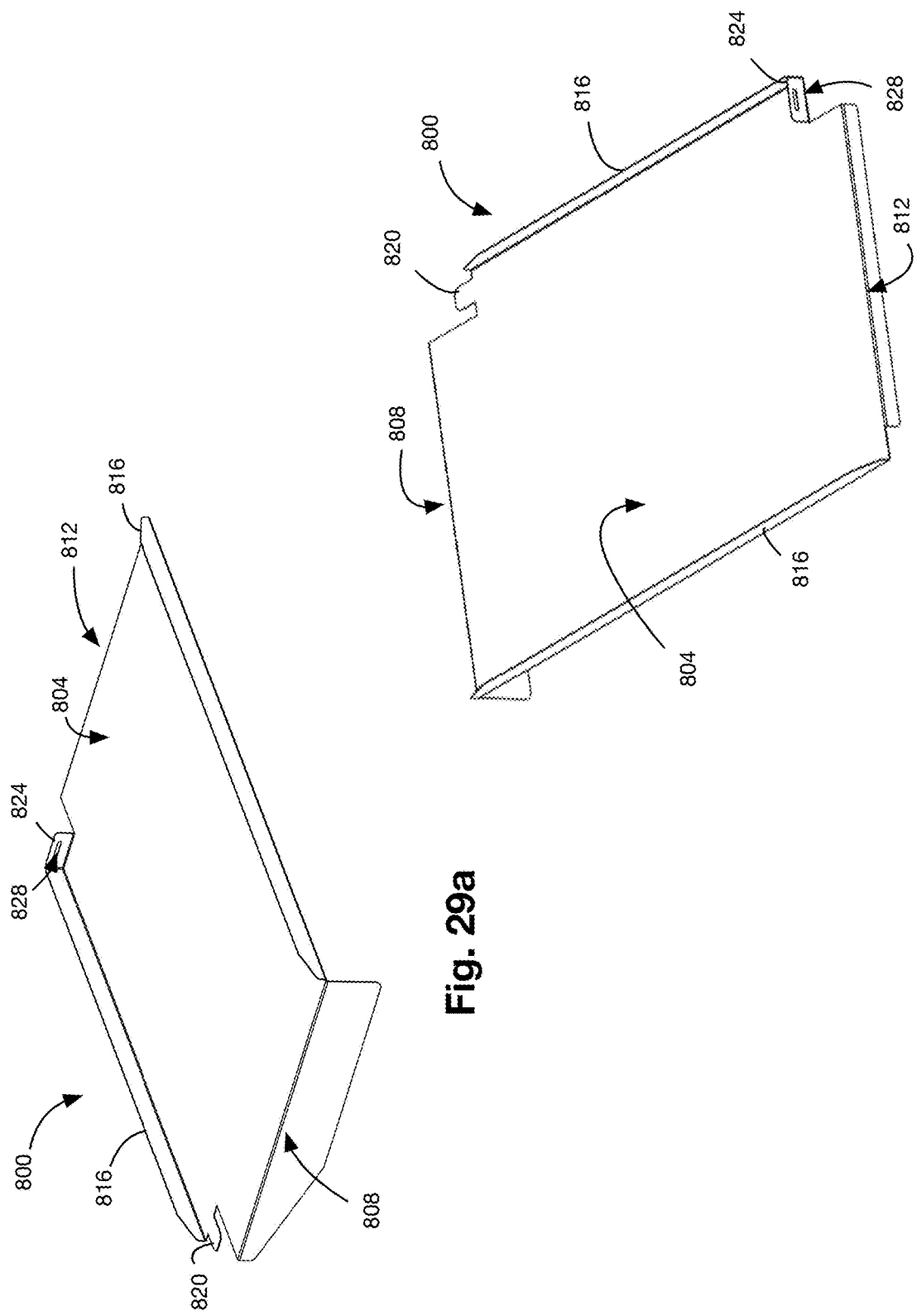

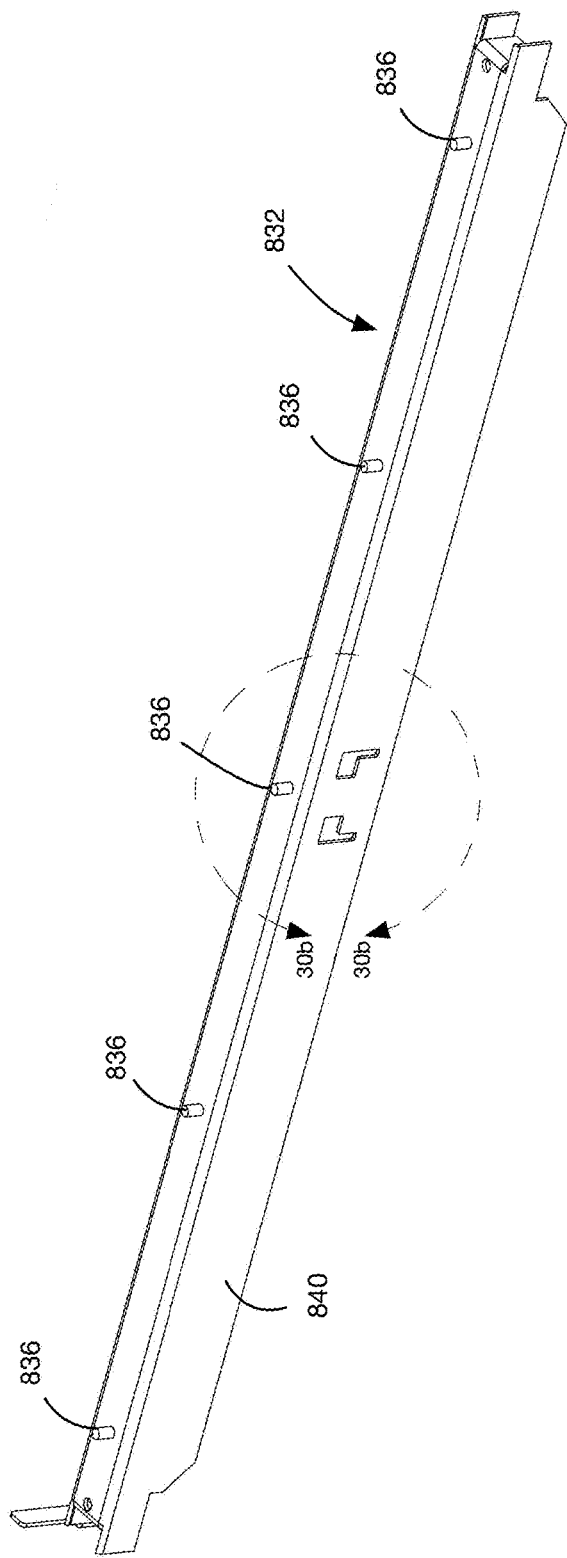
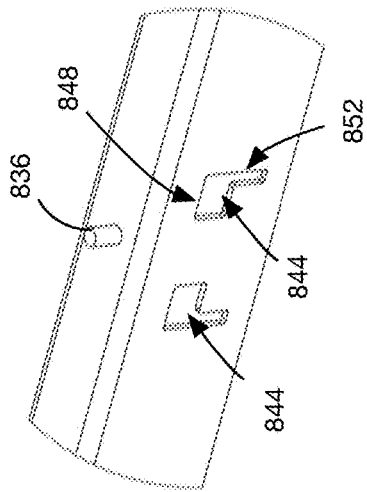
Fig. 30a
Fig. 30b

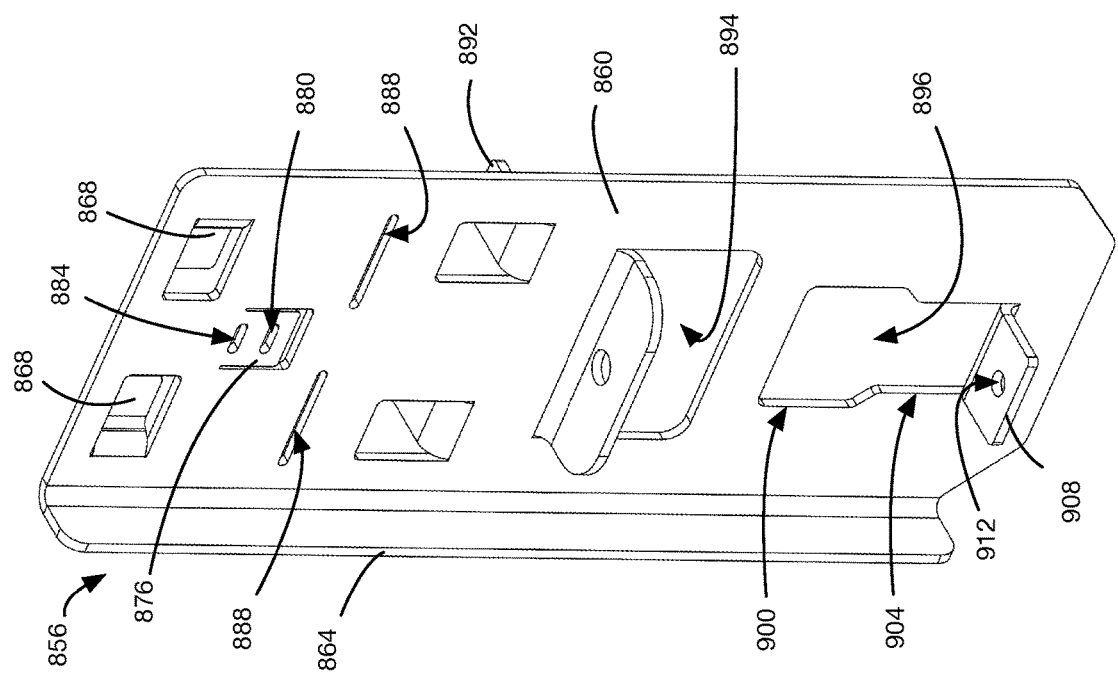
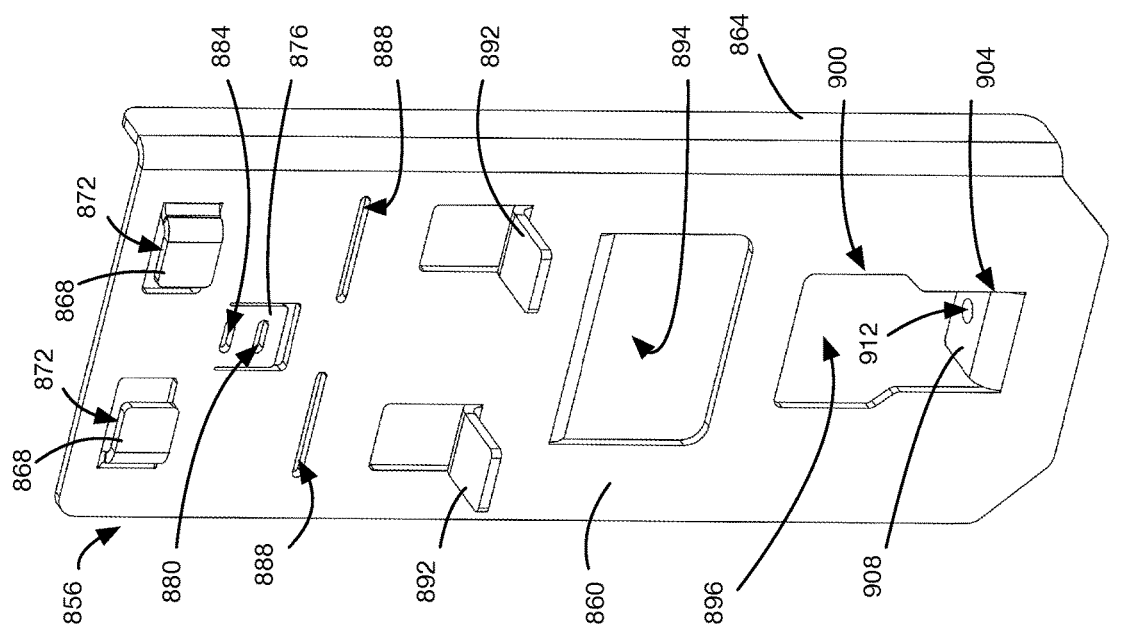

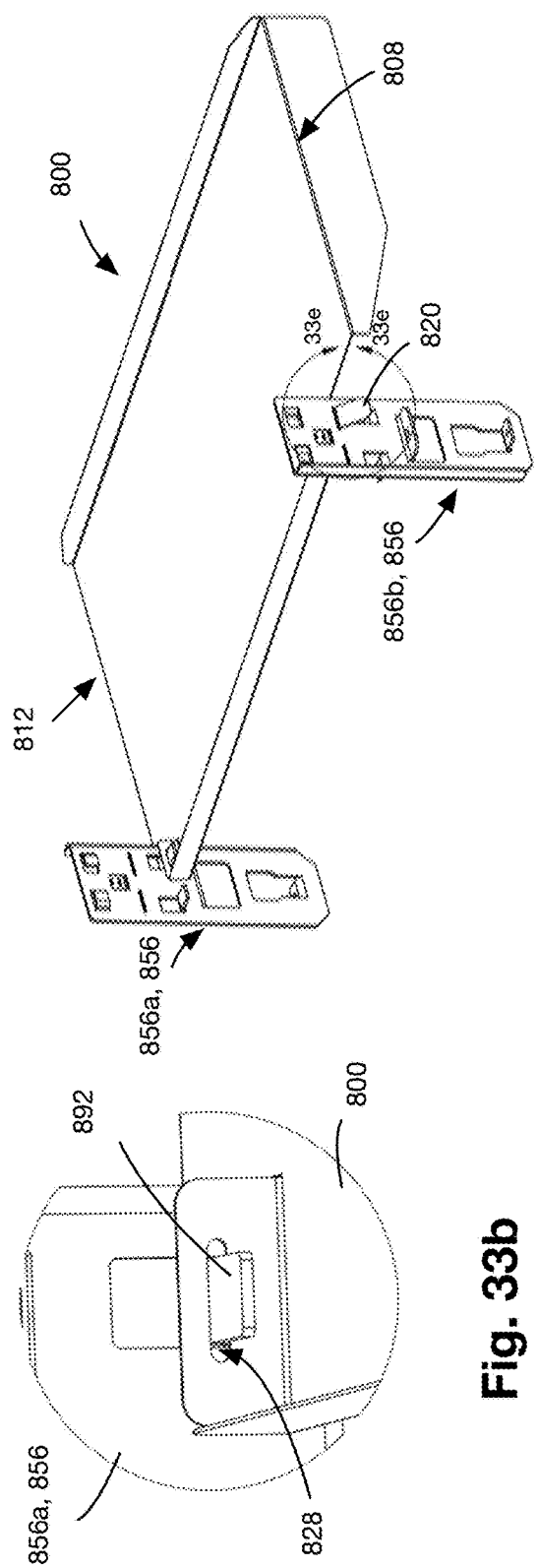
Fig. 33d
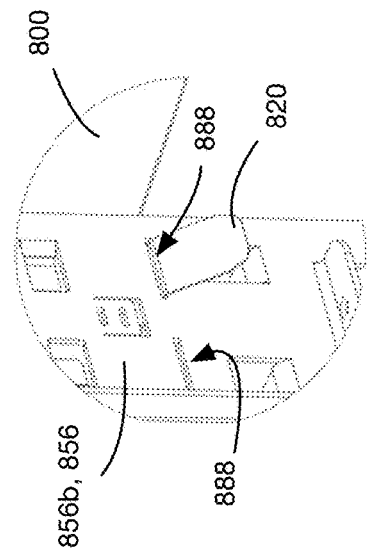
Fig. 33e
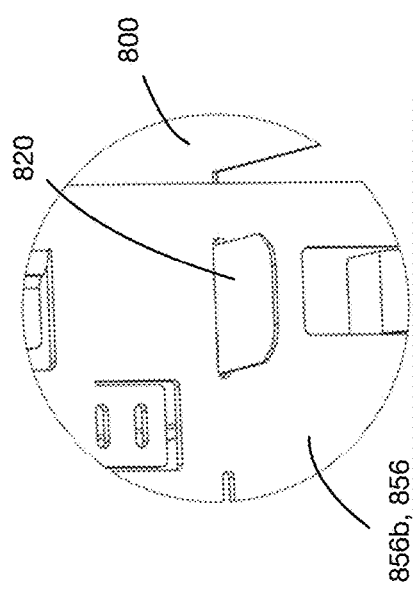
Fig. 33b
Fig. 33c

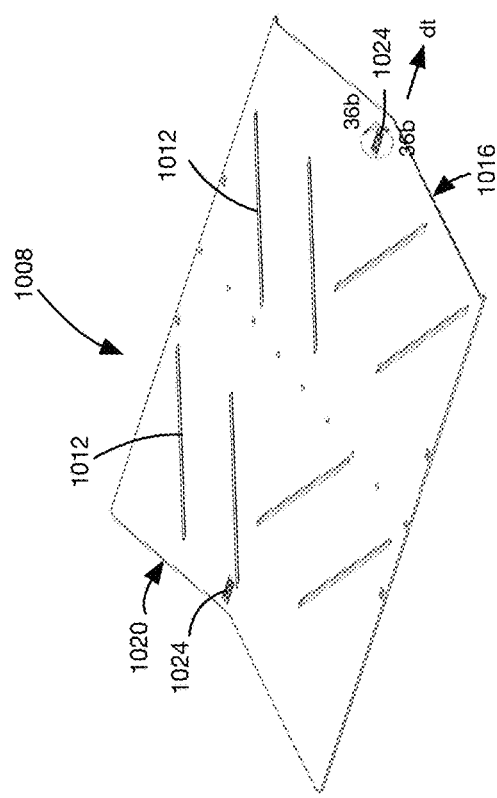
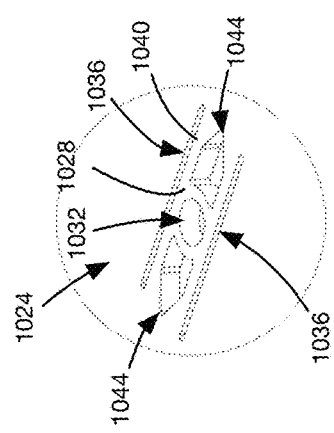
Fig. 37a
Fig. 37b
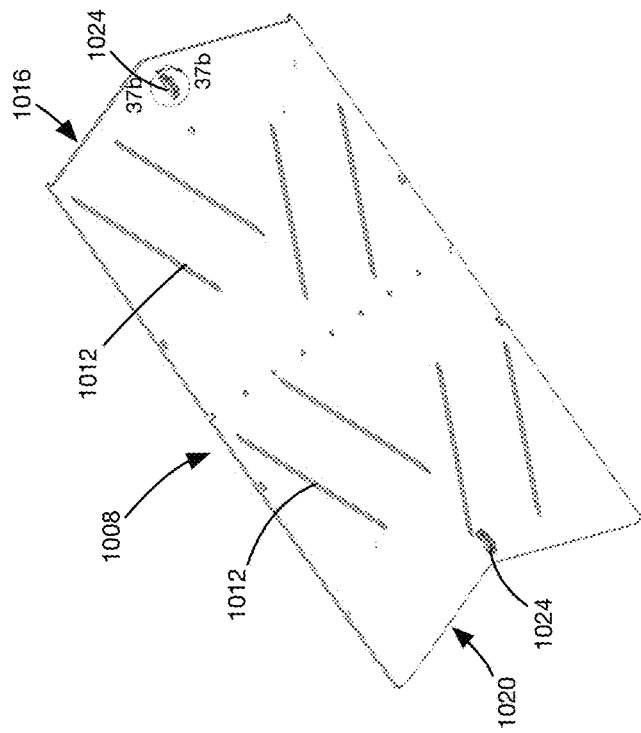
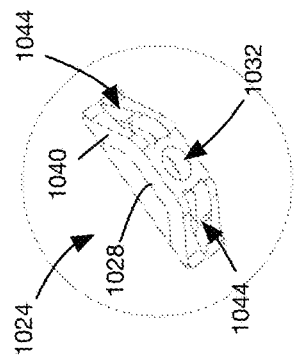
Fig. 38a
Fig. 38b

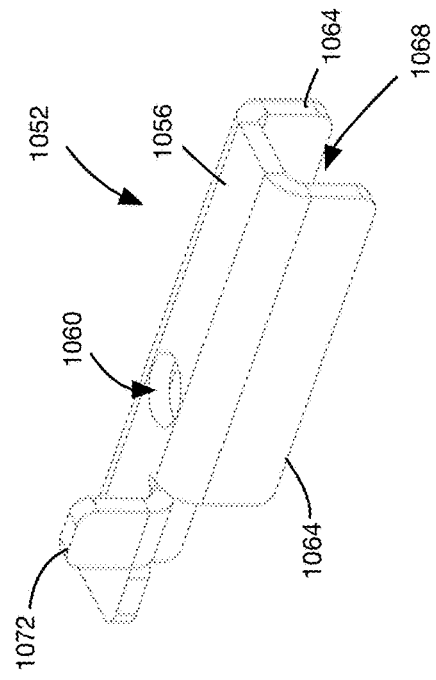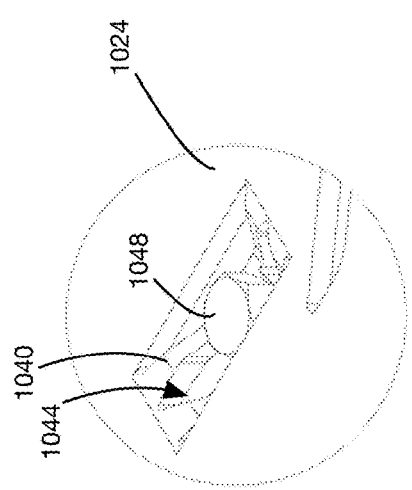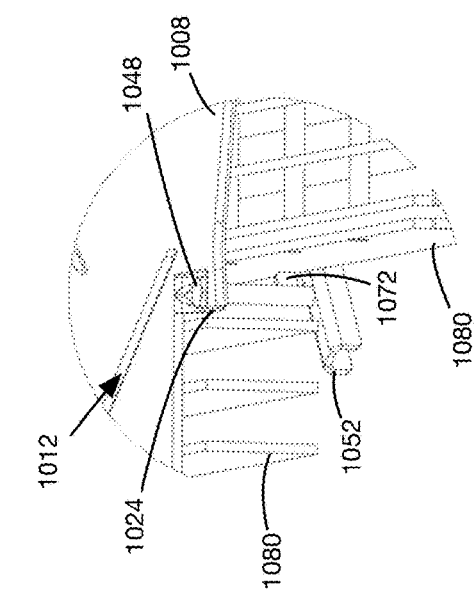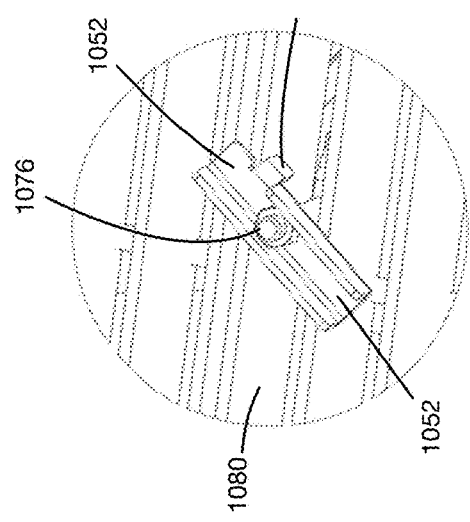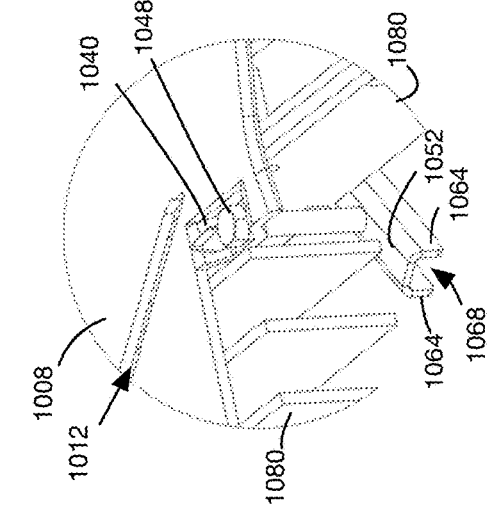

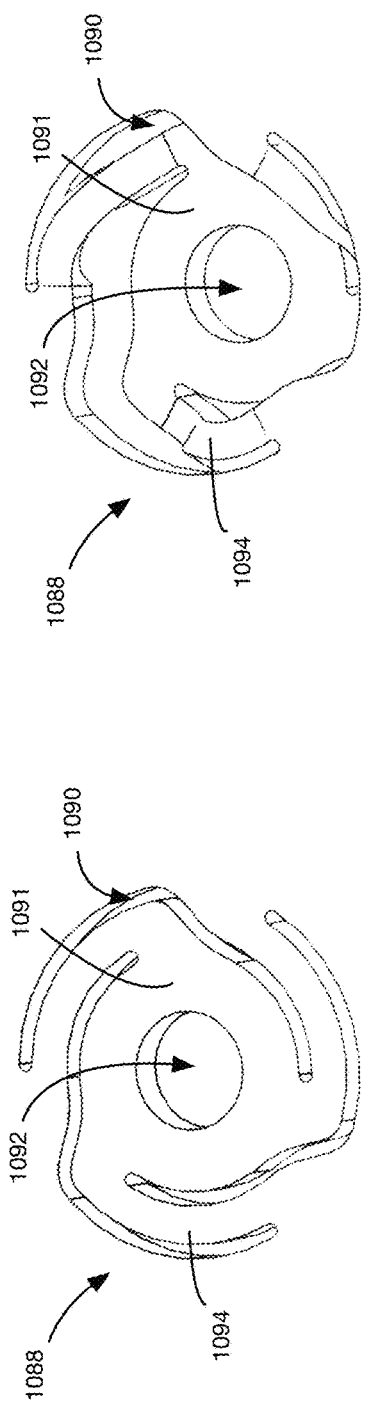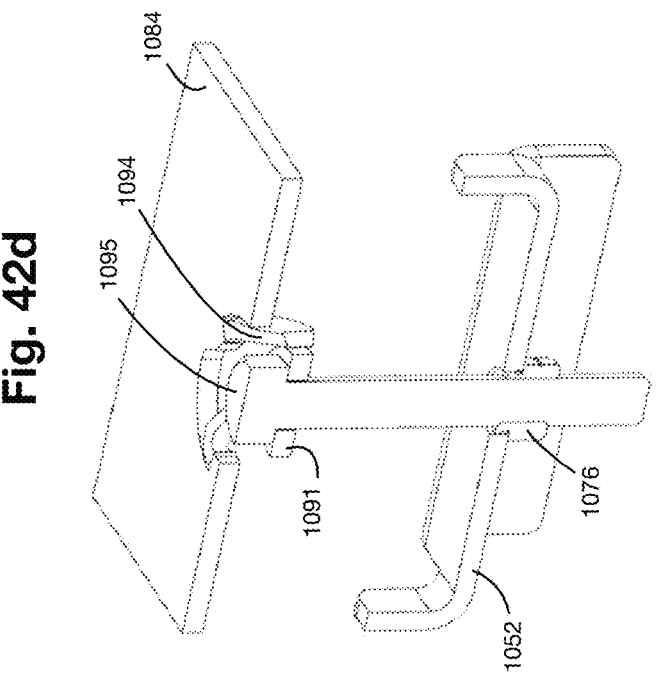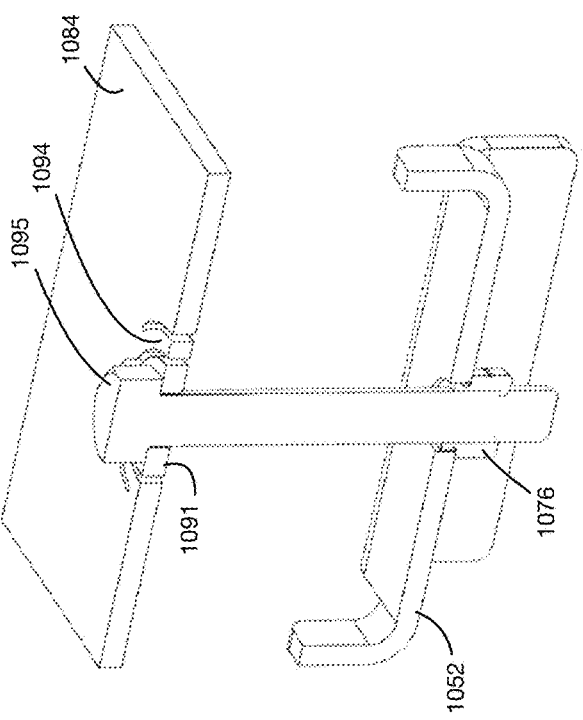

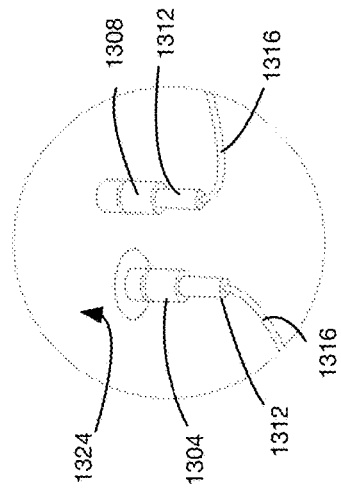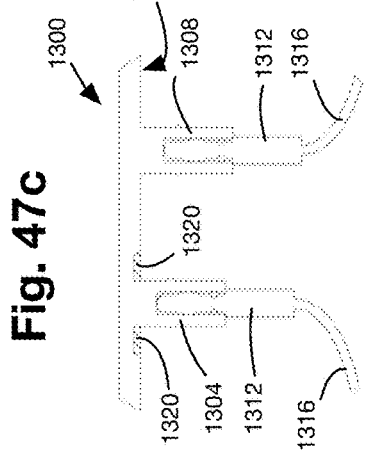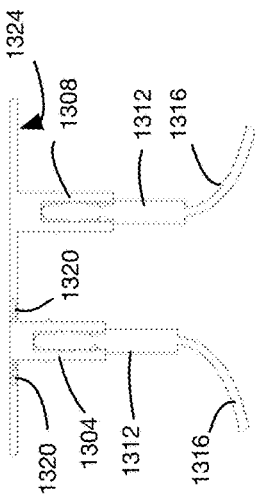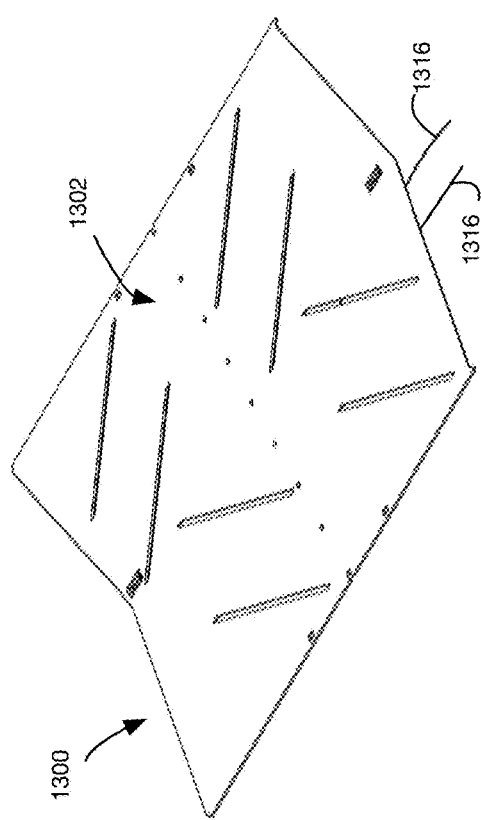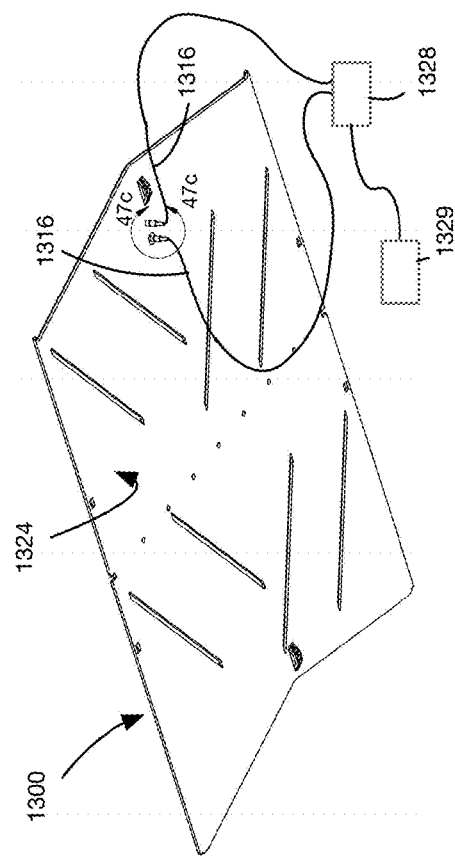

CONVEYOR SYSTEM ASSEMBLY

FIELD

The present disclosure relates to the field of conveyor systems for transporting wheeled structures, and in particular to a conveyor system assembly suitable for use in an automatic vehicle wash station.

BACKGROUND OF THE DISCLOSURE

Conveyor systems have long been used to assist in the transport of materials from one location to another, in particular with respect to heavy and cumbersome items. The use of conveyor systems in assembly lines is well documented, with perhaps Henry Ford being the most famous proponent of the technology of the 20$^{th}$ century.

Conveyors come in a variety of configurations, suiting a wide array of implementations. Belt conveyors in particular have been widely adopted due to their wide versatility and adaptability. For example, belt conveyors are commonly used in the warehousing, manufacturing, and mining sectors. More recently, belt conveyors have found application in the automotive industry, in particular with respect to automated car wash stations.

The installation and maintenance of such conveyor systems is time-consuming and, thus, costly. As such conveyor systems include a large number of parts that are manufactured in one or more locations and assembled on site, it is desirable to facilitate the assembly process. Further, due to the high cost of downtime, it is desirable to prolong the life of the parts and facilitate their replacement prior to a breakdown of the conveyor system.

SUMMARY OF THE DISCLOSURE

According to an aspect, there is provided a wear plate for use with a conveyor system, comprising: a plate mount, having a fastener retainer having a retention hole extending through the wear plate; and a retainer support being defined by at least one cut in the wear plate adjacent to and at least partially defining the fastener retainer, the retainer support connecting the fastener retainer to a main portion of the wear plate and enabling the fastener support to be depressed relative to a top surface of the wear plate.

The fastener retainer can be depressed via machine prior to installation of the wear plate.

The fastener retainer can be depressable during tightening of a fastener inserted into the retention hole and engaging a nut. The at least one cut can extend circumvolutely from the fastener retainer.

According to another aspect, there is provided a wear plate structure for use with a conveyor system, comprising: a wear plate, at least a part of which is constructed from a first material having a first electrical conductivity, wherein the wear plate has a wear surface that is positioned to incur wear and an undersurface opposite the wear surface; and a first electrical conduit and a second electrical conduit which extend from the wear plate, wherein, when the first and second electrical conduits are connected to a voltage source, a first current flows between the first electrical conduit and the second electrical conduit through the first material when the wear plate is in a first wear condition, and current flow is reduced from the first current flow between the first electrical conduit and the second electrical conduit through the first material when the wear plate is in a second wear condition.

The current flow can be reduced to zero between the first electrical conduit and the second electrical conduit when the wear plate is in the second wear condition. The wear plate can have a gap in the first material of the wear plate so that the first electrical conduit and the second electrical conduit are unconnected by the first material when the wear plate is in the second wear condition. A second material can at least partially fill the gap in the first material, the second material having a second electrical conductivity that is lower than the first electrical conductivity.

According to a further aspect, there is provided a drive coupler, comprising: a first connector coupleable to a first drive member for torque transfer therebetween, the first drive member rotating about a first axis, the first connector having a first connector face; a spherical bearing positioned in the first connector for receiving a second drive member that is rotatable about a second axis, the spherical bearing being positioned at the intersection of the first and second axes; a second connector having a second connector face, and being rotationally coupleable to the first connector for torque transfer therebetween, wherein the second connector is coupleable to the second drive member for torque transfer therebetween; and a compressible spacer positioned between the first connector face and the second connector face, thereby permitting the first and second connector faces to be non-parallel to one another.

The first drive member can be connected to a source of torque and the second drive member can be connected to a load.

An end portion of the second drive member can have a non-circular cross-sectional shape, and a plurality of circumferentially extending slots thereon, the drive coupler can further comprise a locking flange that has a pass-through aperture having a profile that permits the locking flange to be slidable axially along the end portion of the second drive member when the locking flange is in a first rotational position about the second axis, and can be rotatable from the first rotational position to a second rotational position about the second axis to engage the plurality of circumferentially extending slots thereby axially locking the locking flange with the second drive member, wherein the locking flange is connectable to the second connector.

According to yet another aspect, there is provided a return roller assembly for use with a conveyor system, comprising: a shaft defining an axis and having a first shaft end and a second shaft end; a bearing member rotatably mounted on the shaft, and having a central bearing member portion upon which is mounted a roller wheel for rotatably supporting a lower return portion of a conveyor belt, a first lateral bearing member portion extending axially from the central bearing member portion towards the first shaft end, and a second lateral bearing member portion extending axially from the central bearing member portion towards the second shaft end; a first bearing member sleeve structure extending from the bearing member towards the first shaft end, wherein the first bearing member sleeve structure is sealingly mounted to the first lateral bearing member portion, wherein the first sleeve has a shaft engagement surface that is rotatably engaged with the shaft; a second bearing member sleeve structure extending from the bearing member towards the second shaft end, wherein the second bearing member sleeve structure is sealingly mounted to the second lateral bearing member portion; and a first shaft sleeve structure fixedly and sealingly mounted to the shaft laterally outboard towards the first shaft end relative to the shaft engagement surface of the first bearing member sleeve structure, wherein the first bearing member sleeve structure has a first rotation interface sealing surface and the first shaft sleeve structure has a second rotation interface sealing surface, wherein the first and second rotation interface sealing surfaces extend radially and circumferentially and engage one another to seal against migration of contaminants therebetween, and wherein the shaft sleeve structure urges the first and second rotation interface sealing surfaces into engagement with one another.

The first bearing member sleeve structure can be mounted to the first lateral bearing member portion with a first bearing member sleeve structure sealing member therebetween so as to provide sealing engagement therebetween, and the first shaft sleeve structure can be sealingly mounted to the shaft with a first shaft sleeve structure sealing member therebetween so as to provide sealing engagement therebetween.

The first shaft sleeve structure can be fixedly mounted to the shaft via a first shaft sleeve mounting pin that passes through the first shaft sleeve and the shaft.

The bearing member and the roller wheel can be a first bearing member and a first roller wheel respectively, and the return roller assembly can further include a second bearing member rotatably mounted on the shaft, closer to the second shaft end than is the first bearing member, and having a central bearing member portion upon which is mounted a second roller wheel for rotatably supporting the conveyor belt, a first lateral bearing member portion extending axially from the central bearing member portion towards the second shaft end, and a second lateral bearing member portion extending axially from the central bearing member portion towards the first shaft end, wherein the return roller assembly further includes a first bearing member sleeve structure for the second bearing member, extending from the second bearing member towards the second end, and sealingly mounted to the first lateral bearing member portion of the second bearing member, and having a shaft engagement surface that is rotatably engaged with the shaft, and wherein the return roller assembly further includes a second bearing member sleeve structure for the second bearing member, extending from the second bearing member towards the first shaft end, wherein the second bearing member sleeve structure for the second bearing member is sealingly mounted to the second lateral bearing member portion of the second bearing member, and wherein the return roller assembly further includes a second shaft sleeve structure fixedly and sealingly mounted to the shaft laterally outboard towards the second shaft end relative to the shaft engagement surface of the first bearing member sleeve structure of the second bearing member, and wherein the first bearing member sleeve structure for the second bearing member has a first rotation interface sealing surface and the second shaft sleeve structure has a second rotation interface sealing surface, wherein the first and second rotation interface sealing surfaces on the first bearing member sleeve structure for the second bearing member and the second shaft sleeve structure extend radially and circumferentially and engage one another to seal against migration of contaminants therebetween, and wherein the second shaft sleeve structure urges the first and second rotation interface sealing surfaces into engagement with one another.

The first bearing member sleeve structure can include a laterally outer portion and a laterally inner portion, wherein the laterally outer portion has a greater inner diameter than does the laterally inner portion and overlaps axially with the first shaft sleeve structure and is spaced radially from the first shaft sleeve structure.

According to still yet another aspect, there is provided a debris deflector kit for use with a conveyor system, comprising: a debris deflector configured to deflect debris that is falling from a conveyor belt towards an elimination end thereof, the debris deflector being coupleable towards a first end thereof to a first lateral frame portion; and a first mounting bracket engaging the debris deflector towards a second end thereof opposite the first end of the debris deflector via a first projection of one of the debris deflector and the first mounting bracket that is insertable through a first aperture in another of the debris deflector and the first mounting bracket, the first mounting bracket being coupleable to a second lateral frame portion spaced from the first lateral frame portion.

The debris deflector can be securable to the first mounting bracket via bending of the projection extending out of the aperture.

The debris deflector can be coupleable to the first lateral frame portion via a second mounting bracket engaging the debris deflector at the first end thereof via a second projection of one of the debris deflector and the second mounting bracket that is insertable through a second aperture in another of the debris deflector and the second mounting bracket, the second mounting bracket being coupleable to the first lateral frame portion. The first mounting bracket and the second mounting bracket can each have one of the first projection and the first aperture at a first position thereon and one of the second projection and the second aperture at a second position thereon. The first projection and the second projection can be tabs and the first aperture and the second aperture can be slots.

The first mounting bracket and the second lateral frame portion can have features enabling the first mounting bracket to slidingly engage the second lateral frame portion.

According to another aspect, there is provided a return roller kit for use with a conveyor system, comprising: a return roller assembly having a rotation axis about which rotates at least one roller wheel for supporting a conveyor belt along a return path, the return roller assembly having a first orientation retention feature in a first end thereof.

The first orientation retention feature can include a projection extending orthogonal to the rotation axis. The projection can be a first pin inserted through through-holes in the first end of the return roller assembly.

The return roller kit can further include a first mounting bracket having a first aperture and a first ledge adjacent to the first aperture for supporting the first end of the return roller assembly.

The first orientation retention feature can include a first pin inserted through through-holes in the first end of the return roller assembly, the return roller kit can further include a first mounting bracket having a first aperture and a first ledge adjacent to the first aperture for supporting the first end of the return roller assembly, the first ledge having a first pin-hole for receiving the first pin of the return roller assembly.

The return roller assembly can have a second orientation retention feature in the second end thereof.

The return roller assembly can have a second irregularity in the second end thereof.

The return roller assembly can have a second pin inserted through through-holes in the second end of the return roller assembly.

The return roller assembly can have a second pin inserted through through-holes in a second end of the return roller assembly, and the return roller kit can further include a second mounting bracket having a second aperture and a second ledge adjacent to the second aperture for supporting the second end of the return roller assembly, the second ledge having a second pin-hole for receiving the second pin of the return roller assembly.

According to still yet another aspect, there is provided a drive coupler assembly, comprising: a first drive member that is supported for rotation about a first axis by at least a first bearing and a second bearing for the first drive member; a second drive member that has a first end that is proximal to the first drive member and a second end that is distal to the first drive member, wherein the second end is supported by a first bearing for the second drive member; a first connector coupled to the first drive member for transfer of torque therebetween, the first connector having a first connector face; a spherical bearing positioned in the first connector for receiving the first end of the second drive member for rotation of the second drive member about a second axis, the spherical bearing being positioned at the intersection of the first and second axes; a second connector having a second connector face, and being rotationally coupleable to the first connector for transmission of torque therebetween, wherein the second connector is coupleable to the second drive member for transfer of torque therebetween; and a compressible spacer positioned between the first connector face and the second connector face, thereby permitting the first and second connector faces to be non-parallel to one another.

BRIEF DESCRIPTION OF THE DRAWINGS

The foregoing and other features and advantages of the disclosure will be apparent from the following description of embodiments hereof as illustrated in the accompanying drawing. The accompanying drawings, which are incorporated herein and form a part of the specification, further serve to explain the principles of the disclosure and to enable a person skilled in the pertinent art to make and use the disclosure. The drawings are not to scale.

FIG. 2a is a partial side sectional view of the conveyor system according to the embodiment of FIG. 1;

FIG. 2b is a partial side sectional view of the conveyor system with reference to line 2b-2b of FIG. 2a;

FIG. 2c is a partial side sectional view of the conveyor system with reference to line 2c-2c of FIG. 2a;

FIG. 3a is a partial isometric view of the conveyor system according to the embodiment of FIG. 1, highlighting features of the conveyor frame;

FIG. 3b is a partial isometric view of the conveyor system with reference to line 3b-3b of FIG. 3a;

FIG. 4 is a partial transverse sectional view of the conveyor system according to FIG. 1, highlighting features in the region of the endless belt;

FIG. 10 is a partial isometric view of the conveyor system according to FIG. 1, detailing features of the wear plates;

FIG. 11 is a partial plan view of the conveyor system according to FIG. 1, detailing features of the wear plates;

FIG. 12a is a sectional view of one of the wear plates with reference to line 12a-12a of FIG. 11, showing features of the debris slot;

FIG. 12b is a sectional view of one of the wear plates with reference to line 12b-12b of FIG. 12a, showing features of the debris slot;

FIG. 13 is an enlarged sectional view of the guide member;

FIG. 14 is a partial sectional view of the guide member with reference to line 15-15 of FIG. 13, detailing features of the roller and thermoplastic bushing;

FIG. 15 is a partial sectional view of the guide member with reference to line 14-14 of FIG. 13, detailing features of a first end thereof;

FIGS. 29a and 29b are top perspective views of a debris deflector for a conveyor system in accordance with another embodiment;

FIG. 30a is a top perspective view of a lateral bracket support of the conveyor system of FIGS. 29a and 29b;

FIG. 30b is a partial isometric view of bracket support slots of the lateral bracket support with reference to line 30b-30b of FIG. 30a;

FIGS. 31a and 31b are isometric views of sides of a mounting bracket for use with the lateral bracket support of FIGS. 30a and 30b;

FIGS. 33a to 33e show the installation of the debris deflector of FIGS. 29a and 29b between two mounting brackets secured to the lateral bracket supports as shown in FIGS. 32a to 32f;

FIG. 35b is an isometric section view of the belt return roller assembly of FIG. 35a;

FIG. 35c shows a partial section view of the belt return roller assembly of FIG. 35a;

FIGS. 37a and 37b show a wear plate for a conveyor system in accordance with another embodiment having a laser-cut plate mount;

FIGS. 38a and 38b show the wear plate of FIGS. 37a and 37b after depression of the plate mount;

FIG. 39 shows a bolt inserted through the depressed plate mount of FIGS. 38a and 39b;

FIG. 40 shows a wear plate anchor for use with the wear plate of FIGS. 39a and 39b;

FIGS. 41a to 41d show the securing of the wear plate of FIGS. 39a and 39b to a support deck using the plate anchor of FIG. 40;

FIG. 42b is an isometric view of a plate mount of the wear plate of FIG. 42a shown in isolation prior to being secured to a grid panel;

FIG. 42c is a partial section view of the wear plate of FIGS. 42a and 42b secured to the wear plate anchor of FIG. 40 via a bolt prior to tightening of the bolt;

FIG. 42d is an isometric view of the plate mount of the wear plate of FIGS. 42a to 42c shown in isolation after tightening of the bolt shown in FIG. 42c;

FIG. 42e is a partial section view of the wear plate of FIGS. 42a to 42c secured to the wear plate anchor of FIG. 40 via a bolt after tightening of the bolt shown in FIG. 42c;

FIG. 44a is an isometric view of the drive coupler of FIG. 43b;

FIG. 44b is a section view of the drive coupler of FIG. 44a;

FIG. 47a is a top isometric view of a wear plate in accordance with a further embodiment having a wear sensor;

FIG. 47b is a bottom isometric view of the wear plate of FIG. 47a;

FIG. 47c shows electric wires coupled to sensor connectors on the bottom of the wear plate of FIGS. 47a and 47b; and FIGS. 48a and 48b are partial section views of the wear plate and electric wires of FIGS. 47a to 47c showing the wear plate in a new condition and a worn-out condition.

DETAILED DESCRIPTION

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Figure 1:
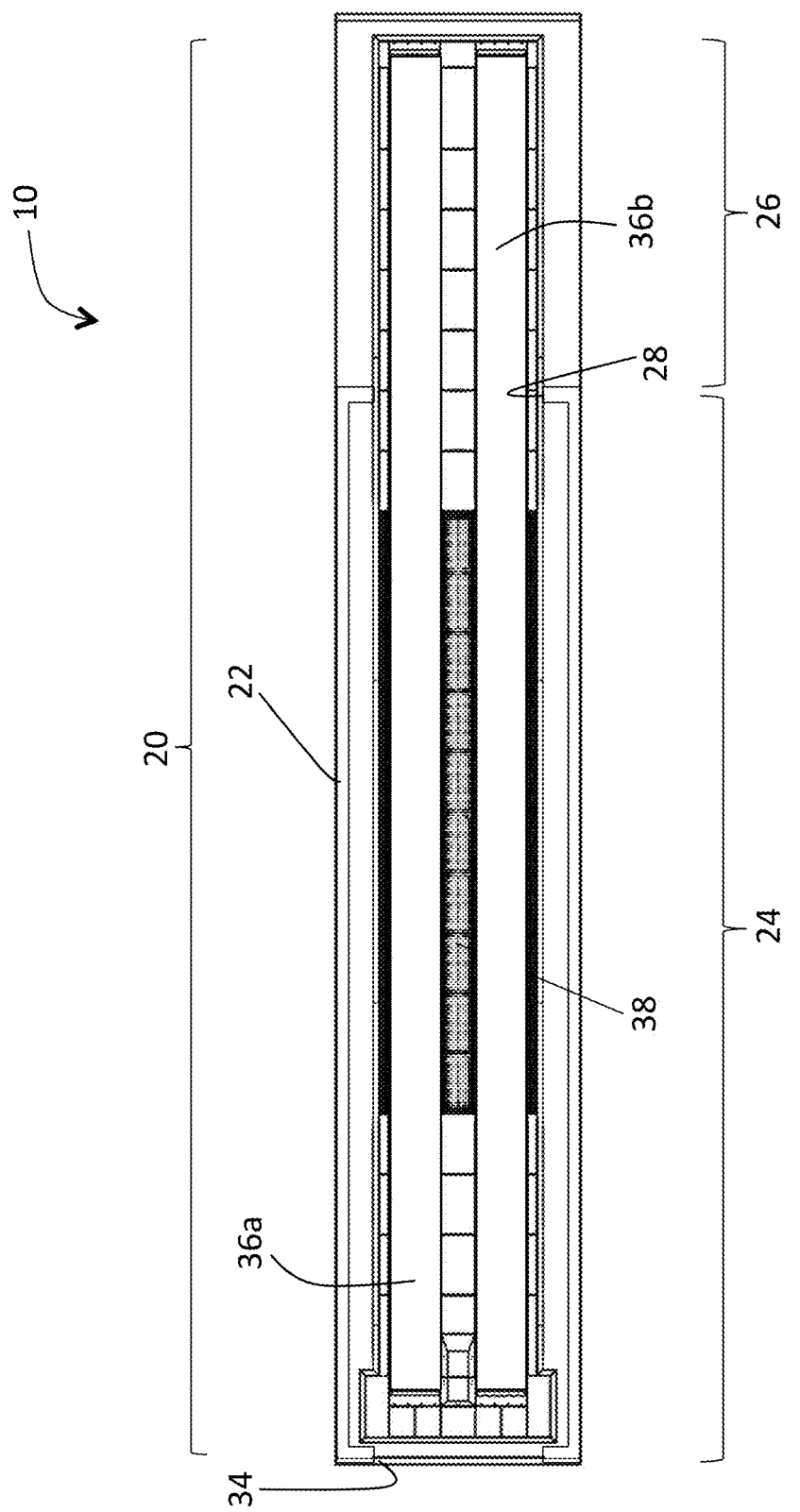
FIG. 1 is a plan view of the conveyor system according to an embodiment hereof.

Reference is made to FIG. 1, which shows a service line 10 having a conveyor system 20 for moving a wheeled structure 11, in accordance with an embodiment. As used herein, the term service line is not intended to be restrictive, and may encompass for example an automatic vehicle wash station (e.g., for cars, commercial trucks, etc.), a manufacturing or assembly line (e.g., for cars, trucks, non-powered mobile units, etc.) as well as a repair or detailing station (e.g., for cars, trucks, etc.). In addition, the term wheeled structure is not intended to be restrictive, and may encompass for example powered landborne vehicles (e.g., trucks, automobiles, tractors, recreational vehicles, etc.), non-powered landborne mobile units (e.g., recreational trailers, utility trailers, etc.), and airborne vehicles (e.g., airplanes, etc.).

The conveyor system 20 is adapted to transport a wheeled structure along a longitudinal length of the service line 10. As presented in FIG. 1, service line 10 is shown in the form of a car wash station having a wash tunnel 22. Accordingly, the conveyor system 20 includes a service zone 24 within the region of the wash tunnel 22 through which the vehicle is transported for a wash cycle. The conveyor system 20 also may also include a loading zone 26 adjacent a tunnel entrance 28, where vehicles align and initially load onto the conveyor system 20.

The conveyor system 20 is configured as a dual-belt system comprising a pair of endless belts mounted in a longitudinal direction through the service line 10. The endless belts 36a, 36b are positioned in parallel and spaced-apart relationship relative to one another through the loading and service zones 26, 24. In the region between the pair of endless belts 36a, 36b, there may be positioned a central stationary platform 38 of removable panels that permit access to regions under the pair of endless belts 36a, 36b, in particular for servicing and maintenance. It will be appreciated that where the conveyor system 20 is provided with two or more endless belts to transport the wheeled structure along the service line 10, the endless belts will move in synchronous motion. As the arrangement for each of the endless belts 36a, 36b is substantially identical, the endless belts 36a, 36b are herein collectively referred to as the endless belt 36 unless otherwise specified.

The endless belts 36a, 36b are made of a plurality of plastic belt segments that are hingedly coupled via pins that are typically made of metal or plastic. The plastic of the belt segments has a hardness $H_{BS}$ that enables the belt segments to withstand the load of a vehicle positioned thereon.

Figure 2B:
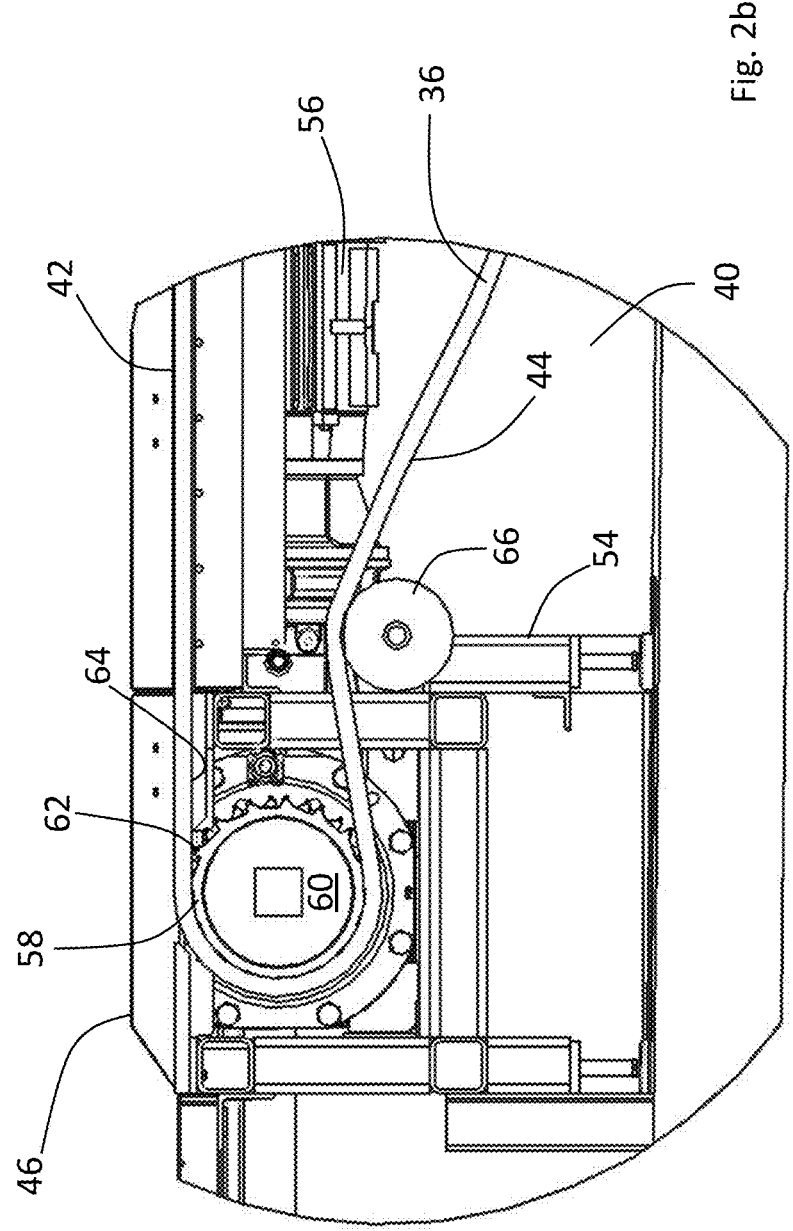

Turning now to FIGS. 2a, 2b and 2c, the conveyor system 20 is generally supported within a trench 40 having a depth suitable to house the required drive and guide mechanisms, and to permit maneuverability to service personnel. The endless belt 36 has an upper transport portion 42 and a lower return portion 44, and extends along the conveyor system 20 between a drive end 46 and an idler end 48. The drive end 46 and idler end 48 provide axially elongated rollers 50 and 52, respectively, which are rotatably supported on a conveyor frame 54, to guide the endless belt 36 around the respective drive and idler ends 46 and 48.

The drive end 46 includes a drive module 56 adapted to engage and move the endless belt around the drive and idler ends 46 and 48. The drive module 56 may be an electric motor as shown, and may include at least one drive member 58 to engage the endless belt 36 and move it around the respective drive and idler ends 46 and 48. As shown, the drive member 58 is provided in the form of at least one sprocket 60 provided with sprocket teeth 62 to engage complementary tracks (not shown) on the inward surface 64 of the endless belt 36. The conveyor system 20 will additionally include guide members 66 supported upon the conveyor frame 54 to support the lower return portion 44 of the endless belt 36 as it moves back towards the idler end 48 on the underside of the conveyor system 20. As shown, the guide members 66 are provided in the form of rollers.

In motion, the upper transport portion 42 of the endless belt 36 moves in tension from the idler end 48 towards the drive end 46 by drive member 58, while the lower return portion 44 moves in a slackened state from the drive end 46 towards the idler end 48.

Turning now to FIGS. 3a and 3b, shown is an enlarged view of the conveyor system 20 with the endless belt 36 and associated support structure removed to highlight features of the conveyor frame 54. The conveyor frame 54 includes a plurality of cross-members 68 positioned transversely relative to the longitudinal direction of the service line 10. The cross-members 68 are dimensioned to span the width of the trench 40, and are adapted to mount on opposing surfaces 70 and 72. Each cross-member 68 also provides at least one footing 74 at approximately a midpoint thereof, extending to a floor 76 of the trench 40 to provide additional load-bearing performance to the conveyor frame 54.

Arranged in the longitudinal direction, the conveyor frame 54 additionally provides a plurality of support rails that extend the longitudinal length of the service line 10, from the idler end 48 to the drive end 46. The support rails are arranged as two inner support rails 78a, 78b and two outer support rails 80a, 80b. The inner support rails 78a, 78b are generally positioned symmetrically about the longitudinal centerline of the service line 10, while the two outer support rails 80a, 80b are situated proximal to the longitudinal walls of the trench 40. The inner support rails 78a, 78b and the outer support rails 80a, 80b may be fixedly attached in place by rivets, threaded fasteners (e.g., bolts), metallurgic bonding (e.g., welded attachment), or any other suitable means to achieve a secure attachment.

Having reference to FIG. 4, the inner support rails 78a, 78b cooperatively define a gap spacing for the central stationary platform 38 provided between the endless belts 36a, 36b. The inner support rails 78a, 78b each provide a respective seat 82a, 82b configured to receive and support the central stationary platform 38. In the embodiment shown, the central stationary platform 38 is provided in the form of fiberglass or thermoplastic grating. In addition, for each endless belt 36, the respective opposing inner and outer rails 78a, 80a define a gap spacing to receive a support deck 84. The support deck 84 generally includes a plurality of modular grid panels 86 adapted to be positioned end to end relative to one another along the longitudinal length of the service line 10. The modular grid panels are provided with a length that aligns the point of contact between adjacent grid panels on a transverse cross-member 68, providing weight-bearing support thereto. The support deck 84 is positioned between the upper transport portion 42 and lower return portion 44 of the endless belt 36, generally in close proximity to the upper transport portion 42. In this way, the support deck 84 provides support to the upper transport portion 42 of the endless belt 36, and thereby a load placed thereon from a wheeled structure placed upon the conveyor system 20. To facilitate sliding of the endless belt over the support deck 84, a belt contact surface in the form of a plurality of wear plates 88 is provided between the upper transport portion 42 and the support deck 84. The belt contact surface is the portion of the support deck 84 facing the endless belt 36 during normal use. The belt contact surface can have a thickness so that, as it wears through use with the endless belt 36, it continues to facilitate sliding of the endless belt 36 thereover until the belt contact surface is worn out.

The wear plates 88 form a structure that extends along a top of the support deck 84 and contacts the upper transport portion 42 of the endless belt 36. The arrangement of the inner and outer support rails 78a, 78b, 80a, 80b may additionally be used to mount the guide member 66 supporting the lower return portion 44 of the endless belt 36. As shown, the inner and outer support rails 78a, 80a provide respective guide hangers 90, 92 that support the guide member 66 in a transverse direction relative to the longitudinal direction of the service line 10. As shown, the guide member 66 is provided with a plurality of rollers 94 that support an outward surface 96 of the endless belt 36 along the lower return portion 44.

Continuing with FIG. 4, also provided between the upper transport portion 42 and the lower return portion 44 of the endless belt 36, and in particular between the support deck 84 and the lower return portion 44 is a debris deflector 98. The debris deflector 98 provides a barrier to protect the lower return portion 44 from debris falling from the support deck 84, in particular where the support deck 84 is provided in the form of the modular grid panels. The debris deflector 98 is generally mounted on an angle directed downwardly towards the longitudinal centerline of the service line. The debris deflector 98 may be mounted on dedicated brackets, or may be mounted on the guide hangers 90 and 92 used for supporting the guide members 66 (as shown). The debris deflector 98 is generally configured to provide a contiguous barrier between adjacent cross-members, so as to maximize the protection from falling debris. In some embodiments, the debris deflector 98 may be provided in the form of multiple panels arranged and fastened in side-by-side relationship to one another.

It will be recognized that the arrangement of the support deck 84, the debris deflector 98 and the longitudinally-spaced cross-members 68 define a partial enclosure in the region between the upper transport portion 42 and the lower return portion 44 of the endless belt 36. To assist in reducing the likelihood of freezing conditions on the conveyor system 10, in particular sections exposed to the outside environment, such as the loading zone 26 shown in FIG. 1, at least a portion of the conveyor system 20 may include a heater in these partial enclosures between adjacent cross-members 68. Referring to FIGS. 3 and 4, the conveyor system 20 provides a heater 100 positioned between the support deck 84 and the debris deflector 98, extending in the longitudinal direction across one or more of the partial enclosures delimited longitudinally between adjacent cross members 68. Accordingly, the partial enclosures containing the heater 100 provide a region of higher heat concentration relative to other areas within the trench 40, in particular the area below the debris deflector 98. In this way, the support deck 84, the endless belt 36 supported thereon, and the plurality of wear plates 88 positioned therebetween receive heat from the region of higher heat concentration, thereby reducing the likelihood of a freeze event in the conveyor system 20. It will be appreciated that freeze events in conveyor systems can result in extensive damage to the endless belt 36 and/or drive module 56.

To enable passage of the heater 100 between adjacent partial enclosures separated by the cross-members 68, the cross-members 68 are adapted with one or more pass-through apertures 102, depending on whether the heater is adapted to pass once through the desired heated portion, or in a serpentine path therethrough. In the embodiment shown in FIG. 4, two pass-through apertures are provided for each side of the conveyor system 20.

It will be appreciated that the heater 100 may take on a variety of forms. For example, the heater 100 may be configured as a convective heater, such as a convective tube heater including both smooth and finned-tube varieties. A convective tube heater will generally be part of a fluid circuit having an electric or gas-fired heater module to deliver a heated fluid therein. The heater 100 may also be configured as a radiant heater such as a gas-fired radiant tube heater, or a resistive electrical heating element.

The debris deflector 98 may be formed from any suitable material including but not limited to metal (e.g., stainless steel, galvanized steel, aluminum, etc.), thermoplastics (e.g., polypropylene, polyethylene, etc.) and composites. To promote direction of the emitted heat from heater 100 towards the support deck 84, the debris deflector 98 may be adapted with at least a selected level of thermal reflectivity. The thermal reflectivity may be achieved by constructing the debris deflector 98 in the form of a radiant barrier. Alternatively, a radiant barrier may be separately formed and applied to the debris deflector 98, for example in the form of a thin radiant barrier sheet attached thereto. Radiant barriers are typically highly reflective materials (e.g., aluminum or polished stainless steel foil) applied to a substrate. Exemplary substrates may include kraft paper, oriented strand board, plastic films and plywood. For environments that experience high moisture levels, for example a car wash tunnel, the substrate may be of metal or thermoplastic construction. Exemplary thermoplastic substrates may include polypropylene or polyethylene foam core. In general, the material applied to the substrate should exhibit an emittance of less than 0.25, as measured by ASTM C1371. In addition to polished metallic films, low-emittance coatings such as metal oxide may be used on a suitable substrate. It will be appreciated that the side of the debris deflector 98, or separately formed sheet, facing the support deck 84 is the side adapted to receive the highly reflective material. In other words, the highly reflective material, and thus the effective side of the radiant barrier is intended to face the region of higher heat concentration between the debris deflector 98 and the support deck 84.

Figure 5:
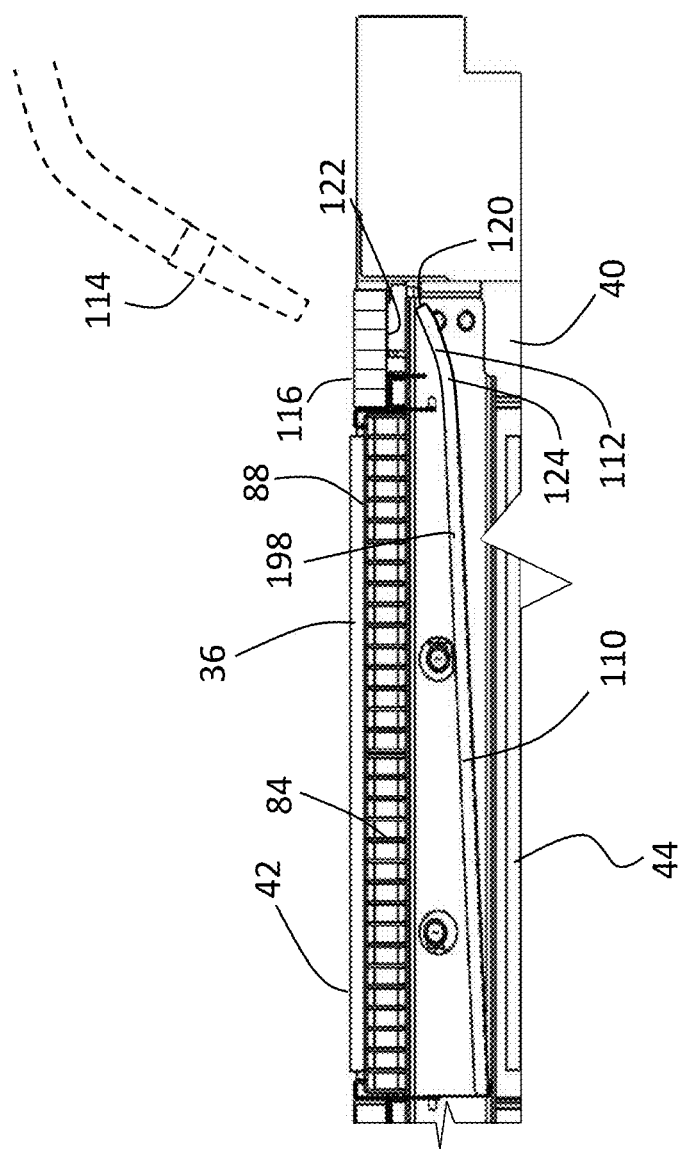
FIG. 5 is a partial transverse section view of the conveyor system according to FIG. 1, showing an alternative embodiment of the debris deflector.
Figure 6:
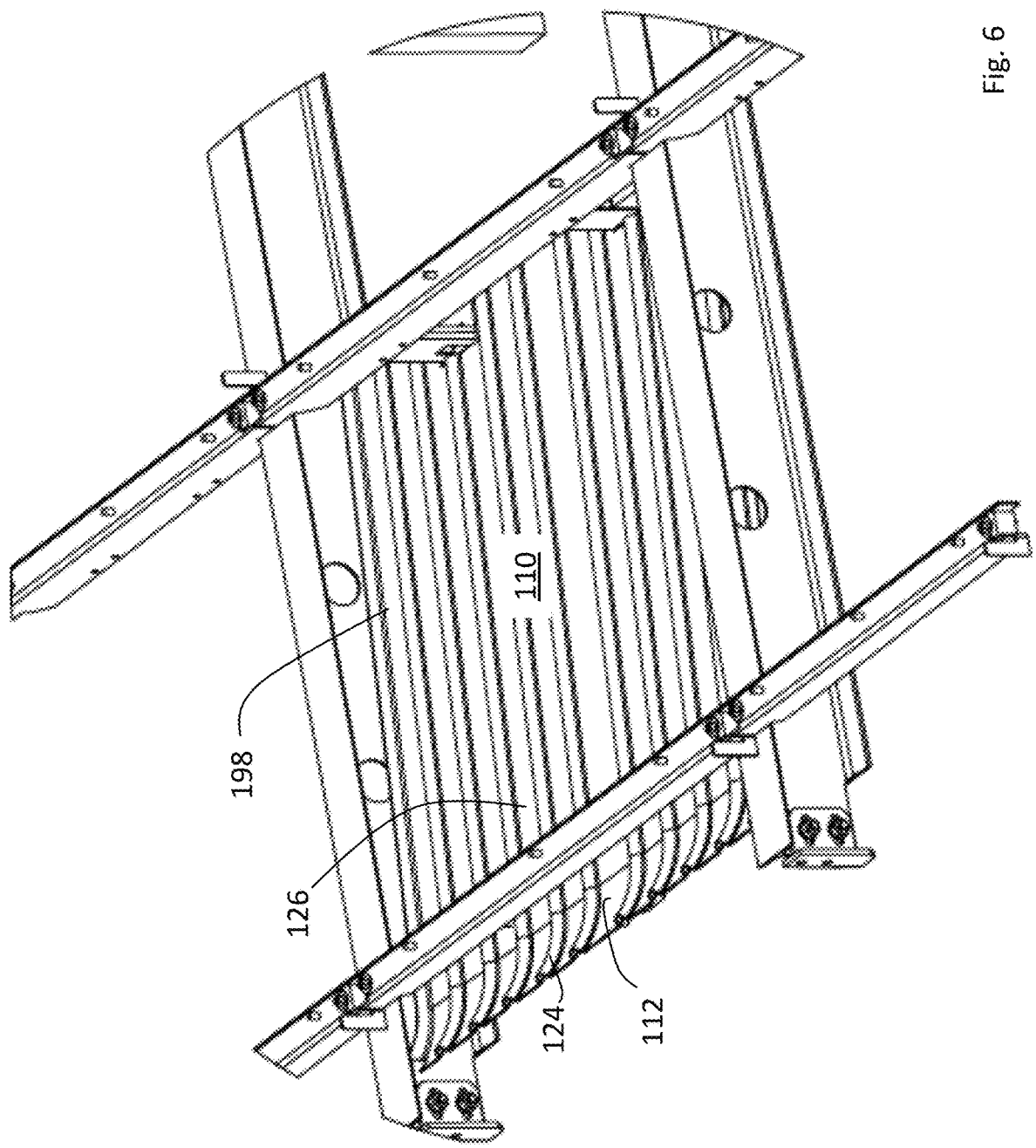
FIG. 6 is a partial isometric of the debris deflector according to the embodiment of FIG. 5.

Having regard to FIGS. 5 and 6, shown is a debris deflector 198 according an alternative embodiment. As the debris deflector 198 is arranged in the conveyor system 20 in substantially the same way as debris deflector 98, only the differences associated with this alternative embodiment are discussed. The debris deflector 198 includes a debris portion 110 that is positioned under the support deck 84, and a water collection portion 112 that extends outwardly therefrom, towards a respective side wall of the trench 40. The water collection portion 112 is intended to facilitate cleaning of the debris portion 110 of the debris deflector 198, without the need for substantial disassembly and associated downtime of the conveyor system. With this arrangement, a sprayer or suitable wash nozzle 114 may be positioned as shown to deliver a stream of water directly upon the water collection portion 112 of the debris deflector 198, promoting a wash effect to remove accumulated debris from the debris portion 110. Access to the water collection portion 112 may be achieved by removing side panels 116, or where the side panels 116 are provided in the form of fiberglass or thermoplastic grating, wash water may be delivered directly therethrough. The use of grates for the side panels 116 will also permit a greater volume of wash and rinse water from the wash tunnel to be captured by the water collection portion 112, enhancing the cleaning effect of the debris deflector 198 during normal wash tunnel usage.

As shown, the water collection portion 112 of the debris deflector 198 is generally arranged at an angle relative to the debris portion 110, with its terminal lateral edge 120 being positioned proximal the underside 122 of the side panel 116. The debris deflector 198 is provided with a curved transition 124 between the water collection portion 112 and the debris portion 110 to deflect the impingement of rinse water, with reduced turbulence, therein resulting in an effective flushing of debris from the debris portion 110 of the debris deflector 198.

The debris deflector 98, 198 may be formed of stamped or formed stainless steel, or galvanized steel to provide a rust-inhibiting effect. In an alternative embodiment, the debris deflectors 98, 198 may be formed of a thermoplastic material, for example a polyolefin, a low or high-density polyethylene, polyvinyl chloride, or an acrylonitrile butadiene styrene (ABS), and may include suitable fillers or additives to achieve the desired performance characteristics. In general, suitable materials will exhibit resistance to wear, corrosion and pitting, as well as low moisture absorption and low reactivity to chemicals. Suitable materials should also exhibit a general non-stick behavior (i.e., as achieved through improved surface smoothness and a low coefficient of friction) in relation to oil and grease, as well as dirt and salt. In one embodiment, the debris deflector 98, 198 may be formed of polypropylene or polyethylene, and may include glass fibers to improve impact performance at low temperature.

When formed of thermoplastic material, the debris deflector 98, 198 may be formed via any suitable molding process, including but not limited to vacuum forming, compression molding and thermoforming. When molded, a thermoplastic debris deflector may incorporate one or more structural ribs 126 (as seen in FIG. 6). The structural ribs 126 provide additional rigidity to the debris deflector 98, 198, and establish sluice-like channel-ways 128 that direct water flow, enhancing the wash effect.

As stated earlier, and having regard to FIG. 2a, the upper transport portion 42 of the endless belt 36 moves in tension from the idler end 48 towards the drive end 46 by drive member 56, while the lower return portion 44 moves in a slackened state from the drive end 46 towards the idler end 48. In the slackened state, the lower return portion 44 of the endless belt 36 may be subject to greater lateral movement, having the potential to create belt tracking and alignment issues. This is particularly evident at the idler end 48 where the axially elongated roller 52 is not provided with engagement teeth as found on the opposing drive member 58 at the drive end 46. Misalignment and poor tracking of the endless belt 36 can cause excessive wear on the conveyor mechanism, necessitating increased maintenance and associated downtime. Issues of misalignment of the endless belt 36 can increase upon aging of the endless belt 36, generally due to belt stretch. Accordingly, in an alternative embodiment, a least one pair of lateral guide rollers are incorporated into the conveyor system 20.

Figure 7:
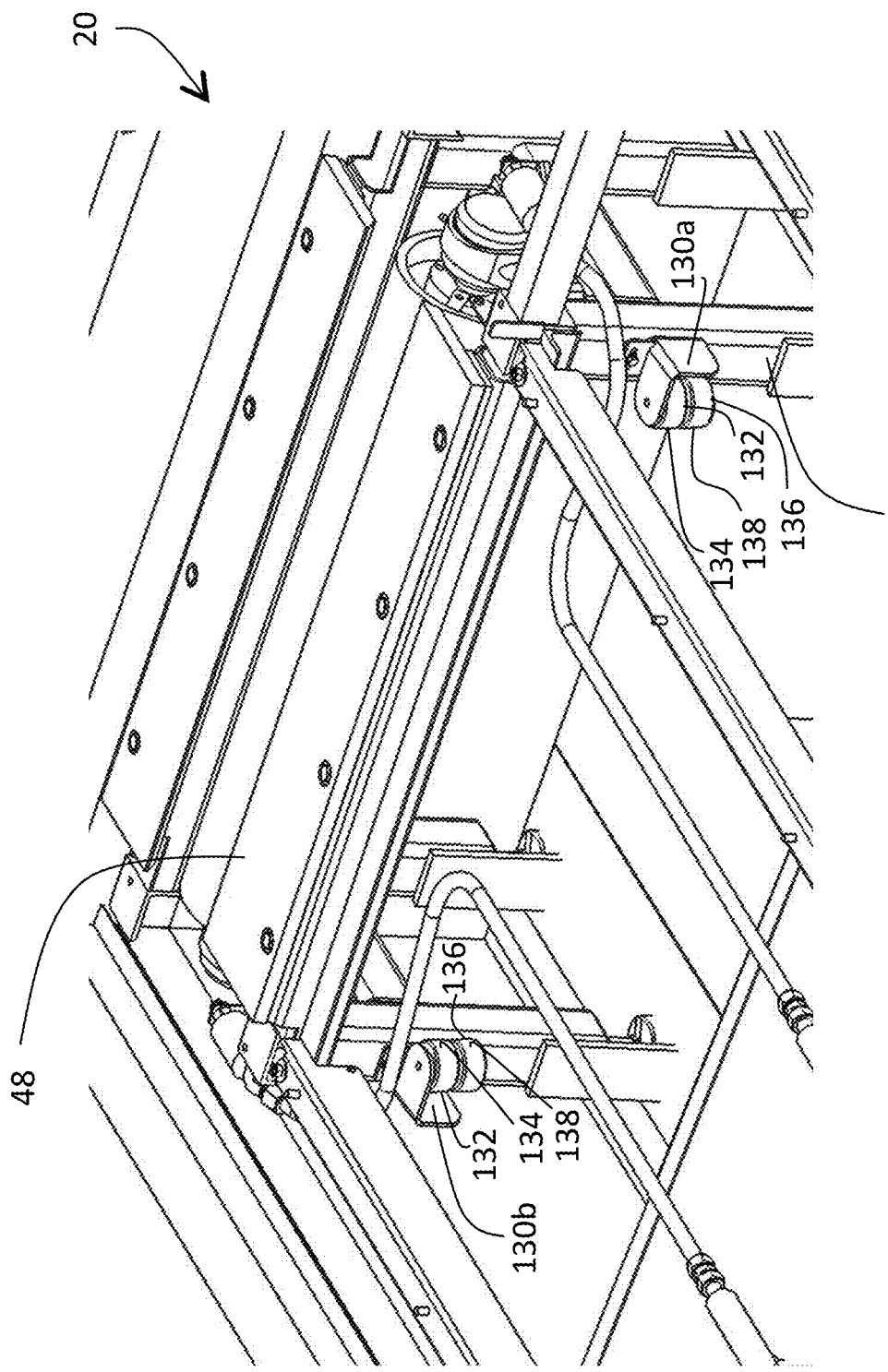
FIG. 7 is a partial isometric view of the conveyor system according to FIG. 1, showing the use of lateral guides on the idler end.

Having regard to FIG. 7, shown is the idler end 48 of the conveyor system 20, with the endless belt and associated support components removed for clarity. Associated with each endless belt is a pair of lateral guides 130a, 130b, mounted to the conveyor frame 54. The pair of lateral guides 130a, 130b are arranged to engage the lower return portion 44 of the endless belt 36, as best seen in FIG. 2c with respect to lateral guide 130b. Having regard to FIGS. 7 and 8, each lateral guide 130a, 130b is provided with at least one roller (first roller 132) presenting a first roller surface 134 positioned to engage a respective lateral edge of the lower return portion 44 of the endless belt 36. In the embodiment shown, each lateral guide 130a, 130b is presented as having two stacked rollers, that is the first roller 132 and a second roller 136. The addition of the second roller 136 provides a second roller surface 138 positioned to engage the endless belt 36 in a more slackened state. In an alternative embodiment, the height of the first roller 132 can be large enough to span the expected range of the path of the endless belt 36, thereby mitigating the need for two or more rollers. In general, a newly installed endless belt 36 having very little operational time will exhibit less slack, and therein align to the first roller surface 134 of the first roller 132, as shown in FIG. 2c. With usage and ageing of the endless belt, additional slack arising from stretch in the endless belt 36 may cause the endless belt 36 to displace downwardly, with the lateral edges of the lower return portion 44 aligning with the second roller surface 138 of the second roller 136. Further, changes in ambient temperature can cause the lengthening and shortening of the endless belt 36, causing it to align with the first roller surface 134 or the second roller surface 138. Accordingly, the lateral guides 130a, 130b are configured to provide lateral support over the useable lifespan of the endless roller 36.

Figure 8:
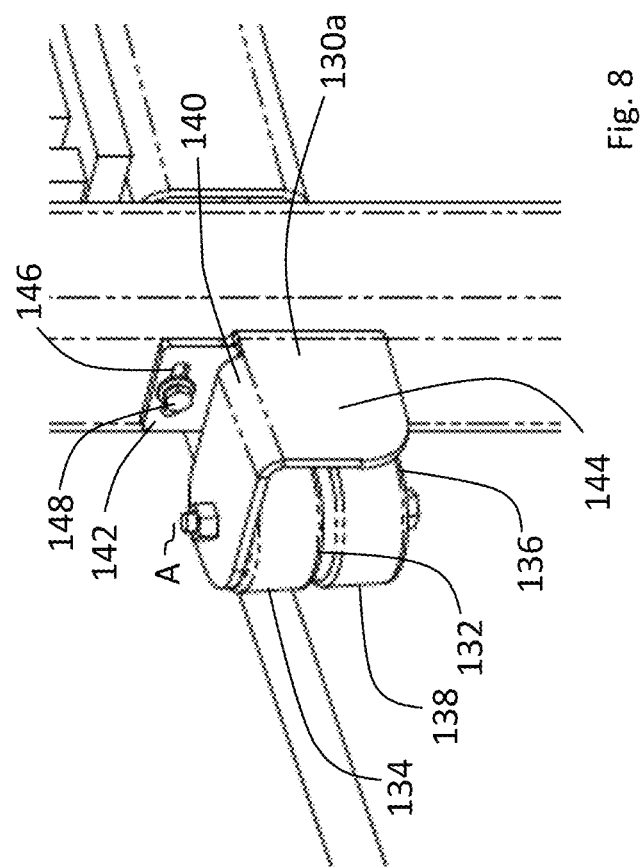
FIG. 8 is an enlarged isometric view of the lateral guide according to the embodiment of FIG. 7.

The lateral guides 130a, 130b generally include the at least one roller (first and second rollers 132, 136 as presented herein) mounted upon a bracket 140, as best seen in FIG. 8. The bracket 140 provides a mount portion 142 that is fastened to the conveyor frame 54, and a roller support portion 144 that receives the at least one roller (rollers 132, 136 in the embodiment shown). The rollers may be any suitable material, including but not limited to polymeric or rubber materials (i.e., rubber-tired caster wheels), and may include a suitable bearing member, such as a bushing or a bearing, to facilitate rotation about an axis A. In one embodiment, the bearing may be a sealed bearing to prevent the ingress and fouling of the bearing due to contaminated water and debris. To facilitate lateral adjustability of the lateral guides 130a, 130b, the mount portion 142 of the bracket 140 may be provided with a slotted aperture 146 at each point receiving a fastener (i.e., bolt 148). Accordingly, the lateral guides 130a, 130b can be laterally adjusted as necessary to ensure proper tracking of the endless belt 36. In general, the lateral guides are positioned to ensure continued traction with the edge of the endless belt 36, so as to minimize wear due to sliding friction, in particular with systems having heavier particulate buildup.

Figure 9:
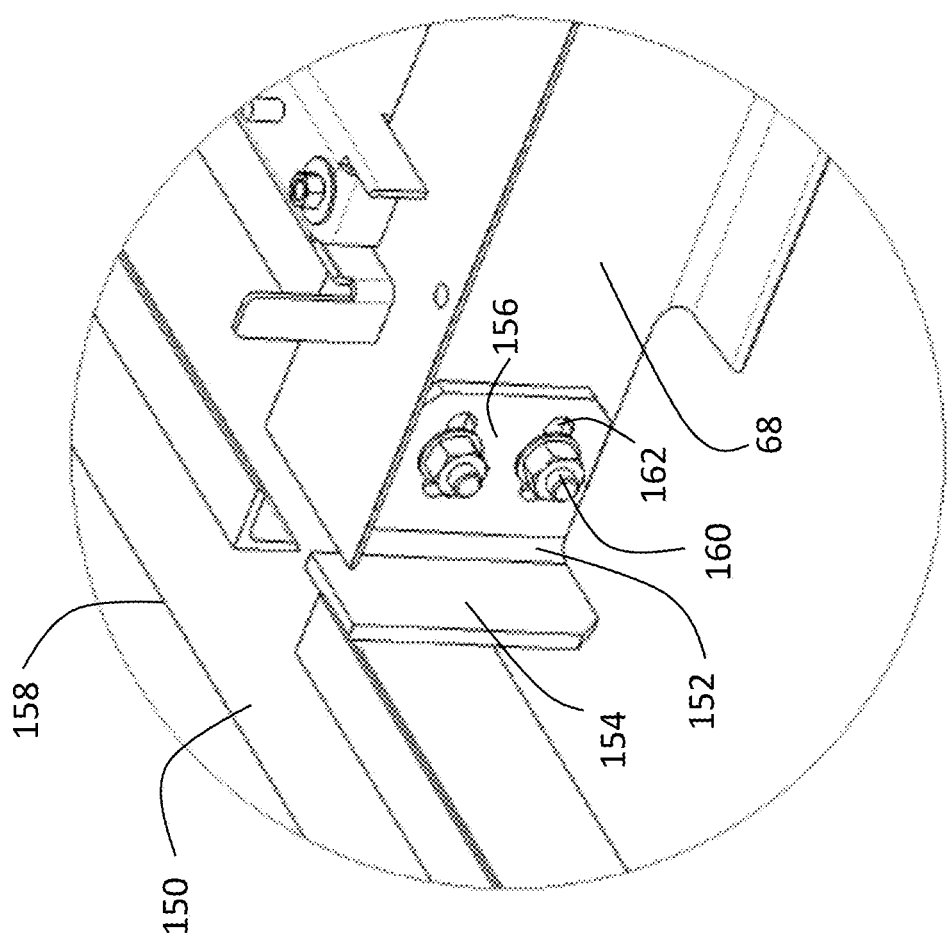
FIG. 9 is a partial isometric view of the conveyor system according to FIG. 1, detailing features of the mount brackets.

Having regard to FIG. 3a, each cross-member 68 may be adapted to mount directly upon the opposing surfaces 70 and 72, for example by welded attachment to an anchorage bar 150 embedded in the concrete at the upper longitudinal edge the trench 40. While effective, direct attachment can be labor intensive as supporting the heavy cross member 68 during attachment can be difficult. Accordingly, in an alternative embodiment, the plurality of cross members 68 are attached on opposing ends to a respective cross-member mount bracket 152, as shown in FIG. 9. The cross-member mount bracket 152 includes an anchorage portion 154 configured for attachment to the anchorage bar 150, and a cross-member portion 156 configured to receive and support the cross-member 68. As shown, each side of the trench 40 includes along the upper longitudinal edge 158 the anchorage bar 150, generally provided in the form of angle iron embedded in the concrete. At each location along the trench 40 where a respective cross-member 68 is positioned, a mount bracket 152 is welded to the anchorage bar 150. The mount bracket 152 is easier to locate in relation to a desired vertical elevation on the anchorage bar 150, and may be tack-welded in place prior to permanent attachment to enable alignment and level verification over the longitudinal length of the trench prior to final welding. With all mount brackets 152 welded in position to support the desired arrangement of cross-members 68, the cross-members are attached at opposing ends to respective cooperating mount brackets. Attachment may be achieved using suitable fasteners, for example bolts 160. To permit for lateral adjustment, in particular where the trench 40 may exhibit variation in width along its longitudinal length, the cross-member mount portion 156 of at least one of the cooperating mount brackets 152 is provided with slotted apertures 162 to receive the fastener (bolts 160). In this way, slight variations in width of the trench 40 are accommodated by the mount brackets 152, reducing the need for custom-sized components. This slotted arrangement also allows adjustment of the conveyor system 20 for straightness in the event that the trench 40 is not straight.

As stated previously, the wear plates 88 facilitate sliding of the endless belt 36 over the support deck 84, and is located between the upper transport portion 42 and the support deck 84, as best seen in FIG. 4. Having regard to FIGS. 10 and 11, shown is a portion of the conveyor system 20 with the endless belt removed to highlight features of the wear plates 88. The wear plates 88 are supported upon the plurality of modular grid panels 86 of the support deck 84, and are adapted to sit end-to-end relative to one another. Each of the wear plates 88 includes a leading edge 166 and a trailing edge 168, wherein the leading and trailing edges 166 and 168 are provided with complementary profiles to facilitate fit and alignment between adjacently positioned wear plates 88. In the embodiment shown, the complementary profile is provided in the form of a chevron aligned to the direction of travel of the vehicle through the wash tunnel. At least one of the leading and trailing edges 166 and 168 of the wear plates 88 may be chamfered to reduce the likelihood of wear upon the endless belt.

The wear plates 88 are made from a material that is at least partially thermoplastic, and, in particular, at least partially polyethylene, such as an ultra-high-molecular-weight polyethylene ("UHMWPE"), which is also known as high-modulus polyethylene ("HMPE"). UHMWPE is a thermoplastic polyethylene that has extremely long chains. The longer chains serve to transfer load more effectively to the polymer framework by reinforcing intermolecular interactions. Further, UHMWPE has low moisture absorption, a very low coefficient of friction, a high strength, and is highly resistant to abrasion as a result of the longer chains, especially in comparison to carbon steel. Further, UHMWPE is very resistant to corrosion. Some particular exemplary materials that can be used to manufacture the wear plates are virgin UHMWPE such as available from Röchling Engineering Plastics and the Garland Manufacturing Company, reprocessed UHMWPE such as available from Röchling Engineering Plastics, glass filled UHMWPE such as available from Quadrant Plastic Composites Inc., ceramic filled UHMWPE such as available from Polymer Industries Inc. and Quadrant Plastic Composites Inc., and cross-linked UHMWPE such as available from Röchling Engineering Plastics and Polymer Industries Inc.

Alternatively, in other embodiments, the wear plates can be made from a material that is at least partially high-density polyethylene ("HDPE"). HDPE is also suitable for use for construction of the wear plates 88. In another embodiment, a proprietary polyethylene, Polystone™ sold by Röchling Engineering Plastics, can be used to manufacture the wear plates.

The material of the wear plates 88 can be selected it has a hardness $H_{WP}$ that is lesser than the hardness $H_{BS}$ of the plastic belt segments in some scenarios.

The costs for the manufacturing of wear plates form these materials ranges from 63% to over 200% of the price using stainless steel in some cases, based on the current prices of stainless steel and these thermoplastics. Depending on the material selected and application, suitable thickness ranges are in the 3/16 inch to 3/8 inch range (5-10 mm) in some scenarios.

Traditionally, the use of such materials for belt contact surfaces was deemed unsuitable as dirt trapped between the endless belts and the belt contact surfaces caused the belt contact surfaces to wear at an unsatisfactory rate without significant improvements to the wear of the endless belts. Wearing of the endless belts and the belt contact surface occurs in the form of erosion. As the endless belts are worn down, the pins holding belt segments together are exposed and can be deformed and pop out, allowing the belt segments to separate. Erosion of the belt contact surface can accelerate endless belt wear where the endless belt is in contact with the underlying structures.

It has been found that, by using a belt rinsing system that introduces and drains a rinsing fluid between the endless belts and the belt contact surfaces, the dirt trapped between the endless belts and the belt contact surfaces can be reduced and that the wear rate of both the endless belts and the belt contact surfaces can be reduced.

That is, by making the belt contact surface (i.e., the wear plates 88) from a softer material than stainless steel that is traditionally used, and by rinsing away debris from the interface between the endless belts 36a, 36b and the support deck, the lifetime of the endless belts 36a, 36b can be increased as a result of the lower wear from contact with the wear plates 88.

Certain thermoplastics, such as UHMWPE and HDPE have been found to be suitable due to their possession of certain characteristics. These materials provide a sufficiently low coefficient of friction, and are sufficiently resistant to abrasion. The wear plates 88 are inexpensive to replace relative to the replacement cost of the endless belts 36a, 36b. The replacement cost of an endless belt 36a, 36b can be high as there is a significant amount of manual labor in disassembling the belt segments to be replaced. Wear plates made from a material that is substantially UHMW have been found to have a service lifetime that ranges from 11% to 200% of the durability of wear plates made from stainless steel. Of more interest is that, due to the relative softness, higher resistance to abrasion, and lower coefficient of friction of the material compared to stainless steel traditionally employed in these applications, the wear rate of the endless belts is reduced, thus extending their service lifetime significantly, anywhere from 50% to 1700% in some cases.

Another characteristic of thermoplastics is that they generally have a hardness $H_{WP}$ that is lesser than the hardness $H_{BS}$ of the belt segments of the endless belts 36a, 36b. As a result, the wear plates 88 are designed to improve the lifetime of the endless belt 36 by sacrificing the lifetime of the wear plates 88.

Polyethylenes and other thermoplastics are subject to thermal expansion and contraction. In the car wash environment, the range of temperatures that the wear plates 88 are subject to is significant. The wear plates 88 have a longitudinal length of approximately 44 inches and have been found to expand and contract +/−0.2 inches over a typical operational ambient temperature range. In order to compensate for these expansions and contractions, expansion gaps between the leading and trailing edges 166 and 168 of the wear plates 88 of 0.2 inches or greater are provided.

Each wear plate 88 is provided with a plurality of debris slots 170 that permit the evacuation of debris therethrough, so as to reduce the accumulation of debris between the endless belt and the wear plates 88. Each debris slot 170 includes a first slot end 172 and a second slot end 174, and is provided with a width of 10 mm, although widths of between 8 to 25 mm may be implemented. Each debris slot 170 may be linear (i.e., straight) and may be arranged at an angle θ relative a longitudinal centerline L of the wear plate 88. As shown, the debris slot 170 is outwardly angled from the longitudinal centerline L in the direction of the first slot end 172 towards the second slot end 174. The angle θ of each debris slot 170 is 35° relative to the longitudinal centerline L of the wear plate 88, although angles between 25° to 45° may be implemented. In general, angle selection is based on observed belt wear. It has been determined that angles within this range, and in particular at 35° relative to the longitudinal centerline L of the wear plate 88 result in the least amount of endless belt wear during use, therein increasing the usable lifespan of the endless belt and wear plates.

The first slot end 172 and the second slot end 174 of each debris slot 170 can be provided with an inwardly sloped bevel 176, as shown in FIG. 12a. It has been determined that maximum wear of the endless belt occurs where the endless belt passes over a sharp edge perpendicular to the direction of belt travel. Accordingly, with the first and second slot ends 172 and 174 having the inwardly sloped bevel 176, in particular at the second slot end 174, the extent of belt wear is reduced, particularly when the wear plates are constructed of stainless steel. Between the first and second slot ends 172 and 174 of the debris slot 170, the opposing edges 178a and 178b remain unbeveled, that is they remain as sharp edges, as shown in FIG. 12b. As the endless belt is passing over these sections of the debris slot 170 at an angle (i.e., 35° relative to the longitudinal centerline L of the wear plate 88), the extent of belt wear is minimal. Moreover, by maintaining these edges sharp as shown, they provide a stripping action to remove debris from the underside of the endless belt, without excessive wear thereto.

It will be appreciated that while both the first and second slot ends 172 and 174 are shown as being beveled, in some embodiments, only one of the first and second slot ends 172 and 174 is beveled. In an alternative embodiment, only the second slot end 174 is beveled.

By using certain thermoplastics that are softer than stainless steel, have a low coefficient of friction, and/or a high resistance to abrasion in constructing the wear plates, it has been found that the beveling of the debris slots 170 as shown in FIGS. 12a and 12b can be omitted without materially increasing wear on the endless belt 36. The beveling of the debris slots 170 adds to the manufacturing costs of the wear plates 88 and, thus, the ability to omit this feature without materially impacting the lifetime of the endless belt 36 is another benefit to the use of thermoplastics in the construction of the wear plates 88.

In the embodiment shown in FIG. 11, each wear plate 88 provides 8 debris slots 170, generally presented in two rows of 4 arranged across the wear plate 88. Within each row, the 4 debris slots are arranged in two paired sets of debris slots, with the two paired sets of debris slots being longitudinally offset relative to one another. The arrangement of the debris slots 170 is such that the leading and trailing ends 172 and 174 of successive debris slots 170 align, so as to reduce the number of locations having increased potential for belt wear. As shown, alignment between successive debris slots occurs along longitudinal centerline L, as well as alignment line $AL_A$ and alignment line $AL_B$.

It will be appreciated that while each wear plate 88 is shown as having 8 debris slots 170, in other embodiments, the number of debris slots 170 may be fewer or greater, depending on the extend of debris removal required. While the leading and trailing ends 172 and 174 of all debris slots 170 may be machined with the aforementioned inwardly sloped bevel, in some embodiments, only the debris slots 170 arranged proximal the longitudinal centerline L of the wear plate 88 may be beveled. In other preferred embodiments, the debris slots 170 are not beveled.

As shown in FIG. 4, the inner and outer support rails 78a, 80a provide respective guide hangers 90, 92 that support the guide member 66 in a transverse direction relative to the longitudinal direction of the service line 10. Having regard to FIG. 13, shown is the guide member 66 in isolation to highlight specific features thereof. Guide member 66 includes a plurality of rollers 94 (94a, 94b, 94c) mounted on a stationary shaft 180 supported at a first end 182 by guide hanger 90 (not shown for clarity), and at a second end 184 by guide hanger 92. In some embodiments the stationary shaft 180 is a stainless steel shaft, with at least one of the first and second ends 182 and 184 being configured with a suitable keyed interface with respective guide hangers 90 and 92 to prevent rotation of the stationary shaft 180 relative thereto. Each roller 94 (94a, 94b, 94c) provided is rotatably mounted on the stationary shaft 180 using a suitable bushing or bearing interface therebetween. In the embodiment shown, a low friction thermoplastic bushing 186 is used. Suitable thermoplastics include, but are not limited to acetal (i.e., Delrin™) and UHMWPE. As shown in FIG. 14, the thermoplastic bushing 186 is configured with a central bearing member portion 188 that engages a shaft aperture 190 of roller 94, as well as a first bushing extension 192 and a second bushing extension 194. The central bearing member portion 188 of the thermoplastic bushing 186 is press-fit or otherwise mounted in the shaft aperture 190, so as to rotate with the roller 94. Accordingly, upon rotation of the roller 94 during use, the thermoplastic bushing 186 rotates upon the stationary shaft 180, with the thermoplastic bushing 186 providing a low friction interface therebetween.

The guide member 66 additionally includes a series of protective sleeves that cover the stationary shaft 180 and serve to protect the interface between the stationary shaft 180 and the thermoplastic bushings 186 from debris and contaminated water. As shown, a first and second outer sleeve 196 and 198 is provided between respective guide hangers 90 and 92 and the outer rollers 94a and 94b. A first and a second inner sleeve 200 and 202 are provided between the respective outer rollers 94a and 94b and the middle roller 94c. It will be appreciated that the inner and outer sleeves also serve as spacers to maintain the rollers 94 in the desired position on the stationary shaft 180.

The first and second outer sleeves 196 and 198 are configured to remain stationary during use. Accordingly, at each end 182 and 184 of the stationary shaft 180, a fixed non-rotatable interface is established between the stationary shaft 180 and the first and second outer sleeves 196 and 198 associated therewith. Having regard to FIG. 15 detailing the arrangement at the first end 182, a fixed bushing 204 is provided between the first outer sleeve 196 and the stationary shaft 180. The interface between the stationary shaft 180 and the fixed bushing 204, in particular the outside diameter of the stationary shaft 180 relative to the inside diameter of the fixed bushing 204 is sized to establish an interference fit therebetween. As such, a fixed non-rotatable relationship is established between the stationary shaft 180 and the fixed bushing 204. Similarly, the interface between the fixed bushing 204 and the first outer sleeve 196, in particular the outside diameter of the fixed bushing 204 relative to the inside diameter of the first outer sleeve 196 is sized to establish an interference therebetween. As such, a fixed non-rotatable relationship is established between the fixed bushing 204 and the first outer sleeve 196. Accordingly, the first outer sleeve 196, as well as the second out sleeve 198 which is mounted in an identical manner relative to the second end 184 remain fixed in relation to the stationary shaft 180.

On the opposing end of the first outer sleeve 196, that is where it engages the first bushing extension 192 of the thermoplastic bushing 186 at the roller 94a, the inside diameter of the first outer sleeve 196 relative to the outside diameter of the first bushing extension 192 is sized to establish a slip-fit therebetween. As such, first outer sleeve 196 remains fixed while the thermoplastic bushing 186 is permitted to rotate relative thereto. It will be appreciated that the opposing end of the second outer sleeve 198 is similarly configured relative to the thermoplastic bushing 186 at the roller 94b, so as to achieve the same slip-it relationship therebetween.

Unlike the first and second outer sleeves 196, 198, the first and second inner sleeves 200 and 202 are configured to rotate with the rollers 94. Accordingly, having regard to the first inner sleeve 200, the interface between the first inner sleeve 200 and the second bushing extension 194 at roller 94a, in particular the inside diameter of the first inner sleeve 200 relative to the outside diameter of the second bushing extension 194 is sized to establish an interference fit therebetween. Each end of the first inner sleeve 200 is configured in this way, therein causing the first inner sleeve 200 to rotate upon rotation of the rollers 94a and 94c. It will be appreciated that the second inner sleeve is similarly configured, relative to the rollers 94c and 94b.

To reduce the likelihood of contamination of the thermoplastic bushing 186, in particular at the interface between the thermoplastic bushing 186 and the stationary shaft 180, additional seal rings 206 (i.e., rubber O-rings) may be implemented. As shown, a seal ring 206 is provided at the interface between each bushing extension 192 and 194 of the thermoplastic bushing 186, and the respective inner sleeve 200 and 202 or outer sleeve 196, 198 to which it engages. Seal ring is seated in a suitable channel at the interface, for example as provided by seal ring channel 210 in each of the first and second bushing extensions 192 and 194.

Suitable materials for the rollers 94 include, but are not limited to rubber tired wheels (i.e., caster wheels). The use of rubber tired wheels has the benefit of supporting the endless belt without causing damage to the belt surfaces by maintaining traction sufficient to provide continuous rotation of the wheels with belt movement.

It will be appreciated that while the stationary shaft 180 is shown as being solid, in an alternative embodiment, the stationary shaft 180 may be a hollow tube.

Figure 16:
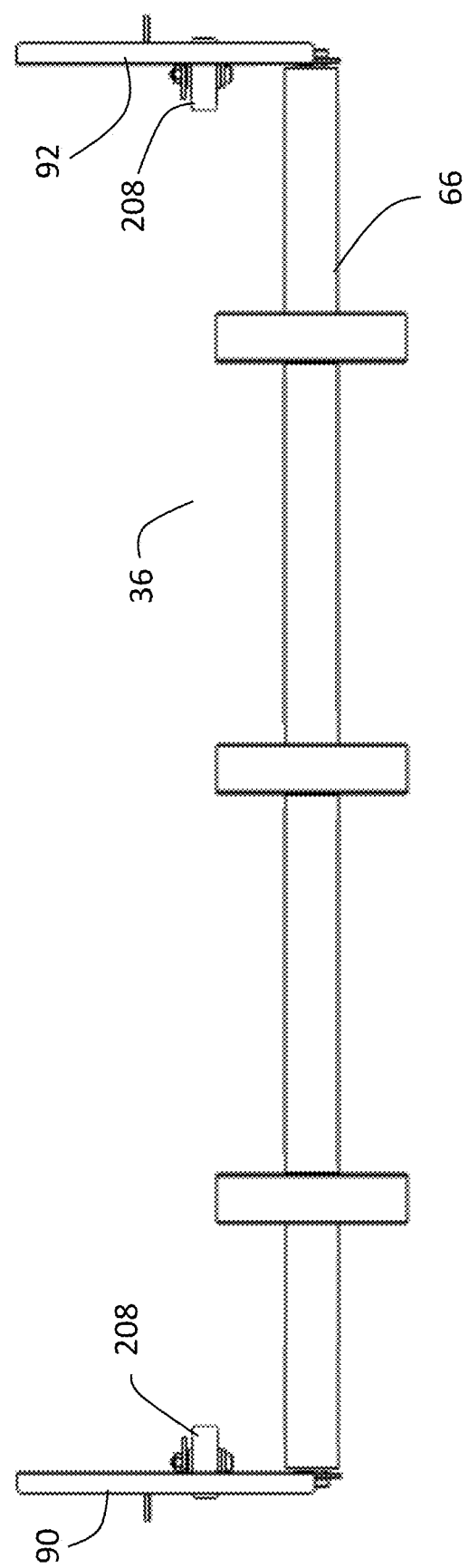
FIG. 16 is an enlarged front view of an alternate embodiment of the guide member, showing the use of side rollers.

In an alternative embodiment, each guide hanger 90 and 92 may additionally include a side roller 208, for example as shown in FIG. 16. The side roller 208 may be a rubber tired wheel similar to the rollers 94 of the guide members 66, and are configured to engage the edge of the endless belt 36, maintaining the endless belt 36 laterally centered relative to the opposing guide hangers 90 and 92.

Figure 17A:
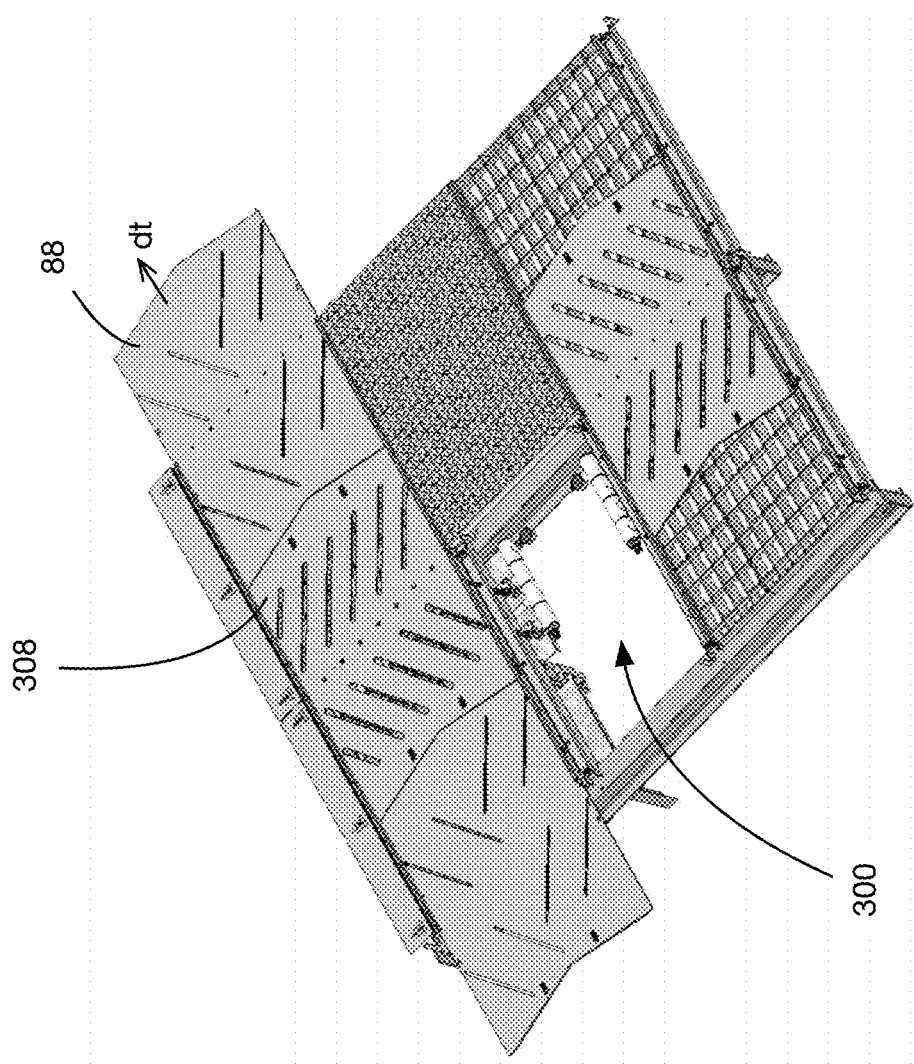
FIGS. 17a-20 show a rinsing system for the conveyor system.
Figure 17B:
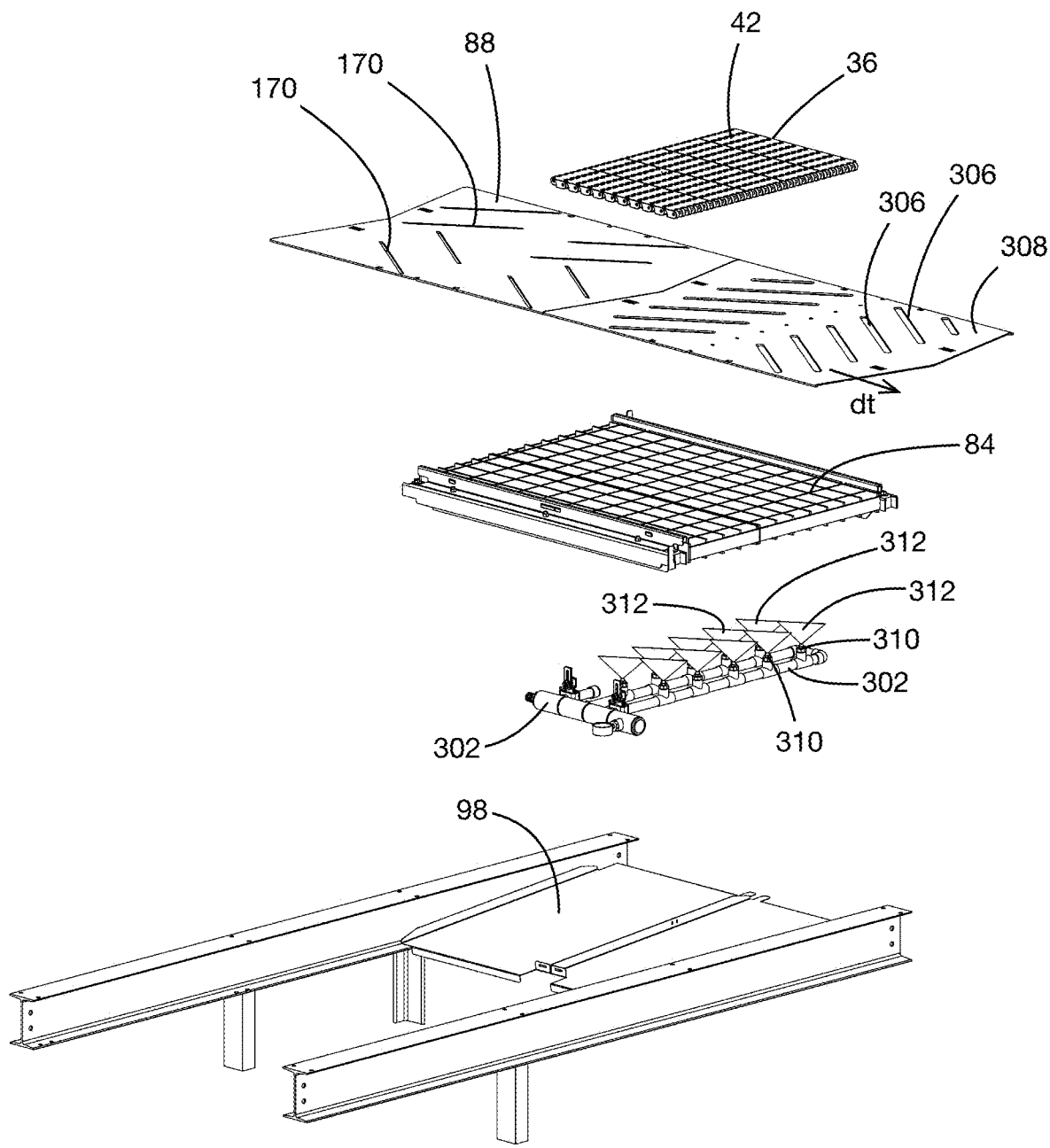
Figure 18:
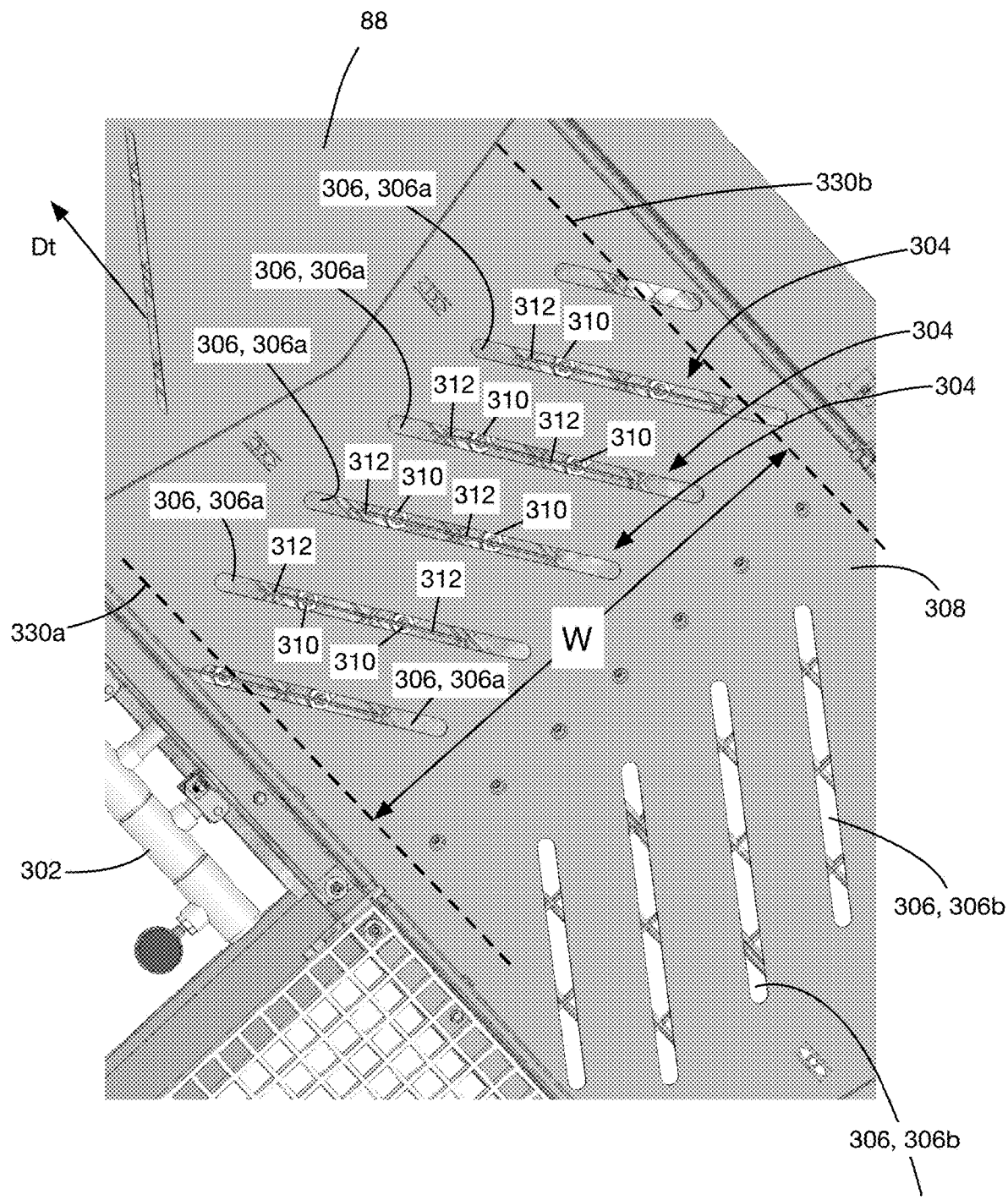

Reference is made to FIGS. 17a-20, which shows the conveyor system 20 with an optional rinsing system 300. The rinsing system 300 includes a rinsing system conduit arrangement 302 (a portion of which is shown in FIGS. 17a and 17b), which is connectable to a source of rinsing system liquid (e.g., a city water supply). The rinsing system 300 further includes at least one belt rinsing arrangement 304. In the present example, the rinsing system 300 includes a plurality of belt rinsing arrangements 304 spaced longitudinally apart for rinsing the upper transport portion 42 of the endless belt 36.

Each belt rinsing arrangement 304 includes a rinsing system dirt pass-through aperture 306 in the support deck 84, over which the upper transport portion 42 of the endless belt 36 travels during operation. As can be seen, in the embodiment shown in FIG. 17a, the rinsing system dirt pass-through aperture 306 is provided in a rinsing system wear plate 308. The rinsing system dirt pass-through aperture 306 may be similar to the debris slots 170 in the wear plates 88, but may be wider in the direction of travel (shown at Dt) of the endless belt 36 for reasons provided below.

Each belt rinsing arrangement 304 further includes at least one rinsing system outlet 310 from the rinsing system conduit arrangement 302 positioned proximate to the rinsing system dirt pass-through aperture 306a and positioned to eject rinsing system liquid (shown at 312 in FIGS. 18 and 19) onto the endless belt 36 upstream from a downstream edge 314 of the rinsing system dirt pass-through aperture 306a in order to capture at least some of the ejected liquid 312 through the rinsing system dirt pass-through aperture 306a. The terms 'upstream' and 'downstream' are both in relation to the direction of travel Dt of the upper transport portion 42 of the endless belt 36. The upstream edge of the rinsing system dirt pass-through aperture 306a is shown at 315. Additional rinsing system dirt pass-through apertures 306b enables the flushing of ejected liquid 312 downstream of the rinsing system dirt pass-through apertures 306a.

Put another way, the rinsing system 70 can rinse off dirt from the endless belt 36 so as to prevent that dirt from causing wear on the belt 36 as the belt 36 moves along during operation. The dirt may be present directly at the sliding interface between the belt 36 and the wear plates 88 and 308. Additionally, the dirt may be present at the pins (shown at 316) that pivotally connect belt segments (shown at 318) that make up the belt 36.

Pockets (shown at 320) are present in the endless belt 36 and some portions of the pins 316 are exposed in the pockets 320. It is therefore beneficial for the rinsing system 300 to be able to eject rinsing system liquid into the pockets 320 to rinse dirt from the pins 316. This inhibits dirt from migrating into the interface between the pins 316 and the associated surfaces of the belt segments 318, which reduces the wear that can occur on the belt segments 318 at that interface. Such wear contributes to ovalizing of the apertures in the belt segments 318 in which the pins 316 reside, causing the belt 36 to lengthen and contributing to accelerated wear and failure of the belt 36.

Thus it may be said that the endless belt includes a plurality of belt segments 318 that are pivotally connected to one another via at least one pin 316 that extends laterally. The endless belt 36 includes at least one pocket 320 that exposes the at least one pin 316. The at least one rinsing system outlet 310 is positioned to eject rinsing system liquid into the at least one pocket 320 onto the at least one pin 316 to remove dirt from the at least one pin 316.

The rinsing system outlet 310 may be any suitable type of outlet that is capable of ejecting rinsing system liquid the distance needed to remove dirt from the endless belt 36. In some examples, the pressure of the rinsing system liquid at the rinsing system outlet 310 may be about 20 psi or higher. In some examples, it may be 40 psi or higher. The rinsing system outlet 310 may, for example, be a nozzle.

Figure 20:
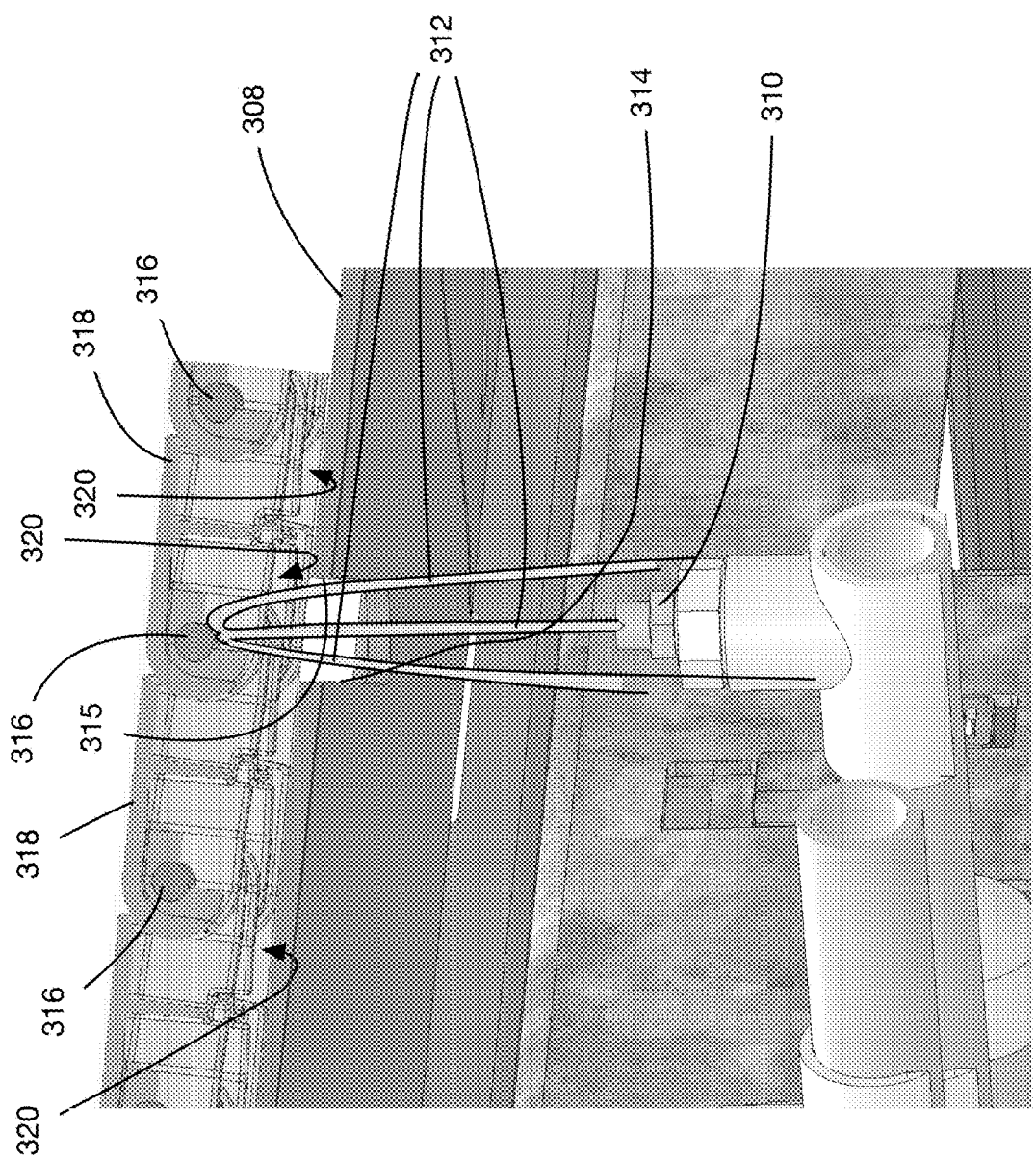

Reference is made to FIG. 20. As can be seen, the rinsing system outlets 310 are positioned below the wear plates 308 and are positioned to eject the rinsing system liquid up through the rinsing system dirt pass-through aperture 306 into the belt 36. The rinsing system dirt pass-through aperture 306 has an elongate cross-sectional shape and is sized to permit the ejecta 312 (i.e., the rinsing system liquid ejected therefrom) to leave upwardly from the rinsing system dirt pass-through aperture 306, to hit the endless belt 36 and to fall through the rinsing system dirt pass-through aperture 306 after hitting the endless belt, bringing dirt with it, as shown in FIG. 20. For example, in the embodiment shown, the outlet 310 is well below the wear plate 308 and so the ejecta 312 pass upwardly through the rinsing system dirt pass-through aperture 306, hit the belt 36 and then fall back down through the aperture 306.

The apertures 306 are shown as being angled, similarly to the apertures (slots) 170 in the wear plates 88, for the purpose of ensuring that segments of the belt 36 are always supported and do not impact against an aperture edge. This is the same reason described for the angle of the slots 170. Similar angular ranges may be used for the orientation (i.e., the angle) of the apertures 306.

As can be seen, each rinsing system outlet 310 is in the form of a fan jet nozzle configured for ejecting rinsing system liquid 312 in the form of ejecta 312 having an elongate cross-sectional shape (e.g., a flat spray pattern).

Figure 19:
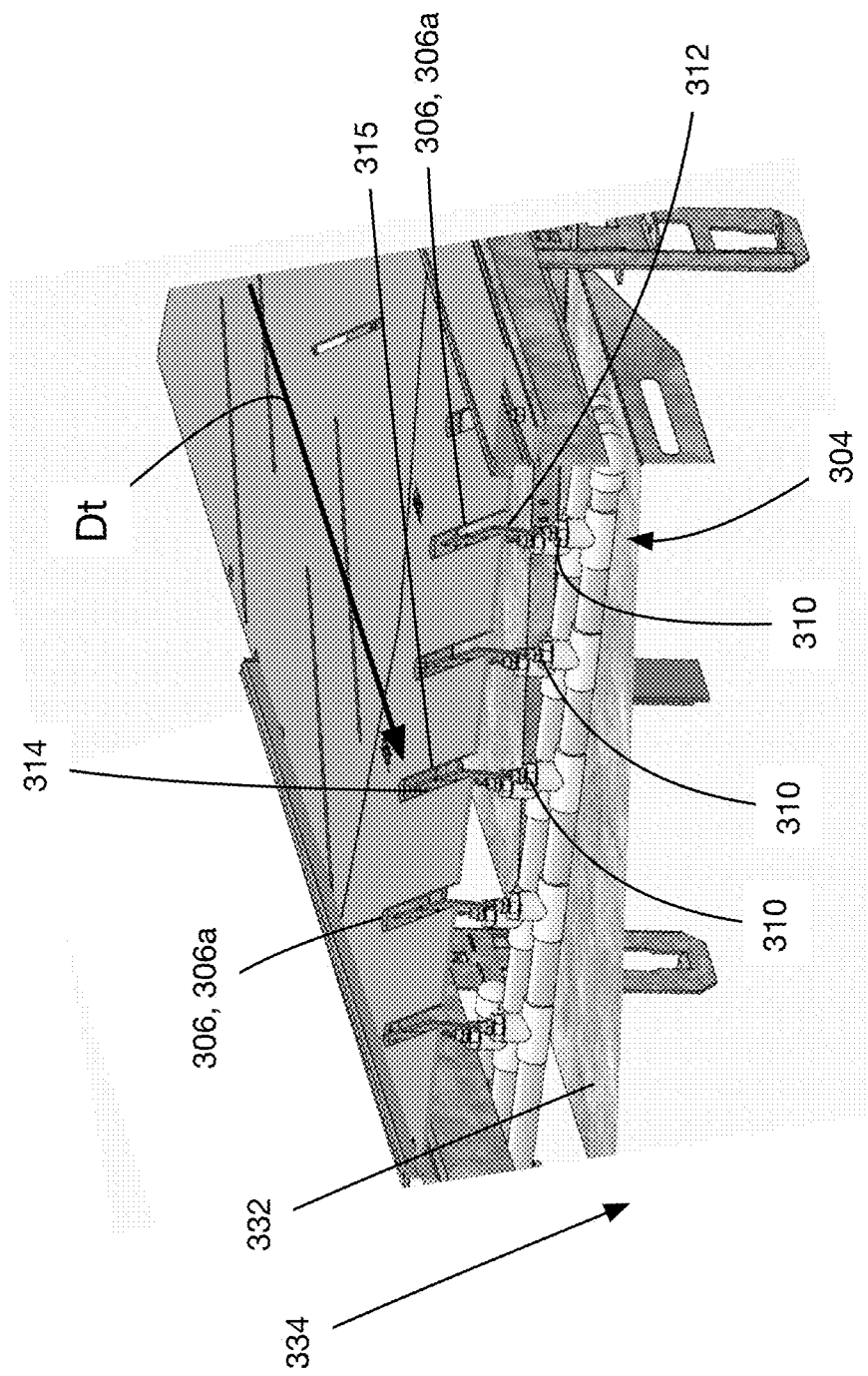

Referring to FIG. 19, dashed lines shown at 330a and 330b represent the side edges of the endless belt 36. The belt 36 has a width W. As can be seen, the at least one belt rinsing arrangement 302 includes enough of the rinsing system outlets 306 to eject rinsing system liquid 312 (i.e., ejecta 312) on the entire width of the belt 36. There is some offset between the apparent position of the ejecta 312 and the position of the side edges 330a and 330b of the belt 36 in the view shown in FIG. 19 however, it will be understood that this is merely a result of the difference in elevation of the outlets 310 and the belt 36.

In FIG. 19, a debris deflector 332 is provided and may be similar to any of the debris deflectors shown and described herein. The debris deflector 332 is positioned underneath the rinsing system dirt pass-through aperture 306 to collect dirt falling through the rinsing system dirt pass-through aperture 306, and sloped downwardly away from the rinsing system dirt pass-through aperture 306 in order to transport collected dirt towards a dirt collection area shown at 334.

Figure 21:
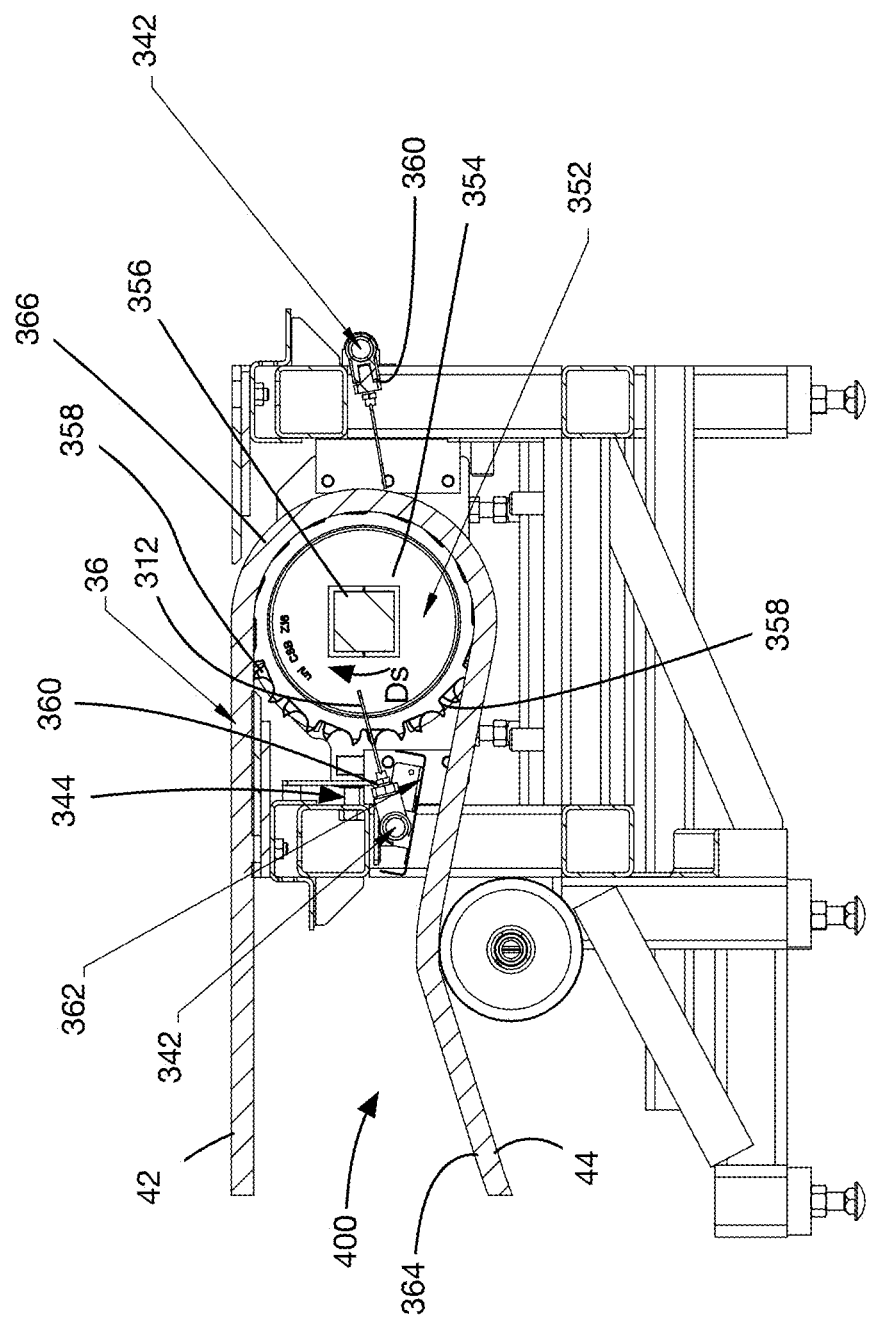
FIGS. 21-25 show a flooding system for the conveyor system.
Figure 22:
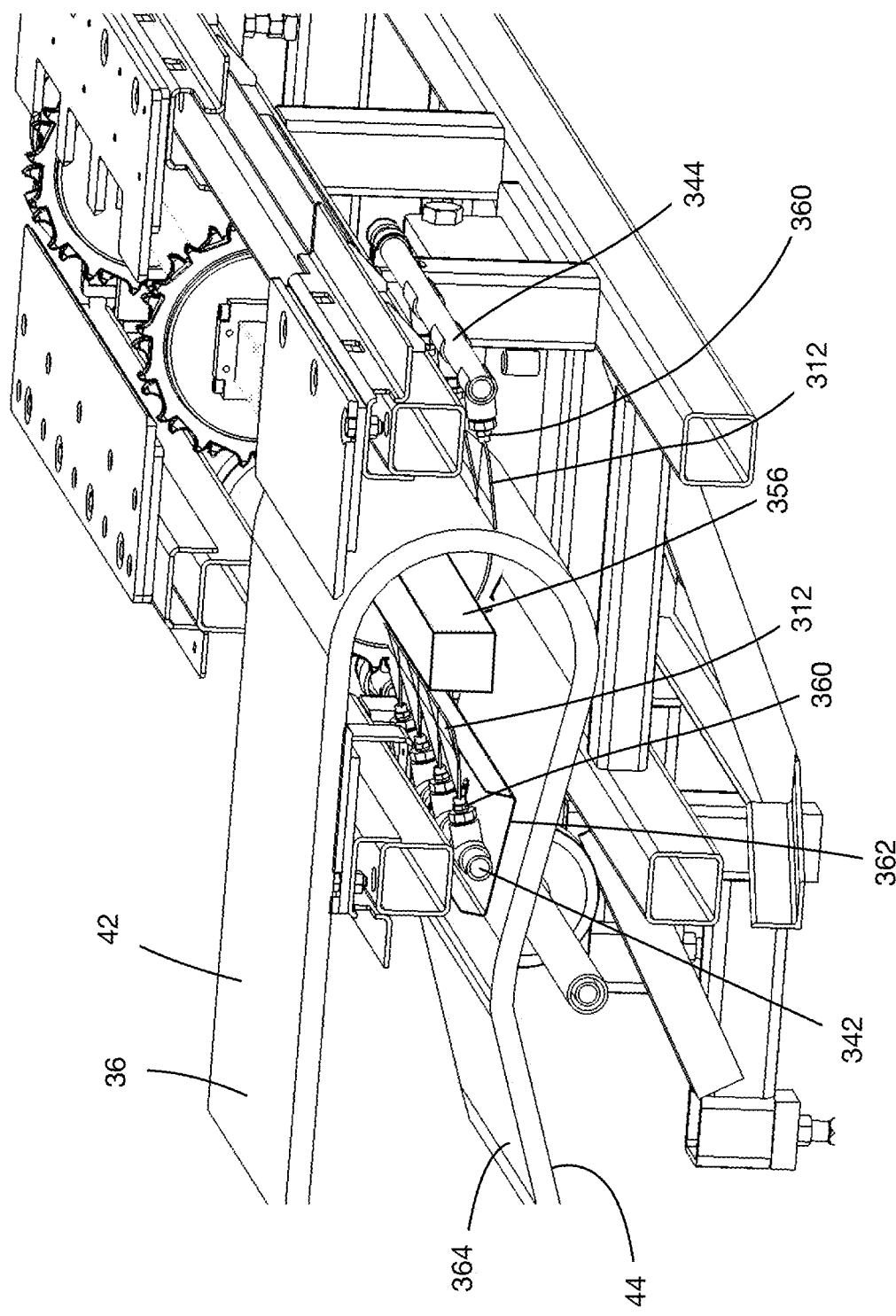

Reference is made to FIGS. 21 and 22, which show another rinsing system 340, which includes a rinsing system conduit arrangement 342 which is connectable to a source of rinsing system liquid (e.g., a city water supply or a reclaim water system). The rinsing system 340 further includes at least one sprocket rinsing arrangement 344 configured to rinse and remove dirt from a sprocket arrangement 352 that is used to drive the belt 36. The sprocket arrangement 352 in the present example includes a plurality of sprockets 354 that are mounted on a drive shaft 356. Alternatively, the sprocket arrangement 352 could include a single sprocket 354.

The drive shaft 356 in the present example is square and passes through square apertures in the sprockets 354, however it will be understood that other shapes for the drive shaft 356 and apertures are possible. The sprocket arrangement 352 has sprocket teeth 358 that engage the belt 36 to drive the belt 36. The direction of rotation of the sprocket arrangement 352 is shown at Ds in FIG. 21.

Each belt rinsing arrangement 344 further includes at least one rinsing system outlet 360 from the rinsing system conduit arrangement 342. The at least one rinsing system outlet 360 is positioned proximate to the sprocket arrangement 352 and is positioned to eject rinsing system liquid 312 onto the sprocket arrangement 352.

As rinsing system liquid 312 is ejected onto the sprocket arrangement 352, it rinses some dirt off a portion of the surface of the sprocket arrangement 352 prior to engagement between that portion of the surface of the sprocket arrangement 352 and the belt 36. As a result, there is less dirt that would cause wear of the belt 36 during engagement with the sprocket arrangement 352. Such wear on the belt 36 can reduce the efficacy of the engagement with the teeth 358 on the sprocket arrangement 352. Additionally, the presence of the dirt itself can inhibit good engagement between the teeth 358 and the belt 36 which can result in increases stresses on certain areas of the belt 36 during such engagement.

A debris collection guide 362 is provided underneath the at least one rinsing system outlet 360 to collect at least some of the liquid that has hit the sprocket arrangement 352 and reflected or dripped off the sprocket arrangement 352 thereafter along with any dislodged dirt or any dirt entrained in the reflected liquid or the liquid that has dripped off the sprocket arrangement 352. The debris collection guide 362 guides collected debris to a debris collection area (not shown).

Some rinsing system liquid 312 may wind up on the lower return portion 44 of the belt 36 instead of in the debris collection guide 362. This is not considered problematic, since the inner surface of the lower return portion (shown in FIG. 21 at 364) does not engage any surfaces with significant force until reaching the idler drum at the other end of the conveyor system 20. Some of the dirt and liquid collected on the inner surface 364 of the lower return portion 44 of the belt 36 will have fallen off the belt 36 by the time it reaches the other end. As noted above, the rinsing system 300 can be provided at the upstream end of the upper transport portion 42 of the conveyor system 10, so as to rinse off dirt thereon prior to a lot of sliding engagement with the wear plates 88.

FIG. 22 is a perspective view of the rinsing system 340, but with the sprocket arrangement 352 removed. As shown in FIG. 22, the rinsing system outlets 360 may be in the form of fan (flat spray) jet nozzles, and may be configured to eject rinsing system liquid 312 in flow patterns that overlap with one another and which are configured to cover the width of the sprocket arrangement 352.

As can be seen in FIGS. 21 and 22, optionally, the rinsing system 340 further includes at least one belt rinsing arrangement including at least one rinsing system outlet 360 positioned to spray rinsing system liquid 312 on the outer face (shown at 366) of the belt 36, to further clean the belt 36 while the belt 36 is engaged with the sprocket arrangement 352.

Figure 23:
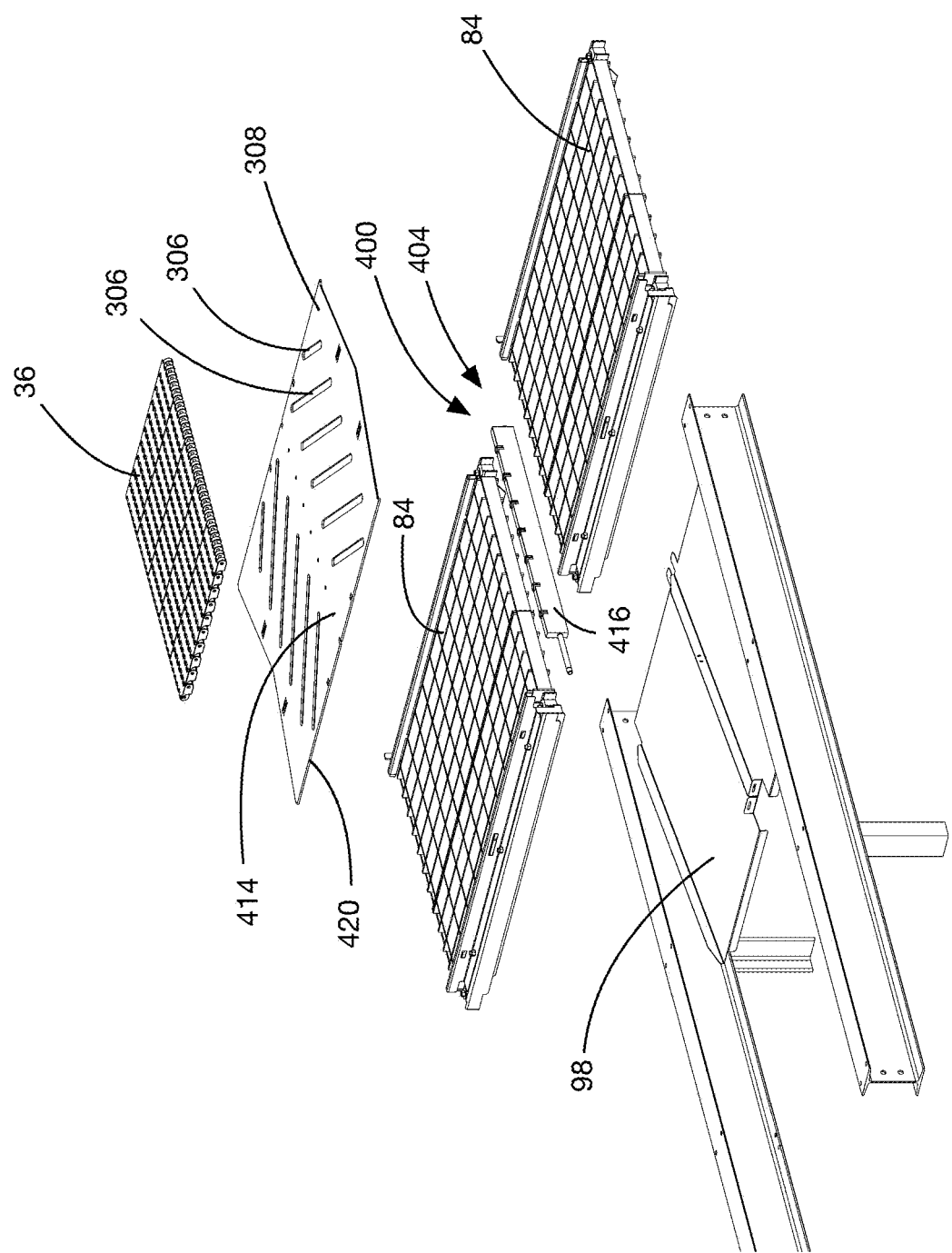
Figure 24:
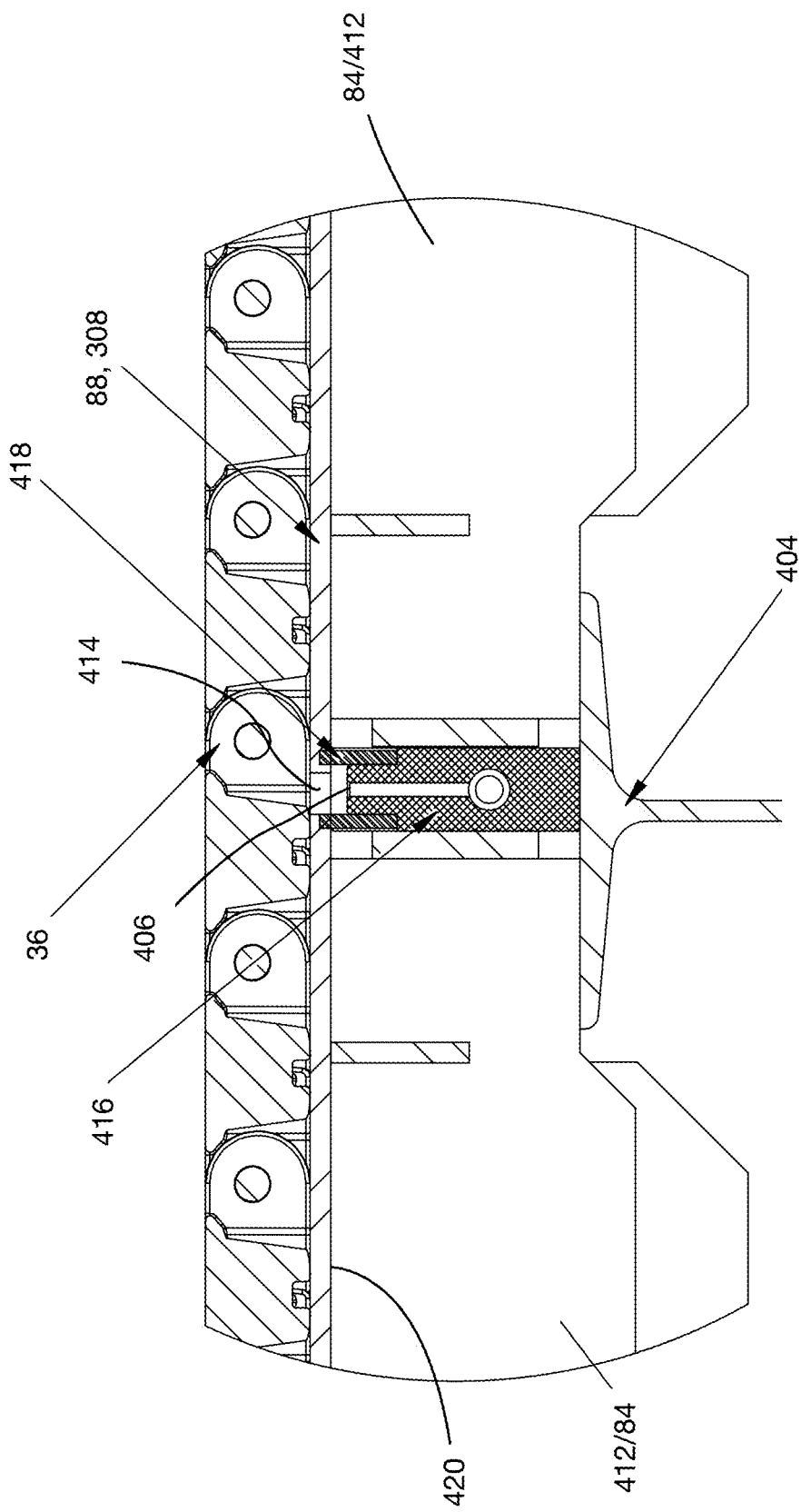
Figure 25:
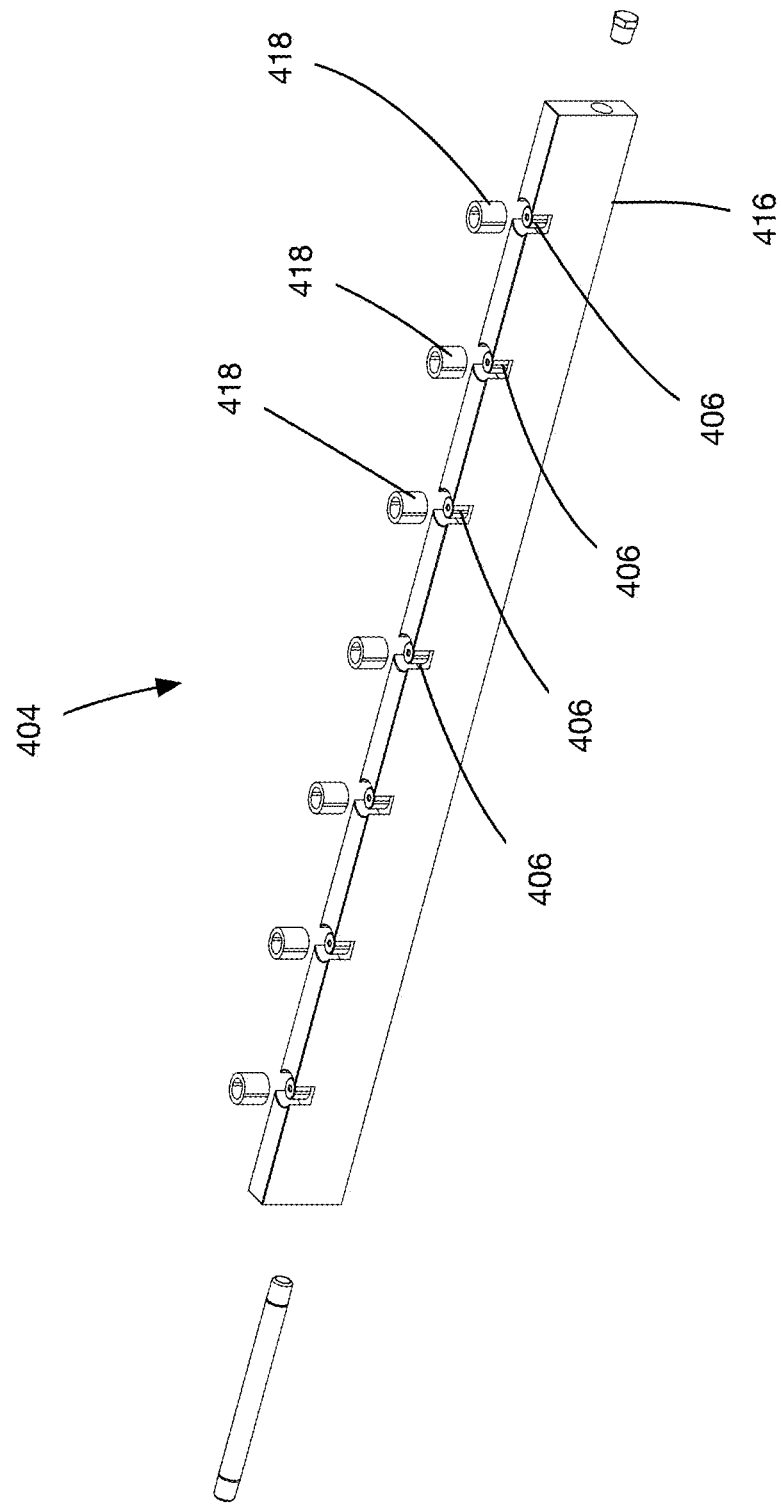

Reference is made to FIGS. 23 and 24, which show a flooder system 400 for the conveyor system 20. The flooder system 400 is used to introduce liquid between the endless belt 36 and the wear plate (e.g., wear plate 88 or wear plate 308). The flooder system 400 includes a flooder system conduit arrangement 402 connectable to a source of flooder system liquid (such as city water, or a source of city water mixed with soap, wax or some other lubricant), and at least one belt flooding member 404. Each belt flooding member 404 includes at least one flooding system outlet 406 (and optionally a plurality of outlets 406 which are spaced apart laterally) from the flooding system conduit arrangement 402. The outlet or outlets 406 are positioned underneath the endless belt 36 and are positioned to introduce flooding system liquid 408 between the endless belt 36 and the wear plate. The liquid 408 introduced helps to reduce friction between the belt 36 and the wear plate 88 or 308 in part by entraining dirt that may be present therebetween.

The liquid pressure at the outlets 406 may be relatively low, lower than the pressure at the outlets 310. For example, the pressure may be about 2 psi, but is preferably higher, such as in the range of 5-10 psi or even higher.

The support deck (e.g., the wear plates 88 and 308) includes a plurality of dirt pass-through apertures as described above. These apertures will permit the dirt and liquid from the flooding system to fall through, thereby removing dirt from the interface between the belt 36 and the wear plates 88 and 308. The flooding system 400 may include a plurality of belt flooding members 404 positioned at selected distances longitudinally from one another, such as, for example, about every 20 to 30 feet from one another. Optionally, each belt flooding member 404 is positioned between gratings 412 that support the wear plate 88 or 308 and thus may act as a spacer between these gratings 412. The gratings 412 need not be gratings and may also be identified more broadly as wear plate support members 412. The wear plate 88 or 308 has flooding system apertures 414. Each flooding member 404 may include a bar 416 that acts as a manifold and that has a plurality of outlets 406 thereon. The flooding member 404 may further include seal members 418 (e.g., rubber bushings) that are positioned between the outlets 406 and the underside (shown at 420) of the wear plate 88 or 308 to form a seal therebetween.

Figure 26A:
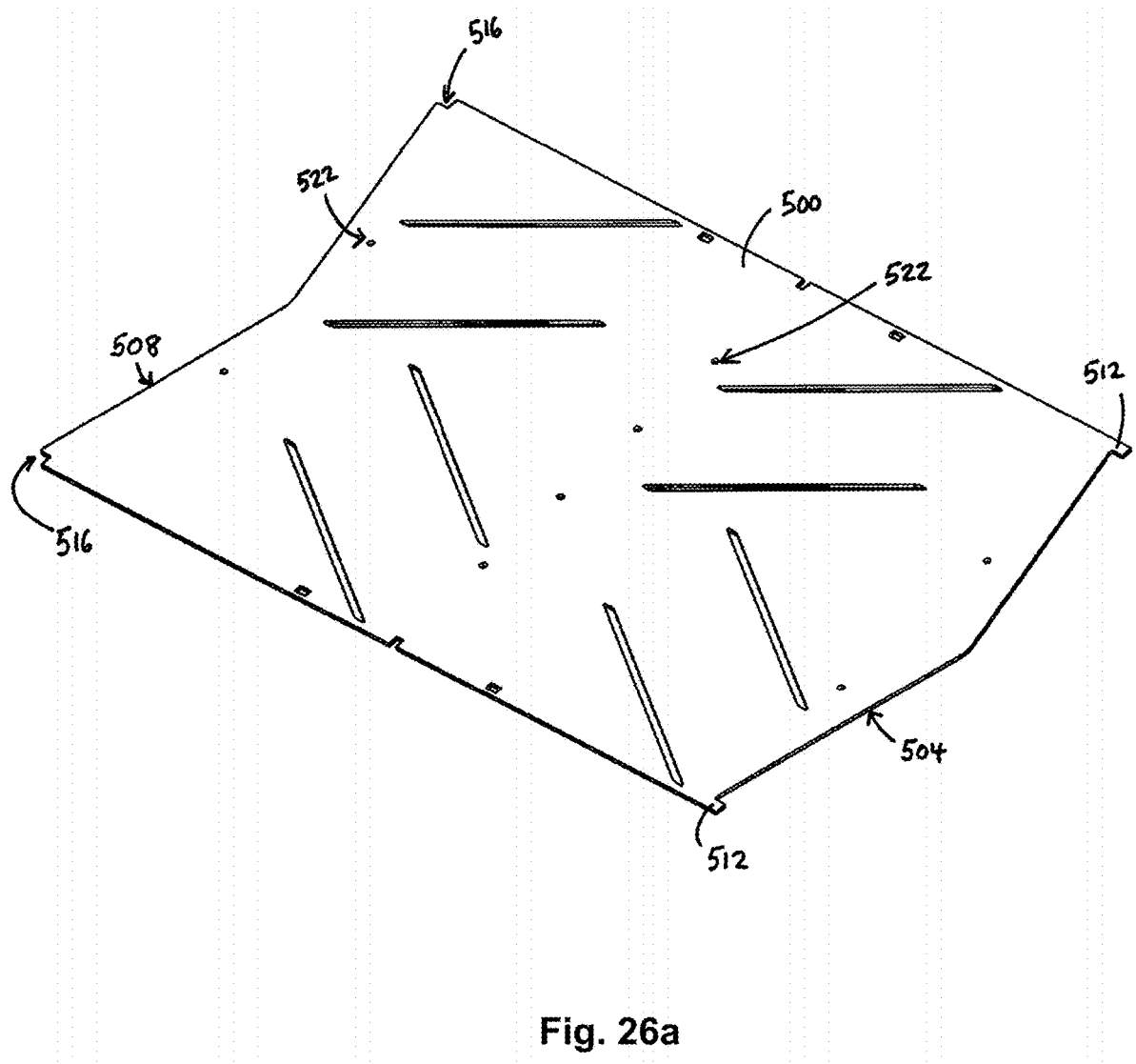
FIGS. 26a-26c show wear plates according to an alternative embodiment.
Figure 26B:
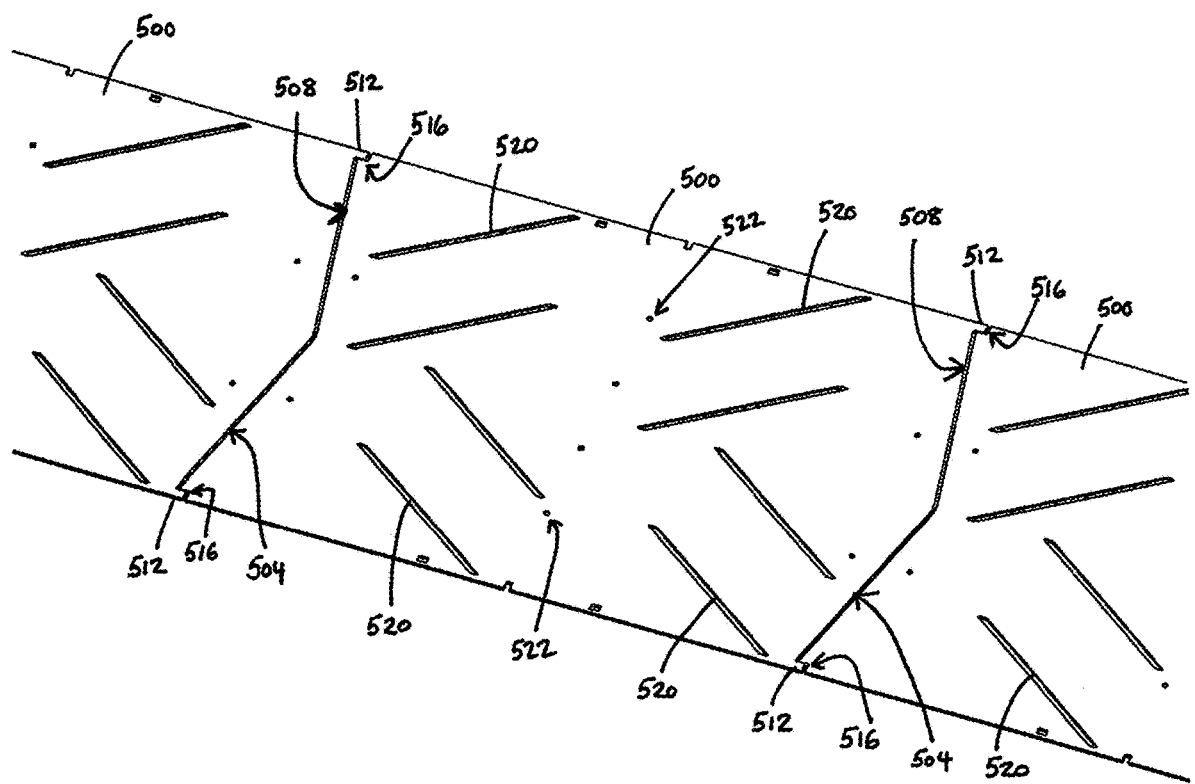
Figure 26C:
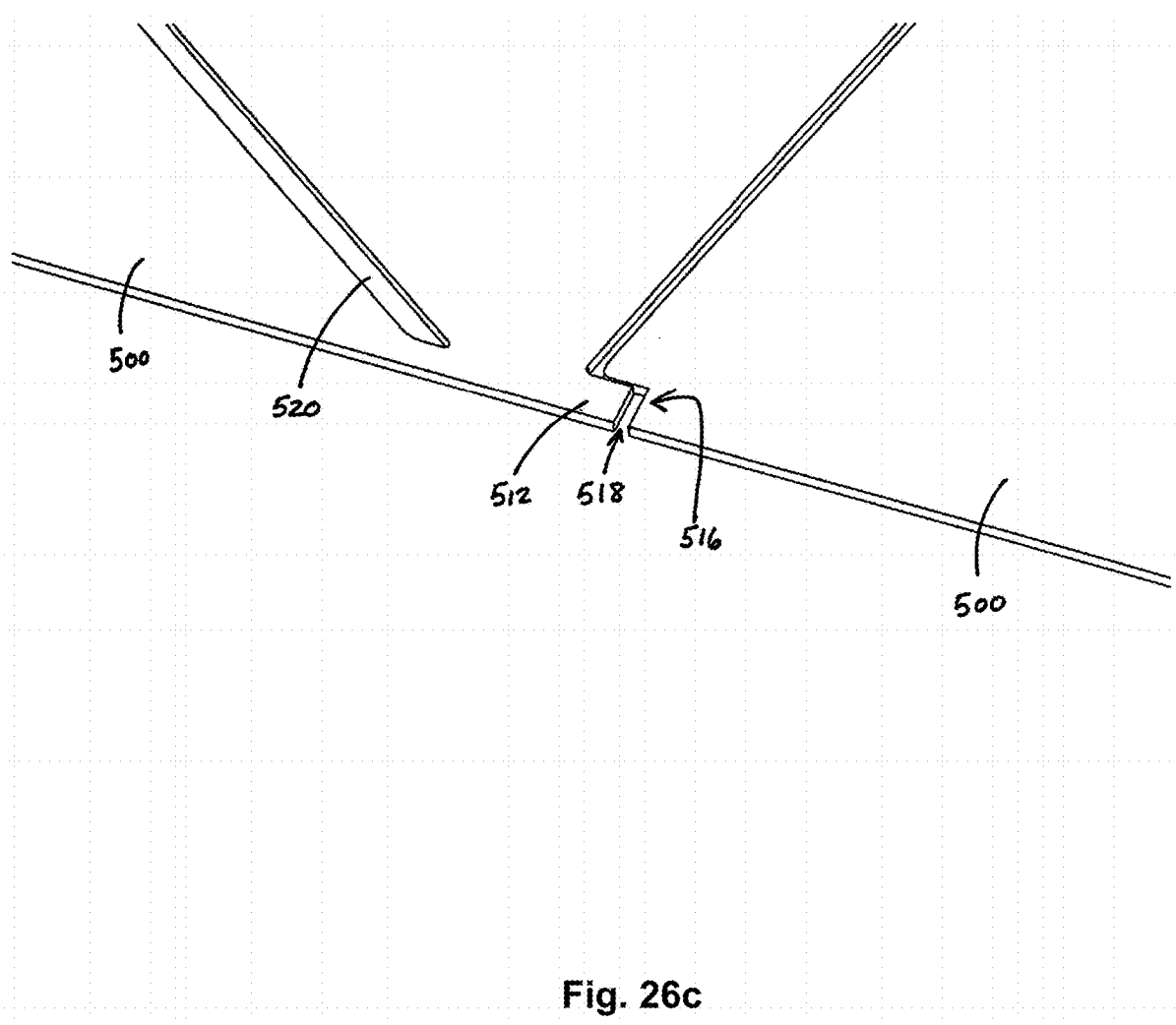

FIGS. 26a to 26c show wear plates 500 in accordance with another embodiment. The wear plates 500 are similar in size and construction to wear plates 88 shown in FIGS. 10, 11, 17a, and 17b. In particular, each of the wear plates 500 includes a leading edge 504 and a trailing edge 508, wherein the leading and trailing edges 504 and 508 are provided with complementary profiles to facilitate fit and alignment between adjacently positioned wear plates 500. In the embodiment shown, the complementary profile is provided generally in the form of a chevron aligned to the direction of travel of the vehicle through the wash tunnel. At least one of the leading and trailing edges 504 and 508 of the wear plates 500 may be chamfered to reduce the likelihood of wear upon the endless belt.

Like the wear plates 88, the wear plates 500 expand and contract with temperature changes. To allow for this expansion and contraction, the wear plates 500 are secured via fasteners inserted through fastener holes 522 that fit within slotted holes of the modular grid panels of the support deck. This arrangement allows a degree of freedom of movement (or, more to the point, expansion) of the wear plates 500. It can also be desirable to maintain the leading and trailing edges 504 and 508 in lateral alignment to avoid changes in the lateral profile of the belt contact surface (i.e., the wear plates 500) in the longitudinal direction that can serve to more quickly wear and/or damage the endless belt.

To this end, the wear plates 500 have mating features inhibiting lateral shifting of the wear plates 500 relative to one another in the form of fingers 512 that extend longitudinally (i.e., generally along the direction of travel of the endless belt) forward from lateral ends of the leading edges 504, and corresponding finger recesses 516 that extend longitudinally from lateral ends of the trailing edges 508. The fingers 512 mate with the finger recesses of adjacent wear plates 500 to maintain the wear plates 500 in lateral alignment while the wear plates 500 expand to reduce an expansion gap 518 between the wear plates 500, and contract.

In other embodiments, the fingers can extend longitudinally from the trailing edge and mate with corresponding finger recesses of the leading edge of an adjacent wear plate. Alternatively, a finger and a recess can be located on opposite lateral ends of each leading and trailing edge and mate with the corresponding features of adjacent wear plates. Other types of mating features that inhibit lateral shifting of the wear plates will occur to those skilled in the art.

The wear plates 500 also have debris slots 520 that permit the evacuation of debris therethrough, so as to reduce the accumulation of debris between the endless belt and the wear plates 500.

Figure 27A:
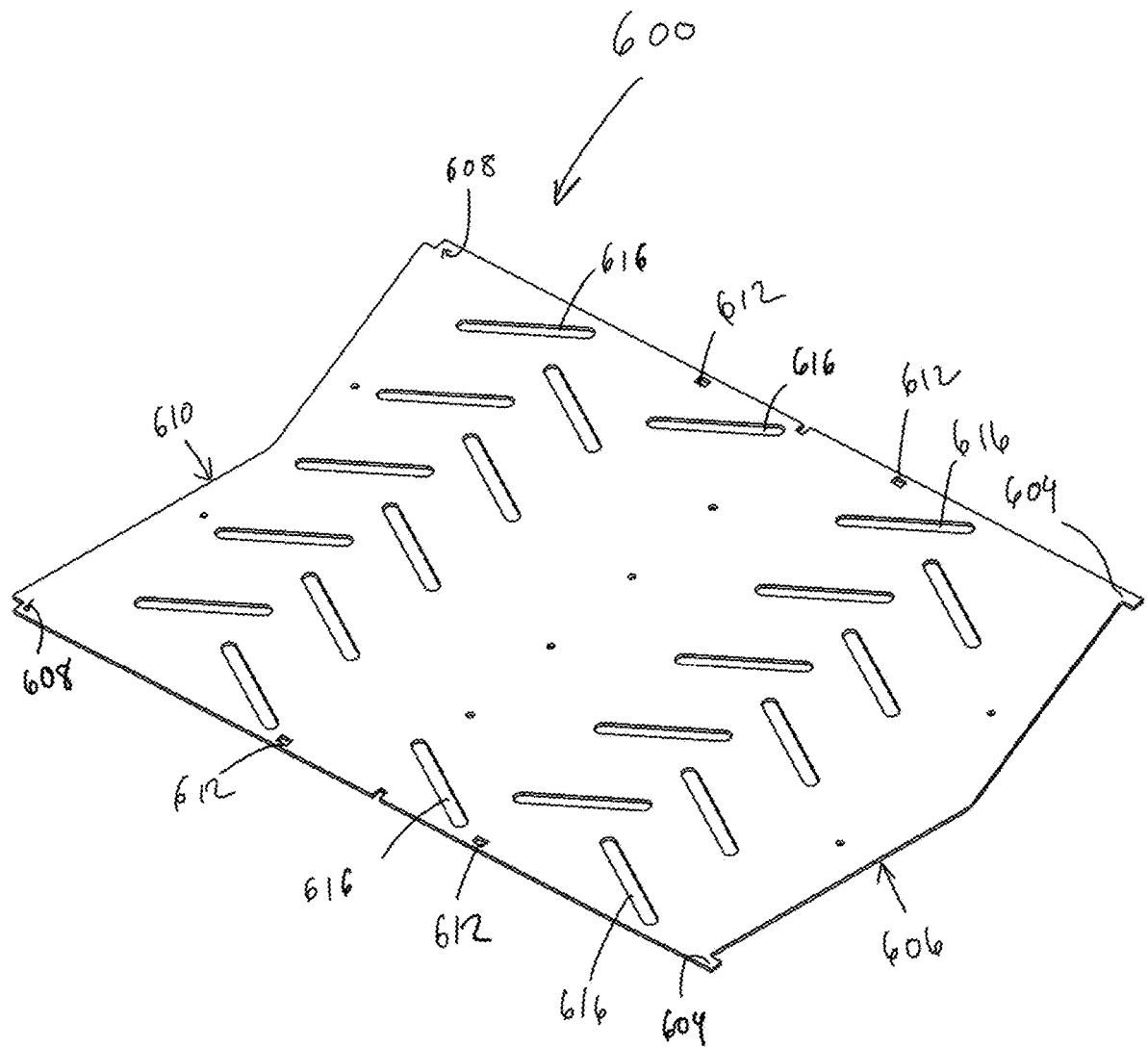
FIGS. 27a and 27b show wear plates according to other alternative embodiments.
Figure 27B:
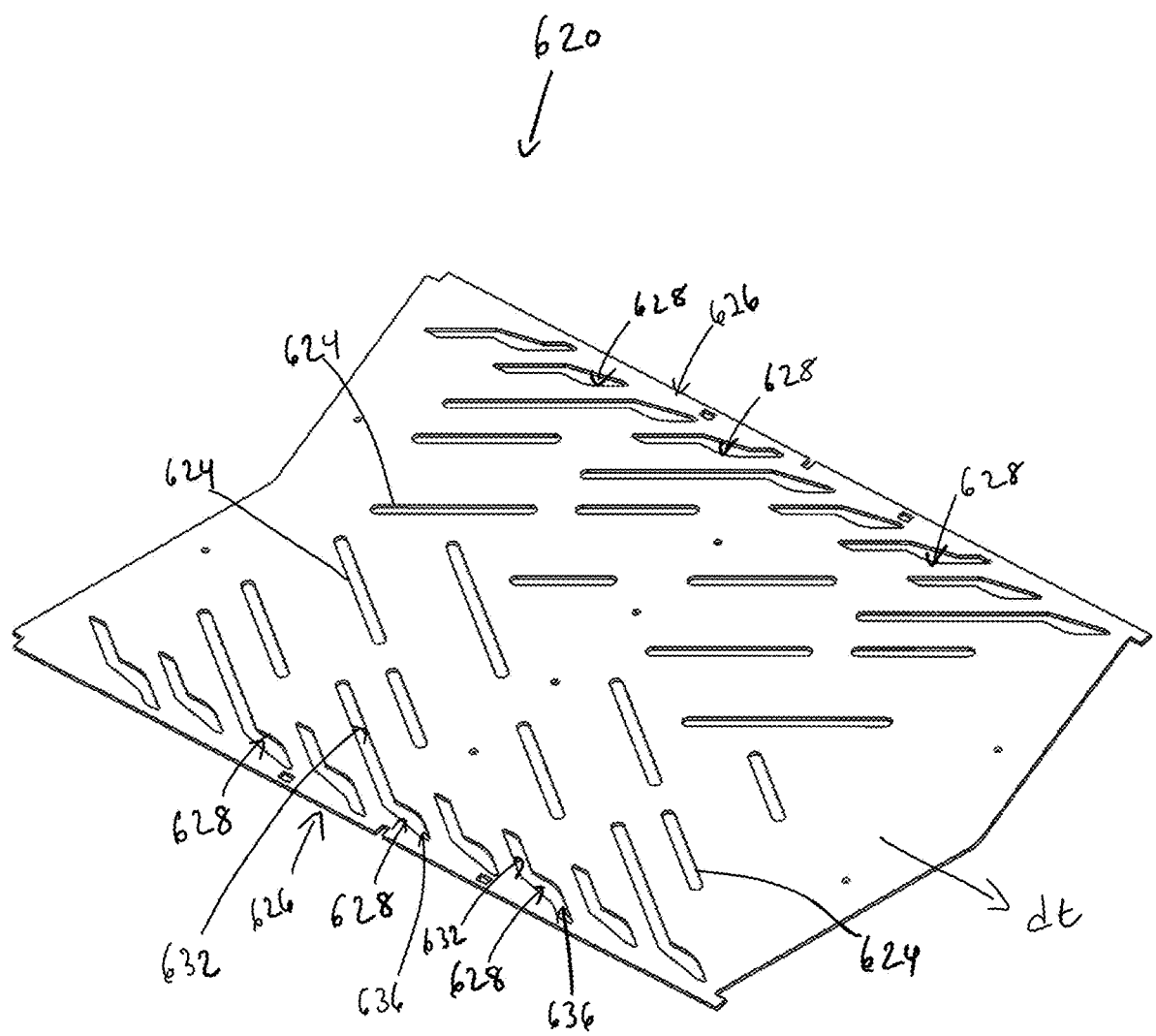

FIGS. 27a and 27b show two variants of the design of the wear plates. A wear plate 600 shown in FIG. 27a has fingers 604 that extend longitudinally (i.e., generally along the direction of travel of the endless belt) forward from lateral ends of the leading edge 606, and corresponding finger recesses 608 that extend longitudinally from lateral ends of the trailing edge 610. The fingers 604 mate with the finger recesses of adjacent wear plates 600 to maintain the wear plates 600 in lateral alignment while the wear plates 600 expand to reduce an expansion gap between the wear plates 600, and contract. A set of four locating slots 612 are positioned two along each lateral side of the wear plate 600. The wear plate 600 has a pattern of debris slots 616 that differs from those shown in the previous figures. In particular, the debris slots 616 are wider and shorter, enabling ample drainage without significantly affecting the structural integrity of the wear plate 600. That is, there are no portions of the wear plate 600 that are connected to the remainder of the wear plate 600 only by narrow sections.

A wear plate 620 shown in FIG. 27b has similar features to the wear plate 600 of FIG. 27a, but has different pattern of varying dimensioned debris slots. A first set of longitudinal debris slots 624 are generally rectangular with rounded corners, similar to the debris slots described and illustrated above, and are located centrally between the lateral sides 626 of the wear plate 620. A second set of peripheral debris slots 628 extend adjacent to the lateral sides 626 of the wear plate 620. Each of the peripheral debris slots 628 has a longitudinal portion 632 extending along a similar direction as the longitudinal debris slots 624, and a lateral portion 636 that deviates from the longitudinal portion 632 and extends along the travel direction dt of the belt. It has been found that, in some cases, debris travels down the lateral sides of the endless belts and gets underneath between the endless belt and the wear plates. The peripheral debris slots 628, and their lateral portions 636 in particular, assist in quickly flushing away this debris to reduce its chances of lingering between the endless belt and the wear plate 600.

Figure 28:
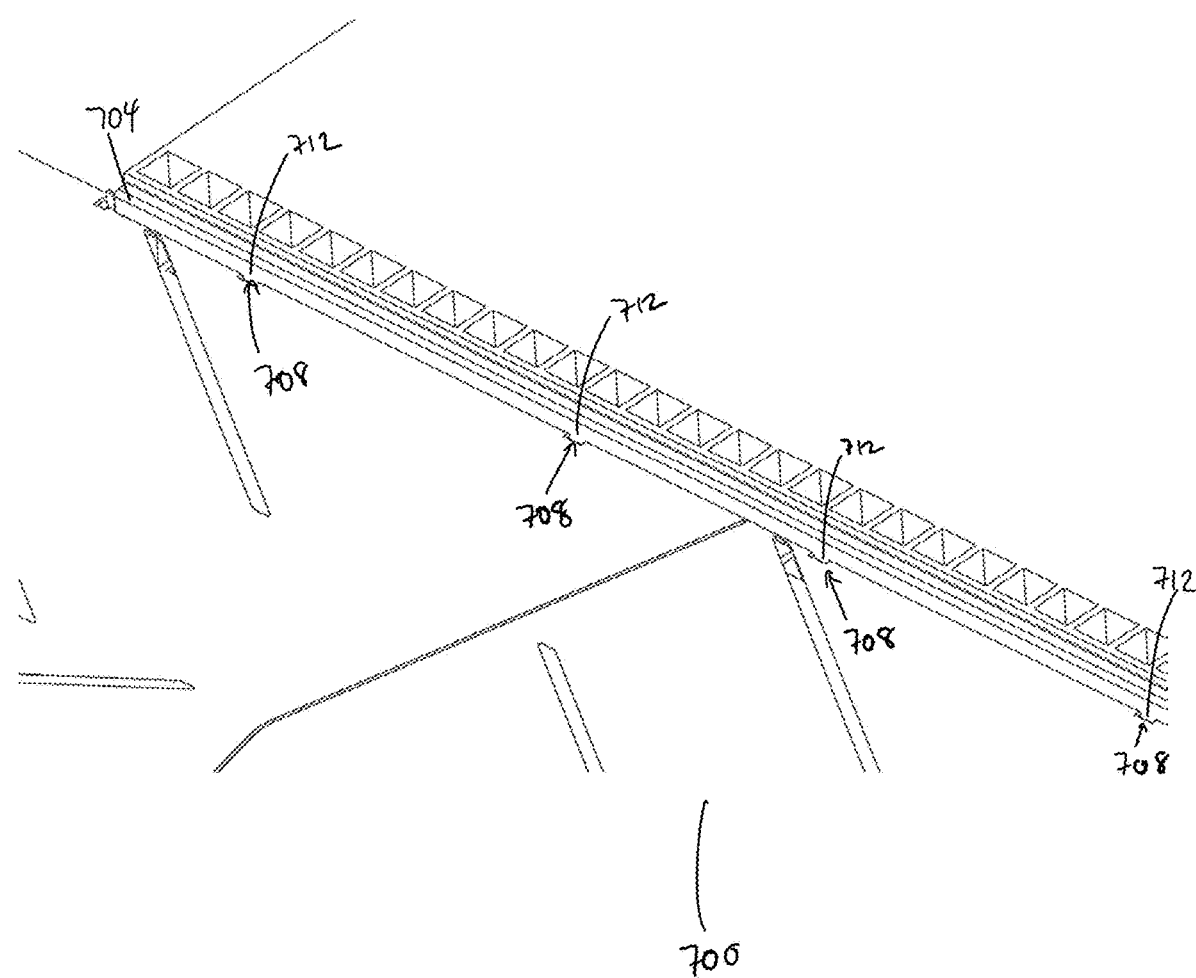
FIG. 28 shows the mating features of edge guides and wear plates according to an alternative embodiment.

FIG. 28 shows locating features of a wear plate 700 and an edge guide 704 that assist with maintaining the correct alignment of the wear plates 700 while enabling them to expand and contract as a result of fluctuations in the operating temperature. The wear plates 700 have locating slots 708 along their lateral edges. The edge guide 704 is made of 14 gauge stainless steel that has a curved profile, enabling it to be deflected as the wear plates 700 are being positioned. Locating tabs 712 of the edge guide 704 mate with the locating slots 708 of the wear plates 700. The size of the locating tabs 712 and the locating slots 708 are selected to enable the wear plates 700 to expand and contract.

FIGS. 29a and 29b are top perspective views of a debris deflector 800 for a conveyor system in accordance with another embodiment. The debris deflector 800 acts much like the debris deflector 98 of FIG. 4 or the debris deflector 198 of FIG. 5, and provides a barrier to protect lower return portion of an endless belt from debris falling from the support deck that supports an upper conveying portion of the endless belt, in particular where the support deck is provided in the form of the modular grid panels. The debris deflector 800 is generally mounted on an angle directed downwardly towards the longitudinal centerline of the service line. A debris deflection surface 804 of the debris deflector 800 is typically planar and performs the task of catching and directing debris towards a longitudinal centerline of the service line as a result of the debris deflector 800 being mounted on an angle, with an upper end 808 of the debris deflection surface 804 being elevated above a lower end 812 thereof. Two debris guides 816 extending between the upper end 808 and the lower end 812 direct debris towards the lower end 812 (that is, the elimination end of the debris deflector 800 towards which debris migrates primarily as a result of gravity). The debris deflector 800 has a mounting tab 820 towards and recessed from the upper end 808, and an angled flange 824 towards and recessed from the lower end 812. The angled flange 824 has a mounting slot 828 that is generally parallel to the plane of the debris deflection surface 804.

The debris deflector 800 is formed from a single piece of aluminum, but may be formed from other suitable materials, such as galvanized steel, stainless steel, molded plastic, fiberglass, etc.

As will be readily understood, while the debris deflector 800 is shown having a particular configuration, the debris deflector 800 can also be made so that it is a mirror image of the debris deflector illustrated in FIGS. 29a and 29b.

FIGS. 30a and 30b shows a lateral bracket support 832 for use with the debris deflector 800. A plurality of lateral bracket supports 832 extend along the longitudinal length of the service line, coupled to the two inner support rails and two outer support rails, thereby forming lateral frames for supporting various components. The inner support rails are generally positioned symmetrically about the longitudinal centerline of the service line, while the two outer support rails are situated proximal to the longitudinal walls of the trench. The lateral bracket supports 832 forming the inner support rails and the outer support rails may be fixedly attached in place by rivets, threaded fasteners (e.g., bolts), metallurgic bonding (e.g., welded attachment), or any other suitable means to achieve a secure attachment.

The lateral bracket support 832 has a set of pins 836 along its top surface for engaging the support rails. A support face 840 that sits generally vertically when the lateral bracket support 832 is installed has a pair of bracket support slots 844 for supporting a mounting bracket. The bracket support slots 844 have a wider upper portion 848 and a narrower lower portion 852.

A mounting bracket 856 for use with the lateral bracket support 832 is shown in FIGS. 31a and 31b. The mounting bracket 856 is die-formed from a single sheet of galvanized steel, but can also be formed of another suitable material, such as stainless steel, aluminum, injection-molded plastic, etc. A generally planar main plate 860 of the mounting bracket 856 is reinforced against flexure via a reinforcement flange 864. The mounting bracket 856 has a pair of connector tabs 868 that extend from and parallel to the main plate 860 of the mounting bracket 856 at their ends, resulting in a gap 872 between the connector tabs 868 and the main plate 860. A locking tab 876 is positioned below the connector tabs 868, and, in an undeployed state, is co-planar with the main plate 860. A forming slot 880 is positioned towards the end of the locking tab 876, and a flexure slot 884 is positioned at the base of the locking tab 876.

Two horizontally oriented tab slots 888 are positioned side-by-side below the locking tab 876. Below the two tab slots 888 are two debris deflector securement tabs 892 that have been deflected to extend orthogonally to the main plate 860 of the mounting bracket 856. A return roller assembly pass-through 894 is positioned under the two debris deflector securement tabs 892.

A return roller assembly slot 896 is positioned towards a lower end of the mounting bracket 856. The return roller assembly slot 896 is wider at its upper end 900 and narrows towards its lower end 904. A return roller assembly rest 908 is formed from a deflected tab at the bottom of the return roller assembly slot 896 and has a pin through-hole 912 extending through it.

Figure 32B:
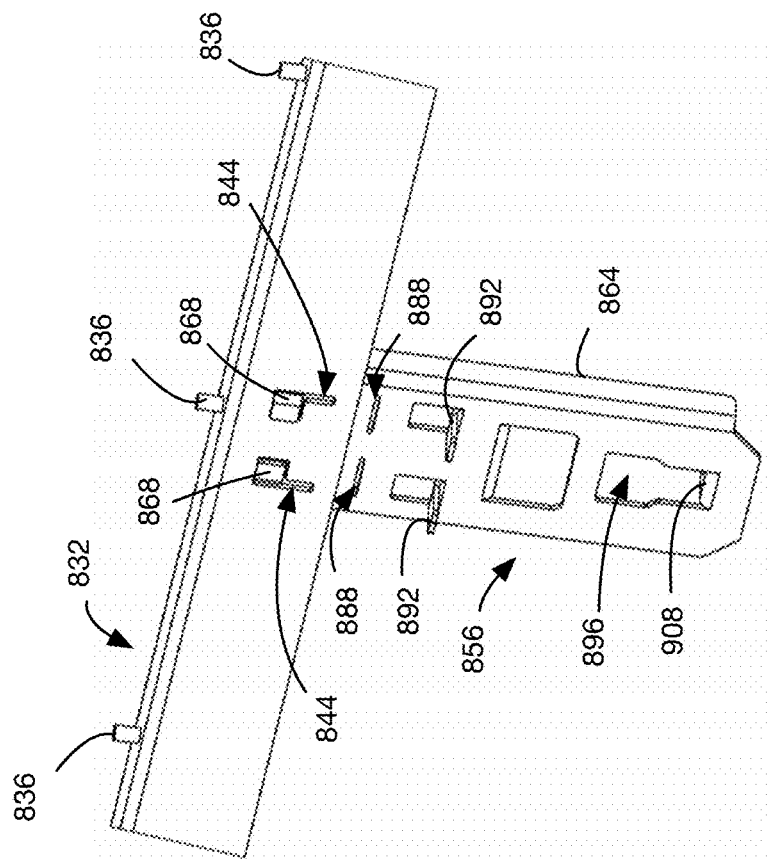
FIGS. 32a to 32f show the connecting and securing of the mounting bracket of FIGS. 31a and 31b to the lateral bracket support of FIGS. 30a and 30b.
Figure 32A:
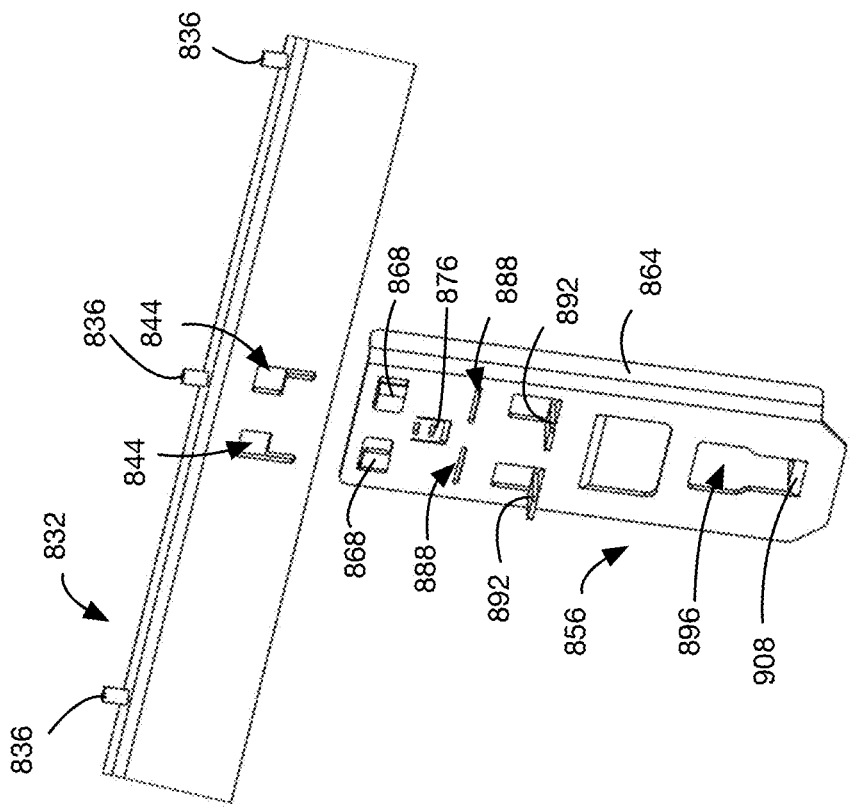
Figure 32C:
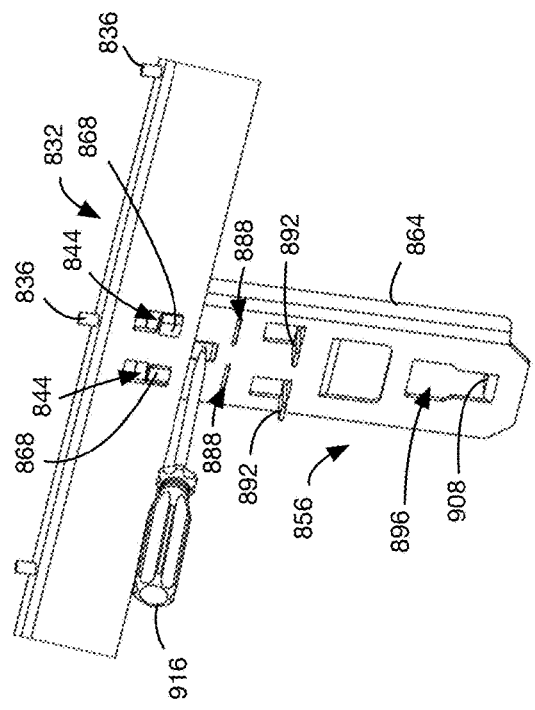
Figure 32F:
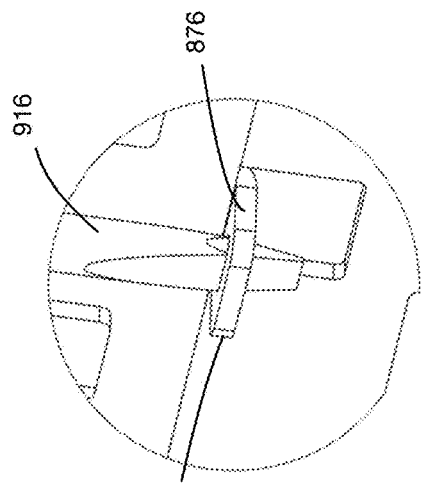
Figure 32D:
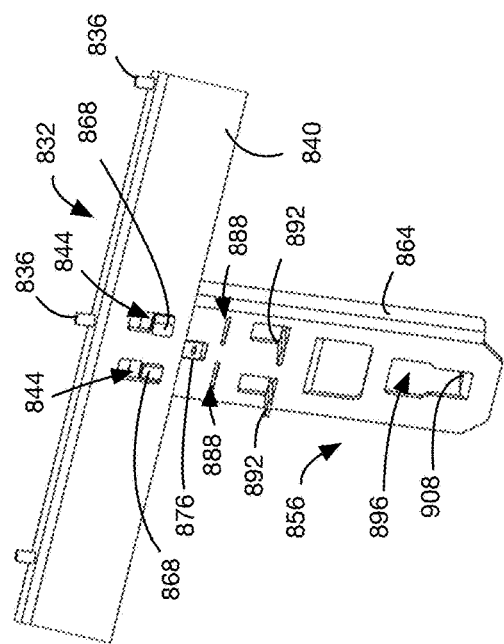
Figure 32E:
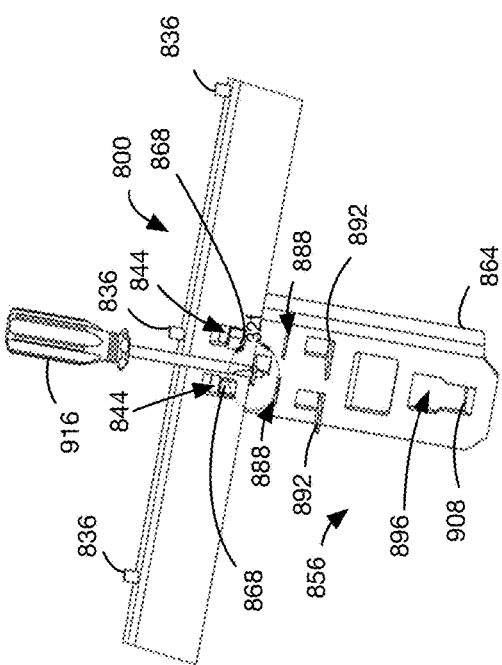

The connecting and securing of the mounting bracket 856 to the lateral bracket support 832 is shown in FIGS. 32*a* to 32*f*. Once the lateral bracket supports 832 are secured on both sides of the trenches, the mounting brackets 856 can be secured to them along a first side. In FIG. 32*a*, the connector tabs 868 of the mounting bracket 856 are shown being aligned with the bracket support slots 844 of the lateral bracket support 832. The mounting bracket 856 is oriented so that the debris deflector securement tabs 892 extend towards the corresponding opposing lateral bracket support 832. Where the lateral bracket support 832 is coupled to one of the outer support rails, the mounting bracket 856 is oriented so that the connector tabs 868 extend to the adjacent inner support rail, and vice versa. The connector tabs 868 are then inserted through the wide upper portion 848 of the bracket support slots 844, as shown in FIG. 32*b*. Once the connector tabs 868 are inserted through the bracket support slots 844, the mounting bracket is slid downwards so that the connector tabs 868 pass through the narrower lower portion 852 of the bracket support slots 844, as shown in FIG. 32*c*. In this position, the connector tabs 868 engage the support face 840 of the lateral bracket support 832. A flat-head screwdriver 916 is then inserted into the forming slot 880 of the locking tab 876 as shown in FIG. 32*d*, and the handle of the flat-head screwdriver 916 is pivoted upwards to deflect the locking tab 876 under the bottom of the lateral bracket support 832 as shown in FIGS. 32*e* and 32*f*. The flexure slot 884 decreases the force required to deflect or bend the locking tab 876. Once the locking tab 876 is deflected under the bottom of the lateral bracket support 832, upward travel of the mounting bracket 856 is prevented, thus constraining the locking tabs 868 to the narrower lower portion of the bracket support slots 844 that prevent their exit to effectively lock the mounting bracket 856 in place relative to the lateral bracket support 832.

Figure 33A:
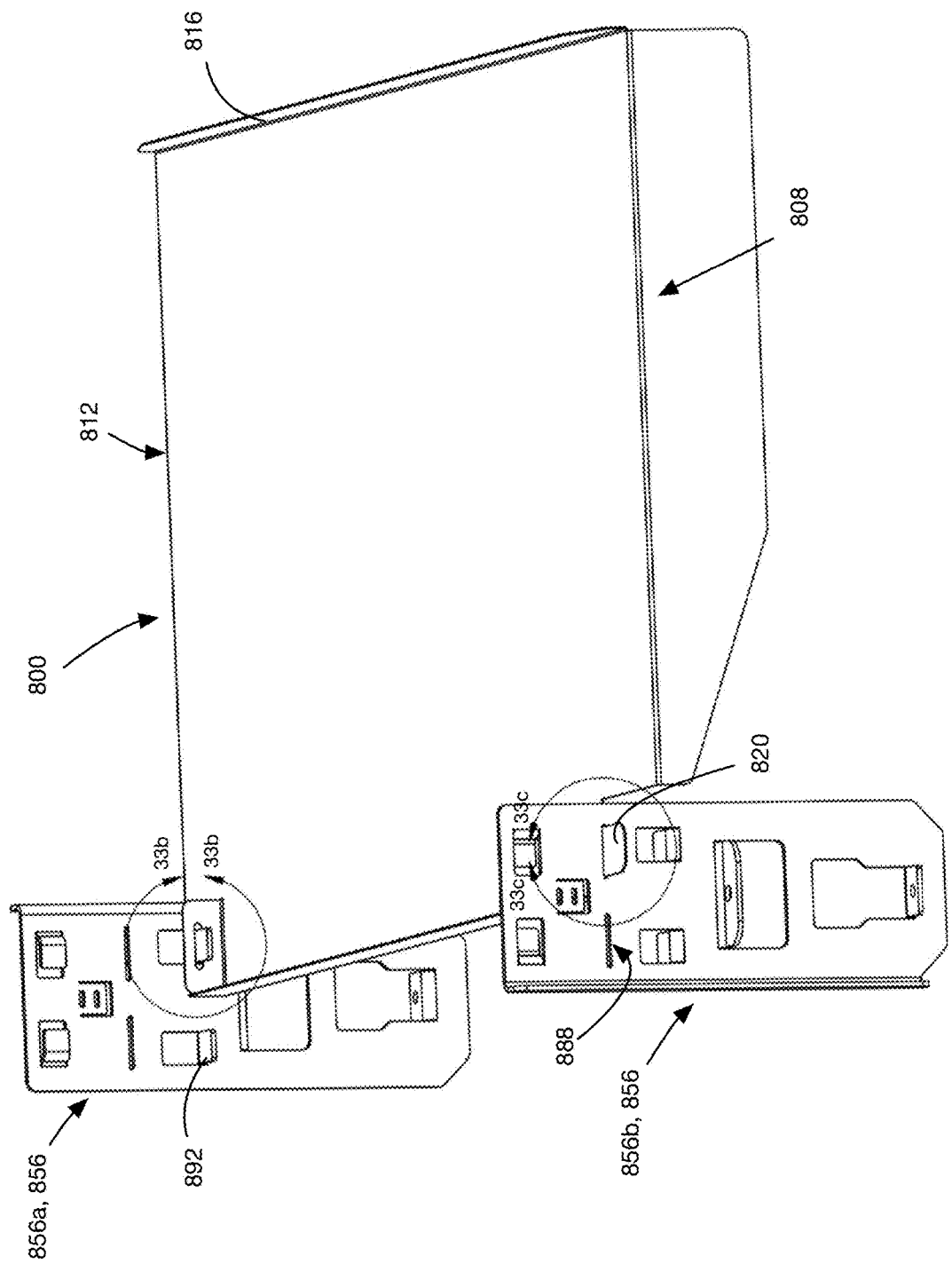

FIGS. 33*a* to 33*e* show the installation and securing of the debris deflector 800 to the mounting brackets 856. A first of the mounting brackets 856*a* is secured to a lateral bracket support 832 coupled to the outer support rail. The debris deflector 800 is then positioned such that a corresponding one of the debris deflector securement tabs 892 of the mounting bracket 856*a* that is secured to the lateral bracket support 832 is inserted through the mounting slot 828 of the debris deflector 800, as is shown in FIG. 33*b*.

While not shown, a second debris deflector 800 that is a mirror image of the shown debris deflector 800 is also positioned to insert the other debris deflector securement tab 892 of the mounting bracket 856*a* through the mounting slot 828 of the second debris deflector 800. Adjacent debris deflectors 800 abut to provide sealing contact between them, thereby constraining debris to be caught by one of the two debris deflectors 800. The longitudinal length of the debris deflectors 800 is selected such that two debris deflectors 800 span longitudinally between each pair of mounting brackets 856 secured to a corresponding pair of inner lateral support rails and outer support rails and provide a contiguous arrangement to protect the return portion of the endless belt from debris falling from above; that is, from or around the upper transport portion of the endless belt.

The mounting tab 820 of each of the two debris deflectors 800 are then inserted into a corresponding one of the tab slots 888 of the mounting bracket 856*b* that is not yet attached to the other lateral bracket support 832, as is shown in FIG. 33*c*. The mounting tabs 820 of the debris deflectors 800 extending through the tab slot 888 are deflected as shown in FIGS. 33*d* and 33*e* to restrict movement of the debris deflectors 800 relative to the mounting brackets 856*a*, 856*b*. The second mounting bracket 856*b* is then secured to the second lateral bracket support 832 as is shown in FIGS. 32*a* to 32*f*.

It will be understood that one of the lateral bracket supports 832 can be constructed to have the same features as the mounting brackets 856, and that the debris deflector 800 can be coupled towards one end to the lateral bracket support 832 directly and to a mounting bracket 856 towards the other end before the mounting bracket 856 is secured to the other lateral bracket support 832.

While the mounting brackets 856 and the debris deflector 800 are shown having single tabs and slots to enable them to be coupled together, other types of projections and apertures can be employed to couple them. For example, multiple projections such as tabs, pins, etc. can be employed to engage with corresponding slots, pin-holes, etc.

Figure 34:
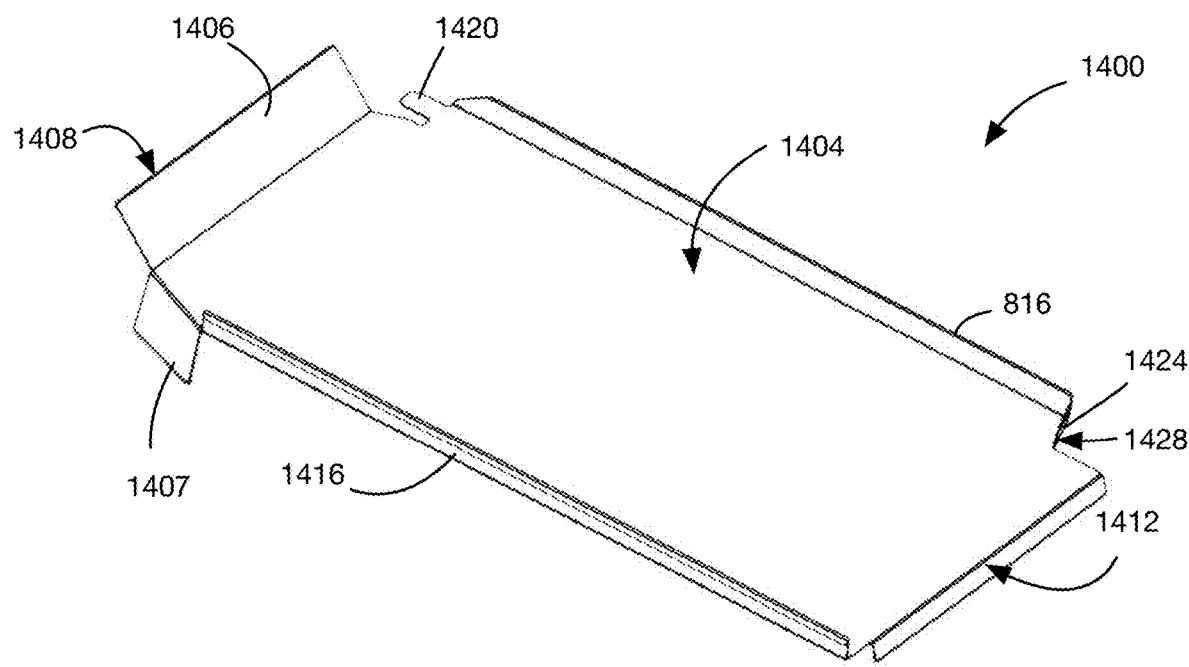
FIG. 34 shows a debris deflector in accordance with a further embodiment.

FIG. 34 is an isometric view of a debris deflector 1400 in accordance with a further embodiment. The debris deflector 1400 is similar to the debris deflector 800 of FIGS. 29*a* and 29*b*. The debris deflector 1400 is generally mounted on an angle directed downwardly towards the longitudinal centerline of the service line. A debris deflection surface 1404 of the debris deflector 1400 performs the task of catching and directing debris towards a longitudinal centerline of the service line as a result of the debris deflector 1400 being mounted on an angle. The debris deflection surface 1404 is generally planar, but has a water collection portion 1406 that is angled up to deflect water travelling generally downwards to wash across the debris deflection surface 1404. A support tab 1407 is bent downwards to support an upper end 1408 of the debris deflection surface 1404, which is elevated above a lower end 1412 thereof. Two debris guides 1416 extending between the upper end 1408 and the lower end 1412 direct debris towards the lower end 1412 (that is, the elimination end of the debris deflector 1400 towards which debris migrates primarily as a result of gravity). The debris deflector 1400 has a mounting tab 1420 towards and recessed from the upper end 1408, and an angled flange 1424 towards and recessed from the lower end 1412. The angled flange 1424 has a mounting slot 1428 that is generally parallel to the plane of the debris deflection surface 1404.

The debris deflector 1400 is formed from a single piece of aluminum, but may be formed from other suitable materials, such as galvanized steel, stainless steel, molded plastic, fiberglass, etc.

As will be readily understood, while the debris deflector 1400 is shown having a particular configuration, the debris deflector 1400 can also be made so that it is a mirror image of the debris deflector illustrated in FIG. 34.

Figure 35A:
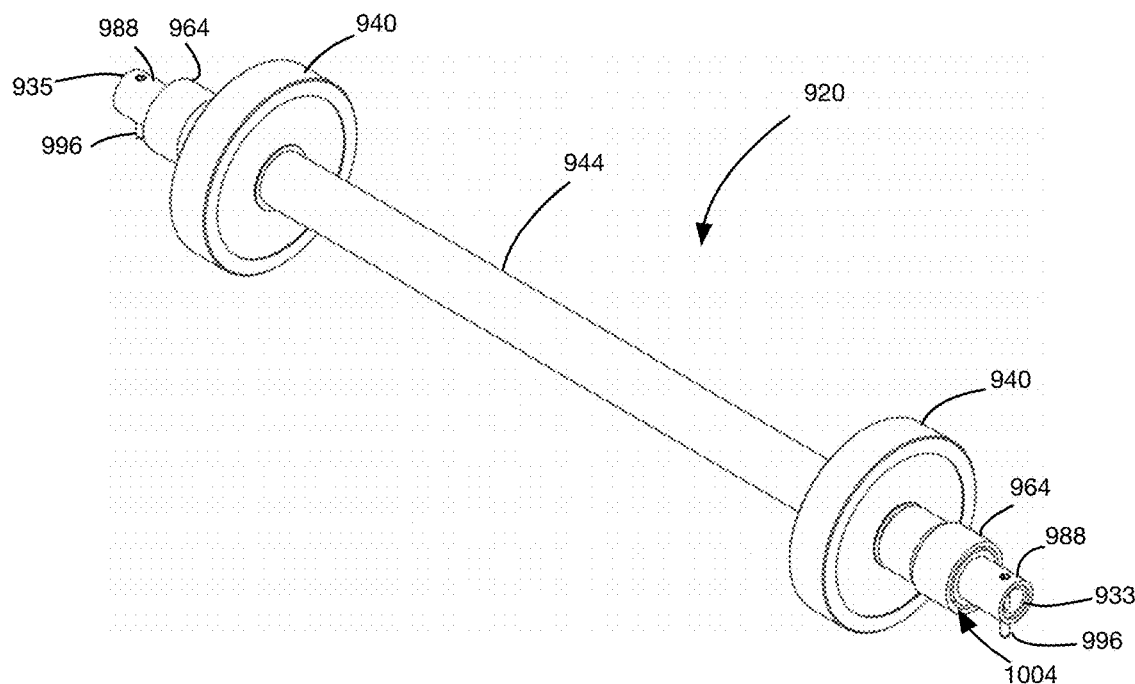
FIG. 35a is an isometric view of a belt return roller assembly for use with the mounting brackets of FIGS. 31a and 31b.
Figure 35B:
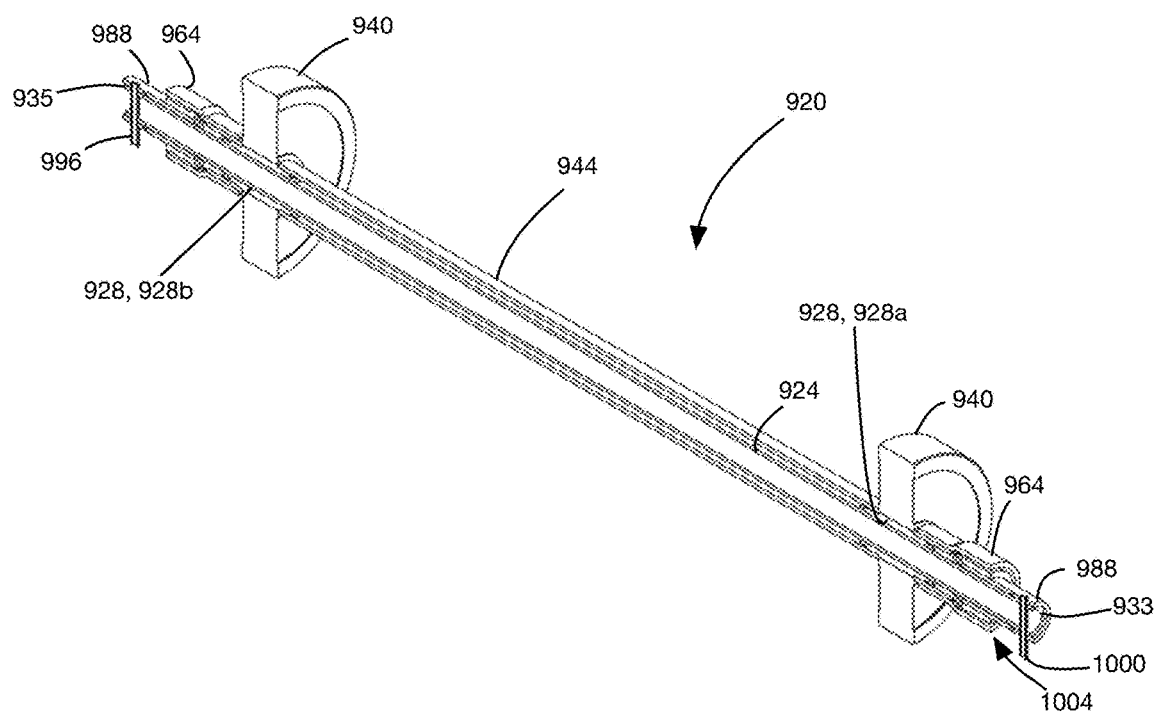
Figure 35C:
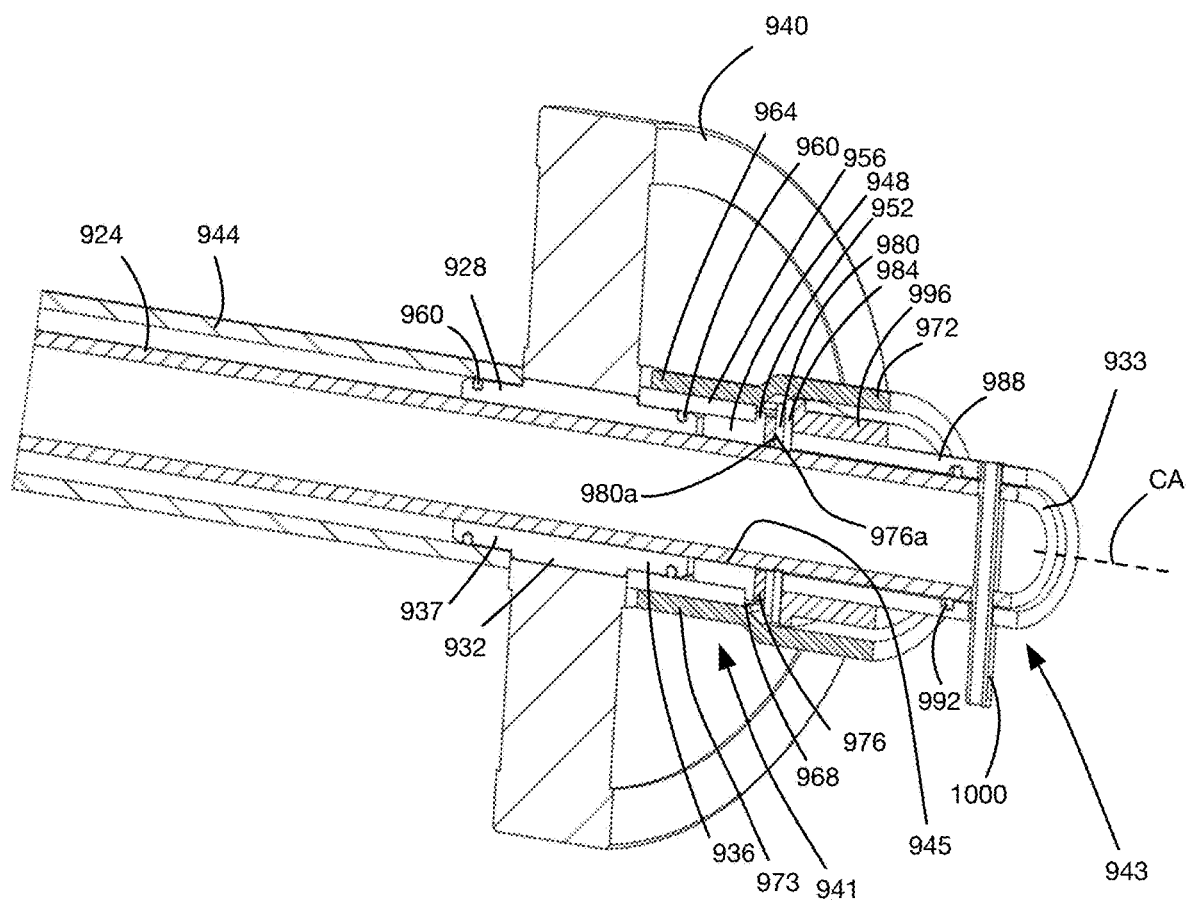

FIGS. 35*a* to 35*c* show a return roller assembly 920 in accordance with another embodiment. The lower return portion of the endless belt is supported by a plurality of return roller assemblies 920 so that stretching of the endless belt is mitigated along the lower return portion. Stretching of the endless belt causes fatigue in the components of the endless belt, particularly the pins that couple the links of the endless belt together. While the return roller assemblies 920 lie below the debris deflectors 800, they are still subjected to a dirty and wet environment. It is desirable to inhibit the migration of debris into the return roller assemblies, as it can increase wear between components that move against other components, such as the bearing members upon which the roller wheels are mounted and the shaft on which the bearing members rotate in the example shown.

The return roller assembly 920 includes a shaft 924 defining an axis CA and having a first shaft end 933 and a second shaft end 935. A first bearing member 928 is rotatably mounted on the shaft 924. The first bearing member 928 has a central bearing member portion 932, upon which is mounted a roller wheel 940 for rotatably supporting the lower return portion of the belt 36. The first bearing member 928 further has a first lateral bearing member portion 936 extending axially from the central bearing member portion towards the first shaft end 933, and a second lateral bearing member portion 937 extending axially from the central bearing member portion towards the second shaft end 935.

The return roller assembly 920 further includes a first bearing member sleeve structure 941 extending from the first bearing member 928 towards the first shaft end 933. The first bearing member sleeve structure 941 is sealingly mounted to the first lateral bearing member portion 936. In the example shown, the first bearing member sleeve structure 941 is mounted to the first lateral bearing member portion 936 with a first bearing member sleeve structure sealing member 960 therebetween so as to seal against leakage therebetween. The first bearing member sleeve structure sealing member 960 is, in the example shown, an O-ring, however it could be any other suitable type of sealing member such as an X ring, or a U ring. This sealing engagement prevents the migration of contaminants into the interface between the inner surface of the first bearing member 928 and the outer surface of the shaft 924 through the interface between the first bearing member sleeve structure 941 and the first lateral bearing member portion 936.

The first bearing member sleeve structure 941 has a shaft engagement surface 945 that is rotatably engaged with the shaft 924 at a point that is laterally outboard of the first bearing member 928 towards the first shaft end 933. This shaft engagement surface 945 assists in inhibiting the migration of contaminants along the to the aforementioned interface between the inner surface of the first bearing member 928 and the outer surface of the shaft 924. The shaft engagement surface 945 can be considered to be a sacrificial surface in order to protect the aforementioned interface.

The first bearing member sleeve structure 941 may be made up of several separate elements, including a flange bushing 948, a reducer 964 and a filler sleeve 956 in the reducer 964. The flange bushing 948 has the shaft engagement surface 945 thereon, and includes a flange 952 which abuts an end of the filler sleeve 956 so as to hold the filler sleeve 956 in place against the central bearing member portion 932 and the roller wheel 940. The inner surface of the filler sleeve 956 is the surface of the first bearing member sleeve structure 941 that is sealingly engaged with the first lateral bearing member portion 936. This arrangement ensures that there is a spacing between the first bearing member 928 and the flange bushing 948. The reducer 964, which has the filler sleeve 956 therein has an internal ridge 968 that abuts the same end of the filler sleeve 956 as is abutted by the flange bushing 948. The reducer 964 includes a laterally outer portion 972 and a laterally inner portion 973. The laterally outer portion 972 has a greater inner diameter than does the laterally inner portion 973 and overlaps axially with the first shaft sleeve structure 941 and is spaced radially from the first shaft sleeve structure 941.

As a result, when dirt, water and other contaminants get into the space inside the laterally outer portion 972, they are discouraged from reaching the laterally inner portion because of the change in diameter at that point.

The first bearing member sleeve structure 941 rotates with the first bearing member 928 on the shaft 924. In an alternative embodiment, the reducer 964, the filler sleeve 956 and the flange bushing 948 may all be formed directly from a single element.

The return roller assembly 920 further includes a first shaft sleeve structure 943 fixedly and sealingly mounted to the shaft 924 laterally outboard towards the first shaft end 933 relative to the shaft engagement surface 945 of the first bearing member sleeve structure 941.

The first shaft sleeve structure 943 is sealingly mounted to the shaft 924 with a first shaft sleeve structure sealing member 992 therebetween so as to provide sealing engagement therebetween. The first shaft sleeve structure sealing member 992 may be an o ring, a U ring, an X ring or any other suitable kind of sealing member. The sealing member 992 prevents migration of contaminants between the shaft 924 and the first shaft sleeve structure 943 towards the first bearing member sleeve structure 941.

The first shaft sleeve structure 943 may be formed from a plurality of components including a seal sleeve 988 and a deflector sleeve 996. The seal sleeve 988 is mounted on the shaft 924 and has an inner surface that is the surface of the first shaft sleeve structure 943 that is sealingly engaged with the shaft 924. The flanged deflector sleeve 996 is mounted atop of the seal sleeve 988 and may be bonded thereto.

A thrust washer 976 is positioned in abutment with the flange bushing 948, and may rotate together with the first bearing member sleeve structure 941. A steel washer 980 and a rubber washer 984 are mounted on the shaft 928 adjacent the thrust washer 976. The seal sleeve 988 and the flanged deflector sleeve 996 abut (i.e. the first shaft sleeve structure 943 abuts) the adjacent rubber washer 984.

An orientation retention feature in the form of a projection extends orthogonal to the axis of the return roller assembly 920. In this particular embodiment, the projection is a slotted spring pin 1000 that is inserted through through-holes in the seal sleeve 988 and the shaft 924 and extends out of the seal sleeve 988 generally radially. The pin 1000 has an enlarged head that prevents full passage thereof through the seal sleeve 988. The pin 1000 holds the axial position of the first shaft sleeve structure 943, such that the first shaft sleeve structure 943 presses with sufficient force against the rubber washer 984, which in turn presses against the steel washer 980, which in turn presses against the thrust washer 976. In other embodiments, the return roller assembly 920 can have other orientation retention features towards its first shaft end 933, such as, for example, a non-circular profile made by or example, crimping, or other types of projections, such as, for example, a coiled spring pin or tabs.

The rubber washer 984 is a non-rotating component as it remains frictionally engaged with the first shaft sleeve structure 943. The steel washer 980 is non-rotating due to frictional engagement with the rubber washer 984.

The first bearing member sleeve structure 941 has a first rotation interface sealing surface (which is the surface shown at 976*a* on the thrust washer 976) and the first shaft sleeve structure 943 has a second rotation interface sealing surface (which is the surface shown at 984*a* on the steel washer 980). The first and second rotation interface sealing surfaces 976*a* and 984*a* extend radially and circumferentially and engage one another to seal against migration of contaminants therebetween. The first shaft sleeve structure 943 urges the first and second rotation interface sealing surfaces 976*a* and 984*a* into engagement with one another.

As the seal sleeve 988 also is sealed against the shaft 924 via the O-ring 992, the wheel bushing 928 is sealed, inhibiting the migration of contamination between the wheel bushing 928 and the shaft 924.

The return roller assembly 920 further includes a second bearing member sleeve structure 944 extending from the first bearing member 928 towards the second shaft end 935. The second bearing member sleeve structure 944 is sealingly mounted to the second lateral bearing member portion 937 via a sealing member therebetween, such as an o ring, a U ring, an X ring or any other suitable sealing member so as to prevent the migration of contaminants therebetween.

In the example shown, the bearing member 928 and the roller wheel 940 are a first bearing member 928 (and are also identified in FIGS. 35*a* and 35*b* at 928*a*) and a first roller wheel 940 respectively. The return roller assembly 920 further comprises a second bearing member 928 (shown individually at 928*b*) rotatably mounted on the shaft 924, closer to the second shaft end 935 than is the first bearing member 928, and having a central bearing member portion 932 upon which is mounted a second roller wheel 940 for rotatably supporting the conveyor belt, a first lateral bearing member portion 936 extending axially from the central bearing member portion 932 towards the second shaft end 935, and a second lateral bearing member portion 937 extending axially from the central bearing member portion towards the first shaft end 933. The return roller assembly 920 further comprises a first bearing member sleeve structure 941 for the second bearing member 928*b*, extending from the second bearing member 928*b* towards the second end 935, and sealingly mounted to the first lateral bearing member portion 936 of the second bearing member 928*b*, and having a shaft engagement surface 945 that is rotatably engaged with the shaft 924. The return roller assembly 920 further comprises a second bearing member sleeve structure 941 for the second bearing member, extending from the second bearing member 928*b* towards the first shaft end 935. The second bearing member sleeve structure 941 for the second bearing member 928*b* is sealingly mounted to the second lateral bearing member portion 937 of the second bearing member 928*b*. The return roller assembly 920 further comprises a second shaft sleeve structure 943 fixedly and sealingly mounted to the shaft 924 laterally outboard towards the second shaft end 935 relative to the shaft engagement surface 945 of the first bearing member sleeve structure 941 of the second bearing member 928*b*.

The first bearing member sleeve structure 941 for the second bearing member 928*b* has a first rotation interface sealing surface (provided on a thrust bushing) and the second shaft sleeve structure 943 has a second rotation interface sealing surface (provided on a steel washer), and a rubber washer may be provided between the steel washer and a surface of the second shaft sleeve structure 943. The first and second rotation interface sealing surfaces 976*a* and 980*a* on the first bearing member sleeve structure 941 for the second bearing member 928*b* and the second shaft sleeve structure 943 extend radially and circumferentially and engage one another to seal against migration of contaminants therebetween. The second shaft sleeve structure 943 urges the first and second rotation interface sealing surfaces 976*a* and 980*a* into engagement with one another The first and second shaft sleeve structures 943 may be mirror images of one another but may be similar to one another aside from that. A pin 1000 may be provided at the second shaft end 935 to hold the second shaft sleeve structure 943 in similar manner to the pin 1000 at the first shaft end 933 for the first shaft sleeve structure 943. The first and second bearing member sleeve structures 941 may be similar to one another aside from being mirror images of one another.

The return roller assembly 920 further includes a second bearing member sleeve structure 944 extending from the second bearing member 928*b* towards the second shaft end 935. The second bearing member sleeve structure 944 is sealingly mounted to the second lateral bearing member portion 937 of the second bearing member 928*b* via a sealing member therebetween, such as an O-ring, a U-ring, an X-ring or any other suitable sealing member so as to prevent the migration of contaminants therebetween. In the example shown, the second bearing member sleeve structure 944 for the second bearing member 928*b* is contiguous and integral with the second bearing member sleeve structure 944 for the first bearing member 928*a*.

Figure 36A:
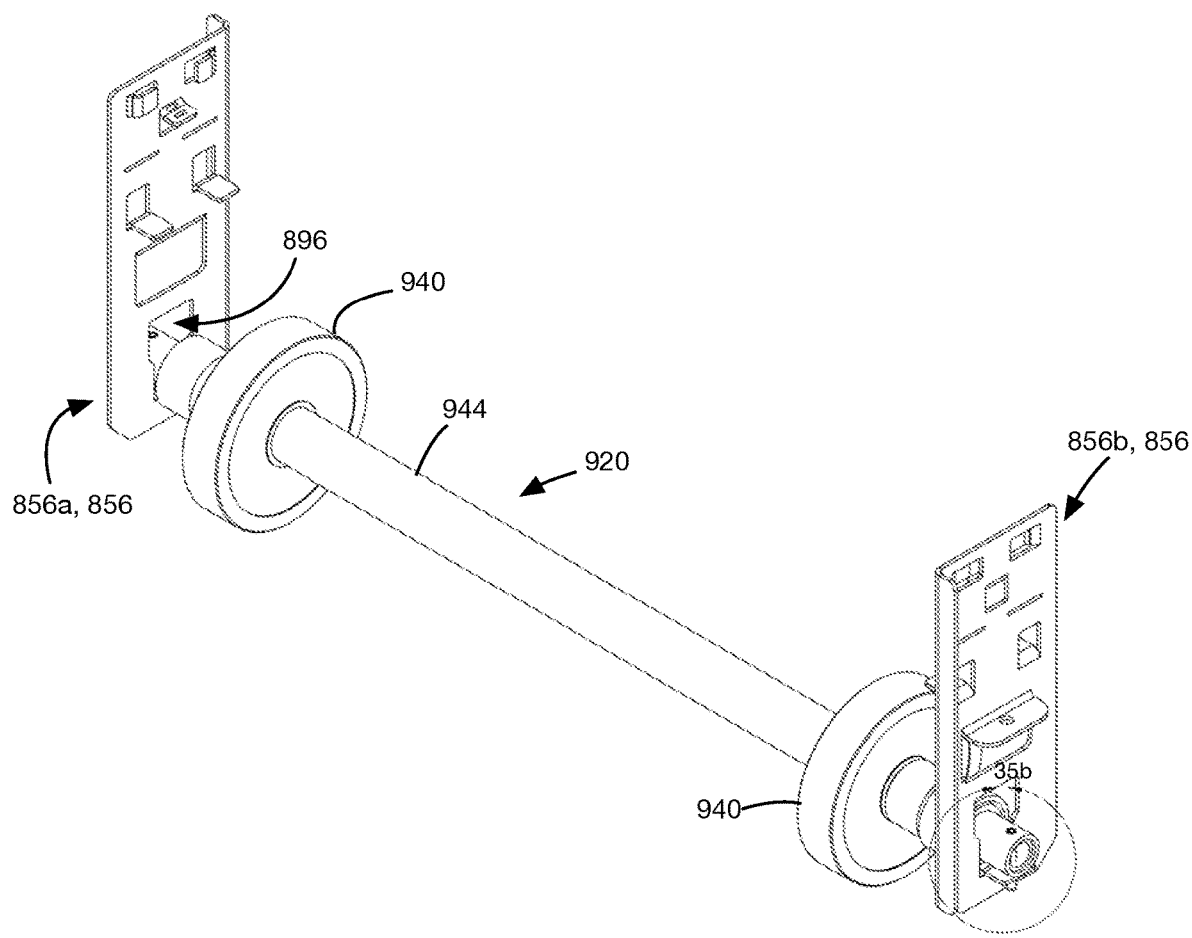
FIGS. 36a and 36b show the installation of the belt return roller assembly of FIG. 35a between two mounting brackets of FIGS. 31a and 31b.
Figure 36B:
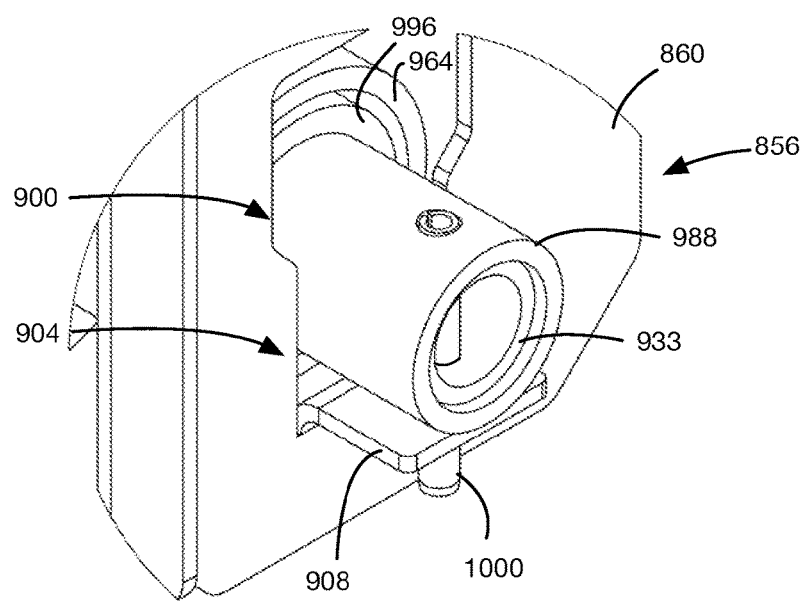

FIGS. 36*a* and 36*b* show the toolless installation of the return roller assembly 920 between two mounting brackets 856*a*, 856*b*. In order to install the return roller assembly 920 between the two mounting brackets 856*a*, 856*b* that are secured to lateral bracket supports 832 of adjacent inner and outer lateral support rails, the return roller assembly 920 is angled to enable one end thereof to be inserted into the upper end 900 of the return roller assembly slot 896 of one of the mounting brackets 856. The upper end 900 of the return roller assembly slot 896 is large enough to receive the end section 972 of the reducer 964, enabling the return roller assembly 920 to be inserted far enough to permit the other end of the return roller assembly 920 to be inserted into the return roller assembly slot 896 of the other mounting bracket 856. Once the return roller assembly 920 is positioned in the return roller assembly slots 896 of both mounting brackets 856, the return roller assembly 920 is shifted so that the reducers 964 are positioned between the mounting brackets 856, allowing the seal sleeves 988 to slide into the lower ends 904 of the return roller assembly slots 896 of the mounting brackets 856*a*, 856*b*. The return roller assembly 920 is constructed so that ends 1004 of the reducers 964 and the flanged deflector sleeve 996 abut against the main plates 860 of the mounting brackets 856*a*, 856*b* next to the lower ends 904 of the return roller assembly slots 896. The pins 1000 of the return roller assemblies 920 are aligned with and inserted into the pin through-holes 912 of the return roller assembly rests 908 which support the seal sleeves 988. As will be appreciated, the pins 1000 both limit relative movement of the seal sleeves 988 and the shaft 924 and inhibit rotation of the return roller assembly 920 in the return roller assembly slots 896.

FIGS. 37*a* and 37*b* show a wear plate 1008 for a conveyor system in accordance with another embodiment. The wear plate 1008 is similar in design to the wear plate 88 shown in FIGS. 17*a* and 17*b*, having debris slots 1012 allowing debris between the wear plate 1008 and an endless belt positioned thereon to be carried away via a fluid. A leading edge 1016 and a trailing edge 1020 of the wear plate 1008 are oblique to a direction of travel dt of an endless belt.

Traditionally, wear plates are beveled along at least their trailing edges and sometimes along their leading edges as sharp deflecting surfaces of the wear plate structure can significantly decrease the lifespan of the endless belt. The wear plates are secured to a structure via countersunk fasteners such as screws or bolts. As the wear plates are worn, however, the head of the fasteners are eroded, making it difficult to remove the fasteners when it is time to replace the wear plates.

The wear plate 1008 provides a plate mount 124 for securing the wear plate 1008 to a support structure. The wear plate 1008 is typically stainless steel, but can be any other suitable material that resists wear and that is sufficiently ductile to be permanently and stably deformable via application of a deforming force without significantly impacting the structural strength of the wear plate 1008. Other suitable materials include, for example, galvanized steel.

The plate mount 1024 is formed within the wear plate 1008 by laser cutting a design of at least one cut in the wear plate 1008 or by any other suitable means. In particular, the plate mount 1024 of the wear plate 1008 includes a fastener retainer 1028 having a retention hole 1032 extending through the wear plate 1008. Two cuts 1036 define a retainer support 1040 connecting the fastener retainer 1028 to the remainder of the wear plate 1008. As used herein, a retainer support is any structure connecting the fastener retainer to the rest of the wear plate and which is permanently deformable to enable the retention hole to be depressed relative to the rest of the wear plate.

Two flexure apertures 1044 are cut in the retainer support 1040 to facilitate deformation of the plate mount 1024. While in the described embodiment, the fastener retainer is an annular structure surrounding a retention hole through which a bolt, screw, etc. is inserted, in other embodiments, the fastener retainer can be any other shape or design for retaining a fastener for securing the wear plate.

FIGS. 38a and 38b show the wear plate 1008 after deformation of the plate mount 1024. The plate mount 1024 can be deformed via machine or manually during manufacturing, any time prior to installation, or at the time of installation. As shown, the plate mount 1024 is deformed sufficiently so that a variety of fasteners, such as hex bolts, can be employed to secure the wear plate 1008 to a support structure underneath the wear plate wherein a fastener 1048 is sunk below a top surface of the wear plate 1008, as is shown in FIG. 39.

FIG. 40 shows a wear plate anchor 1052 for use with the wear plate 1008. The wear plate anchor 1052 is die formed from a single sheet of steel and has a longitudinal body 1056 with a through-hole 1060 for pass-through of a shank of a fastener. A pair of flanges 1064 extend from the longitudinal body 1056 on either side of the through-hole 1060 defining a channel 1068 therebetween. An orientation locking tab 1072 extends in a direction generally opposite of the direction in which the flanges 1064 extend. The channel 1068 is dimensioned to engage the sides of a nut to prevent it from turning.

Figure 41A:
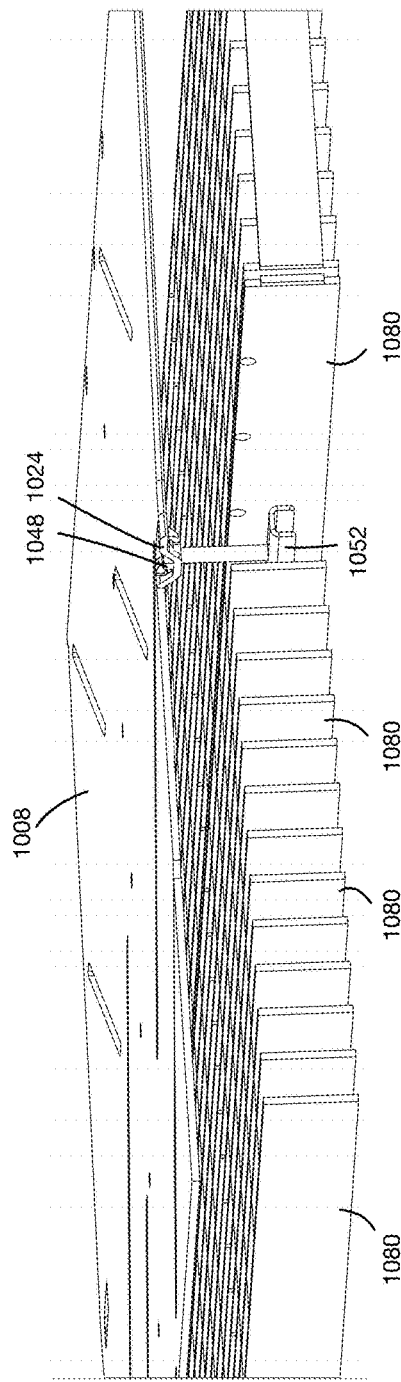

FIGS. 41a to 41d show the installation process of the wear plate 1024 of FIGS. 38a and 38b using the wear plate anchor 1052 of FIG. 40. A fastener 1048 such as a bolt is inserted through the retention hole 1032 of the plate mount 1024, passed through the through-hole 1060 of the wear plate anchor 1052, and inserted and threaded in a nut 1076 to secure it thereto. Preferably, the plate mount 1024 is formed so that the fastener retainer 1028 is depressed sufficiently to fully recess a head of the fastener 1048 below a maximum wear level of the wear plate 1008, as shown in FIG. 39. The wear plate 1008 is then positioned on a support deck that is made from a set of modular grid panels having a set of longitudinal cross-members 1080, as is shown in FIG. 41a with the wear plate anchor 1052 being inserted between adjacent longitudinal cross-members 1080. The length of the bolt 1048 is selected so that the longitudinal body 1056 of the wear plate anchor 1052 depends below the longitudinal cross-members 1080, but the orientation locking tab 1072 is still positioned between the longitudinal cross-members 1080. The head of the bolt 1048 is then turned, and the wear plate anchor 1052 turns with it until the orientation locking tab 1072 engages one of the longitudinal cross-members 1080, thus restricting the wear plate anchor 1052 from rotating further, as shown in FIGS. 41c and 41d. Thereafter, continued rotation of the bolt 1048 causes the nut 1076 to travel up the shank of the bolt 1048, thereby clamping the wear plate anchor 1052 against the bottom surface of the longitudinal cross-members 1080.

The head of the bolt 1048 securing the wear plate 1008 via the plate mount 1024 can thus be sufficiently recessed so that it is still rotatable via a tool when the wear plate 1008 is worn to the point of needing replacement. In order to remove the wear plate 1008, the bolt 1048 is turned in an opposite direction (typically counterclockwise). The orientation locking tab 1072 is rotated until it abuts against an opposite longitudinal cross-member 1080, thus restricting further rotation of the wear plate anchor 1052. Further rotation of the bolt 1048 causes the nut 1076 to travel down the shank until the wear plate anchor 1052 can be sufficiently rotated to withdraw it between the longitudinal cross-members 1080.

Figure 42A:
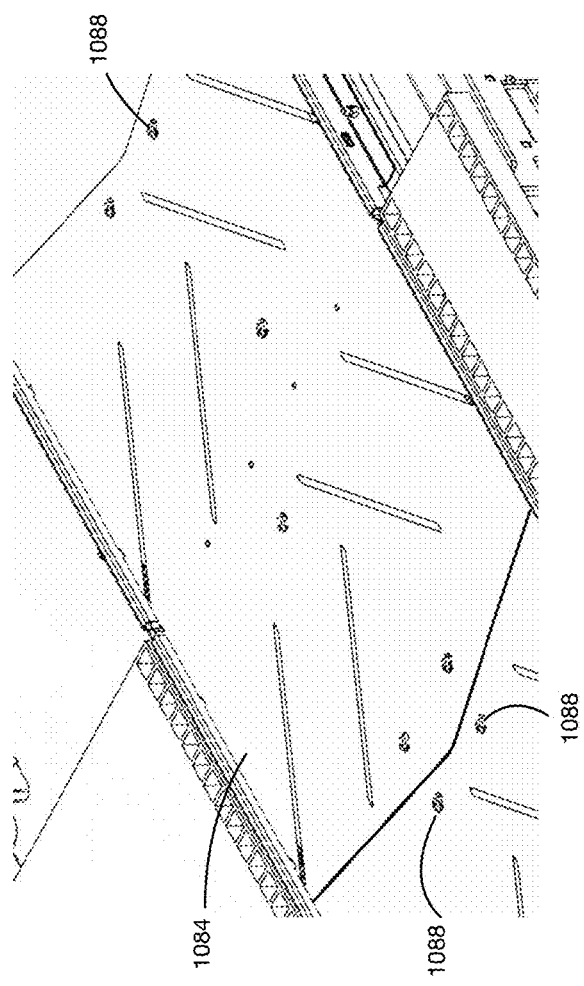
FIG. 42a shows a wear plate for use with a conveyor system in accordance with another embodiment.

FIGS. 42a and 42b show a wear plate 1084 in accordance with a further embodiment having a set of plate mounts 1088, each formed from a set of three spiral or circumvoluted cuts 1090 extending from a fastener retainer 1091 having a retention hole 1092. The circumvoluted cuts 1090 define a retainer support 1094 extending from the fastener retainer 1091 to a remainder 1095 of the wear plate 1084. In this embodiment, the plate mounts 1088 are cut during manufacturing, but fastener retainer is not depressed prior to installation.

During the installation process, a bolt is inserted through the retention hole 1092 and threadedly secured either indirectly to a grid panel of the support deck via an anchor of some sort, such as the wear plate anchor 1052 of FIG. 40, or directly to a grid panel. FIG. 42c shows a bolt 1095 having been inserted through the retention hole 1092 and the wear plate anchor 1052, and threadedly secured within the nut 1076.

As the bolt 1095 is tightened, the force on the fastener retainer 1091 causes the deformation of the circumvoluted cut retainer support 1094, urging the retainer support 1094 to extend in the direction of the point to which the bolt 1095 is secured (that is, the nut 1076 adjacent the through-hole 1060 of the wear plate anchor 1052), as is shown in FIGS. 42d and 42e.

As will be understood, by using circumvoluted cuts 1090 to define the retainer support 1094, the retainer support 1094 deforms through the force applied by the head of the bolt 1095 against the fastener retainer 1091.

Figure 43A:
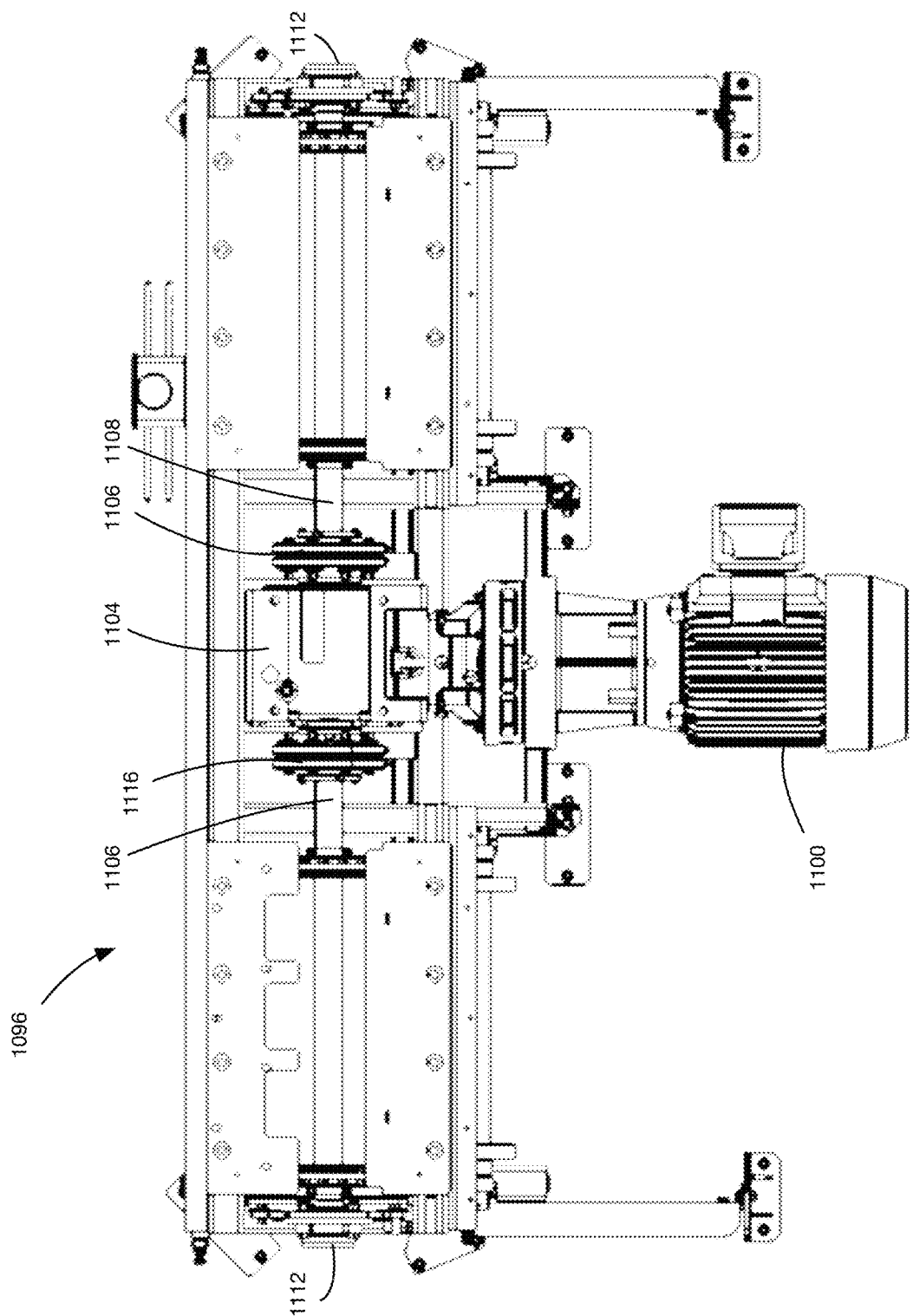
FIG. 43a is a plan view of a partial belt drive assembly.
Figure 43B:
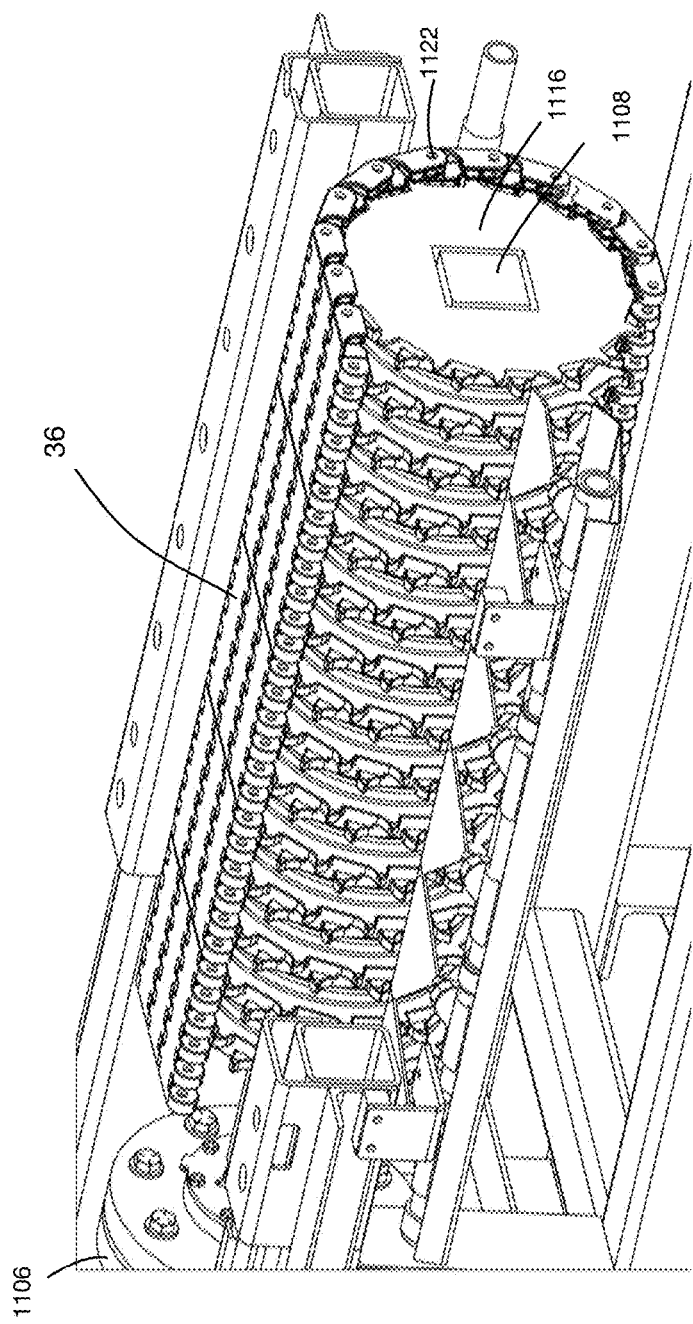
FIG. 43b is an isometric view of a drive coupler in accordance with an embodiment connecting the drive motor to a portion of the drive shaft of FIG. 43a and a set of sprockets mounted on the drive shaft for driving an endless belt.

FIGS. 43a and 43b show a plan view of a belt drive assembly 1096 for an endless belt in accordance with an embodiment. The belt drive assembly 1096 includes a drive motor 1100 having a transmission 1104 extending therefrom. The transmission 1104 includes a right-angle gear box to redirect torque from the drive motor 1100. A drive coupler 1106 is coupled to each side of the transmission 1104, and a drive member in the form of a drive shaft 1108 is coupled to each drive coupler 1106 at a proximal end of the drive shaft 1108. Each of the drive shafts 1108 is pivotally coupled at a remote end thereof at a pivot point 1112. A set of sprockets 1116 are mounted on the drive shafts 1108 to engage and drive the endless belt. A set of sprockets 1116 are mounted on the drive shaft 1108 and engage an endless belt 1122 to drive it.

Figure 43C:
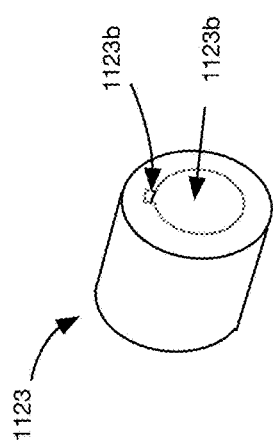
FIG. 43c is an isometric view of a slotted sleeve of the transmission of FIG. 43a that couples to the drive coupler of FIGS. 43a and 43b.

FIG. 43*c* shows a drive member of the transmission in the form of a slotted sleeve 1123 that couples to the drive coupler 1106. The slotted sleeve 1123 has an aperture 1123*a* having a key slot 1123*b*.

Figures 44A, 44B:
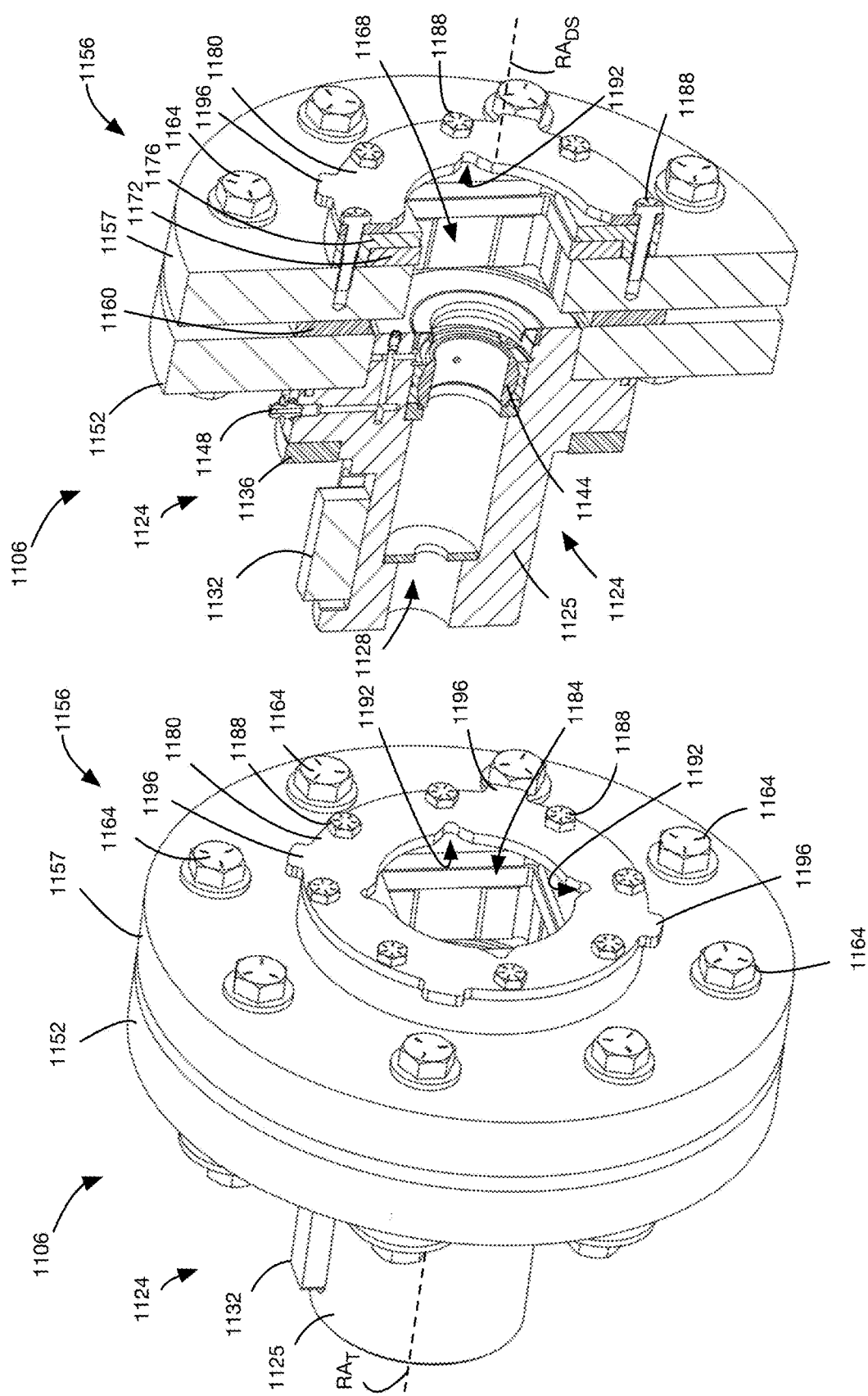
Figure 45:
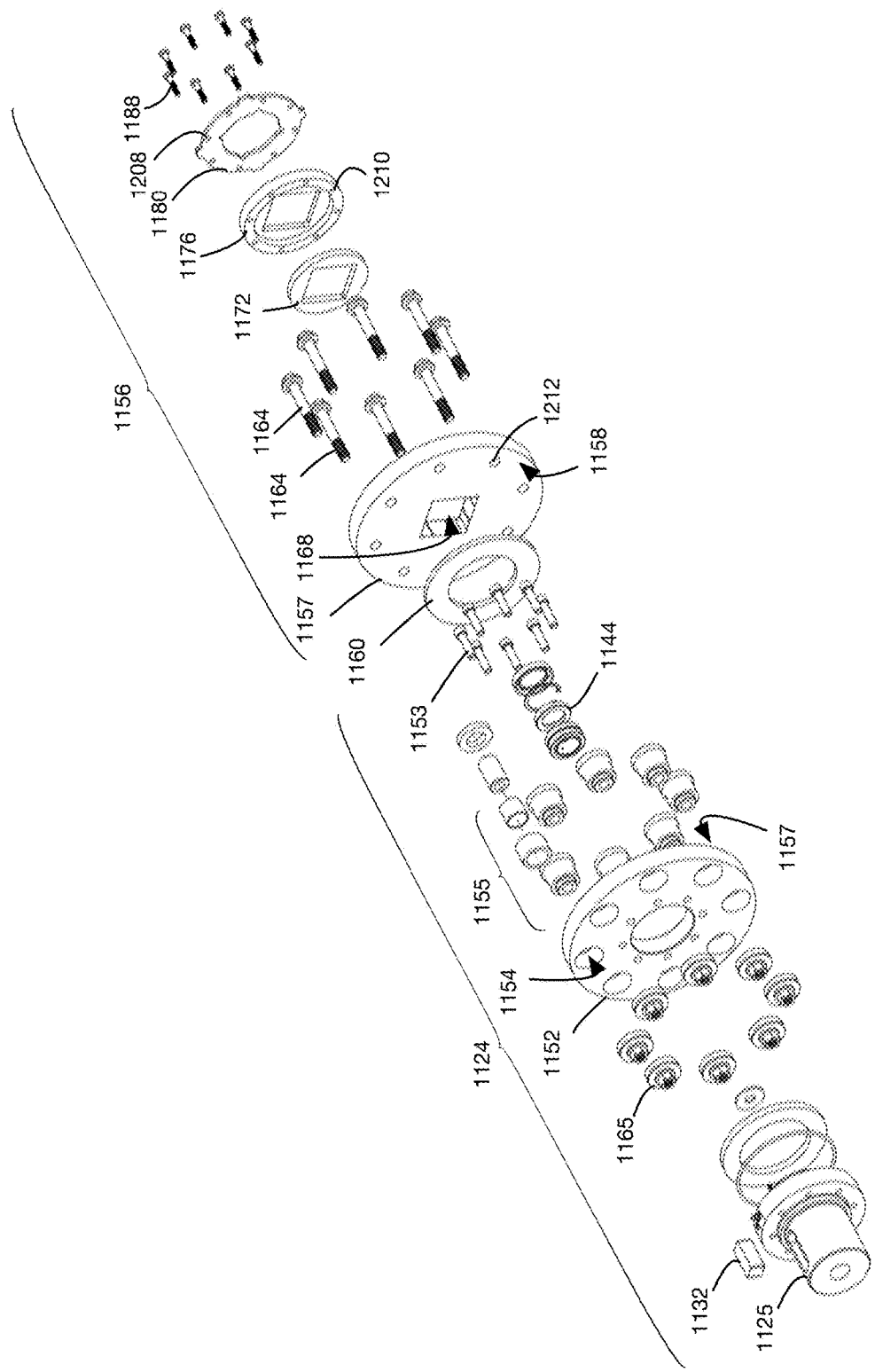
FIG. 45 is an exploded view of various components of the drive coupler of FIGS. 44a and 44b.

FIGS. 44*a*, 44*b*, and 45 show the drive coupler 1106 in greater detail. The drive coupler 1106 includes a transmission connector 1124 having a transmission coupler 1125 with an alignment post recess 1128 for receiving an alignment post extending from the transmission 1104. A key 1132 on the outer surface of the transmission coupler 1125 enables transmission of a torque force about a transmission rotation axis RAT from the drive motor 1100 via the slotted sleeve 1123 of the transmission 1104 of FIG. 43*c* that fits over the transmission connector 1124. A resilient compressible ring 1136 interfaces with the slotted sleeve to accommodate irregularity between the rotation of the transmission coupler 1125 and the slotted sleeve. A drive shaft bore 1140 extends into an opposite side of the transmission coupler 1125. A spherical bearing 1144 positioned inside of the transmission connector 1124 has a recess for securely receiving a round drive post extending from an adjacent end of the drive shaft 1108, and is positioned at the intersection of the transmission rotation axis RAT and a drive shaft rotation axis RADS. The spherical bearing 1144 generally fixes the rotation axis of the drive shaft 1108 relative to the rotation axis of the transmission connector 1124 even when there is angular displacement between the rotation axes; that is, when the drive shaft rotation axis RADS is non-coaxial with the transmission rotation axis RAT. In this embodiment, the spherical bearing 1144 is positioned in an at least partial spherical socket within the transmission connector 1124. A lubrication port 1148 enables lubrication of the socket in which the spherical bearing 1144 resides.

A first flange 1152 of the transmission connector 1124 is secured via a set of bolts 1153. A set of large bores 1154 adjacent the circumferential periphery of the first flange 1152 accommodates a set of resilient compressible bushings 1155.

A drive shaft connector 1156 includes a second flange 1157 is separated from the first flange 1152 via a resilient compressible spacer 1160 that is positioned between a first connector face 1157 of the first flange 1152 and a second connector face 1158 of the second flange 1157. The compressible spacer 1160 permits the first and second connector faces 1157, 1158 to be non-parallel to one another while being securely coupled to one another. The drive shaft connector 1156 is rotationally coupled to the transmission connector 1124 via a set of bolts 1164 that is inserted through bolt holes 1212 in the second flange 1157, through the resilient compressible bushings 1155 of the first flange 1152, and secured with nuts 1165. The resilient compressible bushings 1155 and the resilient compressible spacer 1160 permit the transmission connector 1124 and the spherical bearing 1144 to be connected together with the first and second connector faces 1157, 1158 being non-parallel to one another. Rotation of the transmission connector 1124 causes the bolts 1164 to exert a torque force on the drive shaft connector 1156 to thereby cause it to rotate.

The second flange 1157 has a square-profiled through-hole 1168 that is dimensioned to correspond to the cross-section profile of the drive shafts 1108. A resilient compressible sealing ring 1172 that has a slightly smaller profiled through-hole than the through-hole of the second flange 1157. That is, the resilient compressible sealing ring 1172 extends slightly over the square-profiled through-hole 1168. A retainer annulus 1176 encloses and covers all but the resilient compressible sealing ring 1172 that extends over the square-profiled through-hole 1168. A locking flange 1180 having a generally circular pass-through aperture 1184 is releasably securable to the second flange via a set of bolts 1188 that pass through the retainer annulus 1176. Four notches 1192 are evenly spaced along the periphery of the generally circular pass-through aperture 1184. In addition, four grips 1196 are evenly spaced about the periphery of the locking flange 1180.

Figure 46A:
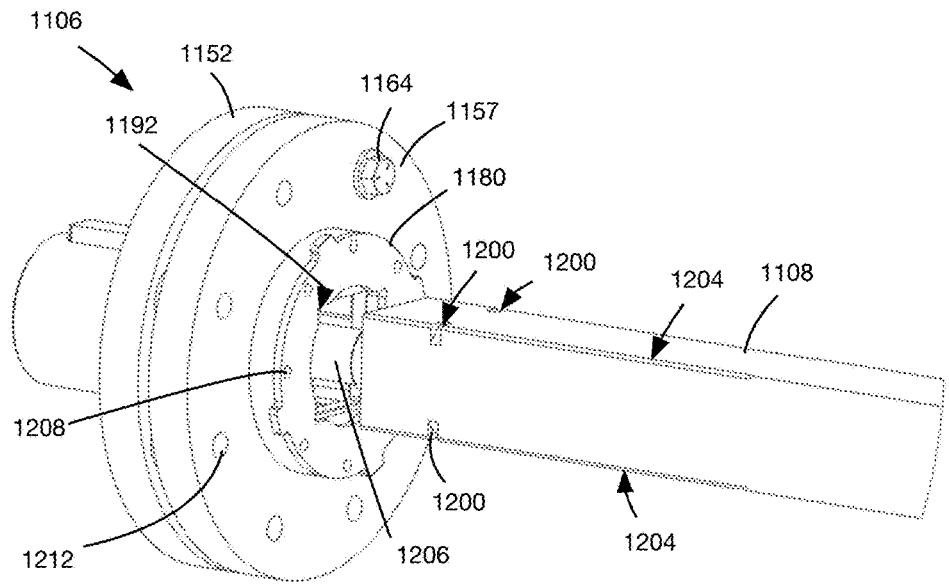
FIGS. 46a to 46c show the coupling of the drive shaft of FIGS. 43a and 43b to the drive coupler of FIGS. 44a and 44b.
Figure 46B:
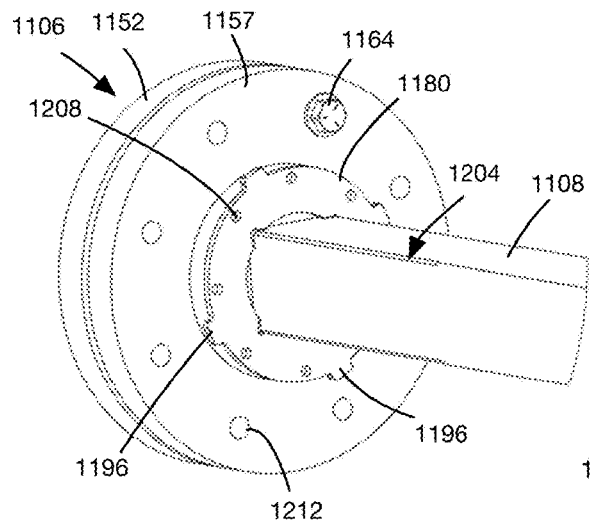
Figure 46C:
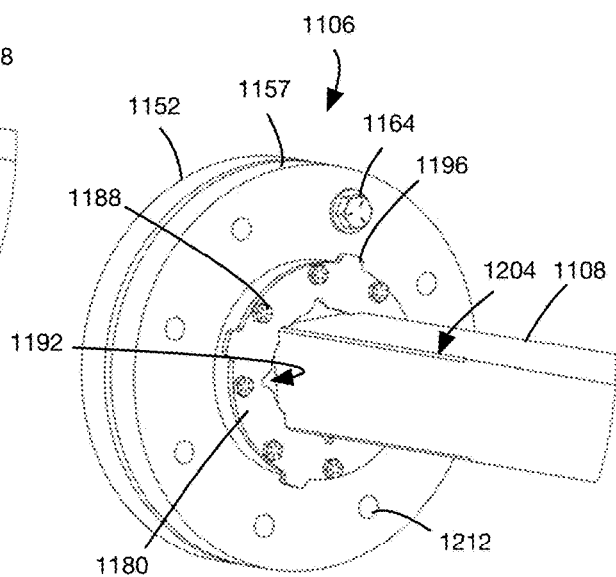

Referring now to FIGS. 45 and 46*a* to 46*c*, one of the drive couplers 1106 is shown being connected to one of the drive shafts 1108. As can be seen in FIG. 46*a*, the drive shaft 1108 has four circumferentially extending slots 1200 cut through the edges of its square profile close to an end of the drive shaft 1108 that will engage the drive coupler 1106. In addition, the edges 1204 of the drive shaft 1108 are beveled along a length of the drive shaft commencing at the end of the square-profiled section of the drive shaft 1108 and extending past the four circumferentially extending slots 1200.

During coupling of the drive coupler 1106 with the drive shaft 1108, all but one of the bolts 1164 coupling the two flanges 1152, 1157 together, is removed. The one bolt 1164 retains the second flange 1157 connected to the first flange 1152. Removal of the other bolts 1164 enables more play between the first and second flanges 1152, 1157. Further, all of the bolts 1188 coupling the locking flange 1180 to the second flange 1157 are removed. The locking flange 1180 is then slipped over the drive post of the drive shaft 1108 and the four notches 1192 are aligned with the four edges 1204 of the end of the drive shaft 1108. The four notches 1192 of the locking flange 1180 are dimensioned to snugly receive the four beveled edges 1204 of the profile of the drive shaft 1108. The locking flange 1180 is slid along the drive shaft 1108 until it is positioned over the four circumferentially extending slots 1200. Here, the circumferentially extending slots 1200 permit the locking flange 1180 to be slidable axially along the end portion of the drive shaft 1108 when the locking flange 1180 is in a first rotational position about the drive shaft rotation axis RADS, and that is rotatable from the first rotational position to a second rotational position about the drive shaft rotation axis RADS to engage the plurality of circumferentially extending slots 1200 thereby axially locking the locking flange 1180 with the drive shaft 1108.

The drive shaft 1108 is rotated until its profile is generally aligned with the orientation of the square-profiled through-hole 1168 of the second flange 1157. A drive post 1206 of the drive shaft 1108 is then inserted into the spherical bearing 1144. The spherical bearing 1144 snugly holds the drive post 1206. The square-profiled portion of the drive shaft 1108 is then urged past the resilient compressible sealing ring 1172 and into the square-profiled through-hole 1168 of the second flange 1157 until the locking flange 1180 abuts against the retainer annulus 1176. The resilient compressible sealing ring 1172 fits snugly about the drive shaft 1108. The locking flange 1180 can then be rotated as required on the surface of the circumferentially extending slots 1200 of the drive shaft 1108 via the four grips 1196 until bolt holes 1208 are aligned with corresponding bolt holes 1210 in the retainer annulus 1176, and the bolts 1188 are then inserted into the bolt holes 1208 and rotated until the locking flange 1180 is secured tightly to the retainer annulus 1176 and the second flange 1157. Once the locking flange 1180 is secured to the second flange 1157, the balance of the bolts 1164 are inserted into bolt holes 1212 and through the corresponding resilient compressible bushings 1155 of the first flange 1152, and the nuts 1165 are used to secure their ends on the opposite side of the first flange 1152. When the nuts 1165 are tightened, there is a bit of play between the first flange 1152 and the second flange 1157.

The drive couplers 1106 accommodate for angular misalignment between the rotation axis of the drive shafts 1108 and the rotation axis of the drive motor 1100. During installation of the belt drive assembly 1096, care is taken to align these rotation axes, but this can prove very challenging. In the absence of the drive couplers 1106, even small misalignments between these rotation axes can cause mechanical failures of the belt drive assembly 1096, such as sheared drive shafts.

The drive couplers 1106 enable torque to be transferred from the drive motor 1100 to the drive shafts 1108 even when there is some misalignment between the rotation axes of the drive motor 1100 and the drive shafts 1108. As will be understood, angular misalignment of the rotation axes is accommodated by deformation of the resilient compressible spacer 1160 separating the first and second flanges 1152, 1157, the resilient compressible bushings 1155, and the resilient compressible sealing ring 1172. The resilient compressible sealing ring 1172 is sufficiently firm to transfer torque from the transmission connector 1124 to the drive shaft 1108.

While, in the above-described embodiment, the drive shafts 1108 are square in cross-section, in other embodiments, the drive shafts can have other non-circular cross-sectional shapes, such as, for example, hexagonal, ellipsoid, etc.

FIGS. 47a to 47c show a wear plate 1300 according to another embodiment. The wear plate 1300 is somewhat similar in construction to the wear plate 1008 shown in FIGS. 37a to 38b, and has a wear surface 1302 that is positioned to incur wear. The wear plate 1300 is constructed of a first material having a first electrical conductivity. For example, in the illustrated embodiment, the wear plate 1300 is constructed of stainless steel. The wear sensor includes a first electrical conduit 1304 extending from an undersurface 1324 of the wear plate 1300 opposite the wear surface 1302, and a second electrical conduit 1308 extending from the undersurface 1324 adjacent the first electrical conduit 1304. In other embodiments, the electrical conduits can extend from a lateral edge of the wear plate. The electrical conduits 1304, 1308 are like-dimensioned and each receives a plug 1312 from which extends a wire 1316.

The wear plate 1300 has a gap 1320 in the first material around the first electrical conduit 1304. The gap 1320 extends in this case in a ring around the first electrical conduit 1304 and has a depth extending from the undersurface 1324 of the wear plate 1300. In the illustrated embodiment, the gap 1320 is filled with a second material having a second electrical conductivity that is lower than the first electrical conductivity.

The wires 1316 are coupled to a voltage source in the form of a sensor module 1328 coupled to an electrical source 1129, such as a battery or an electrical outlet. The sensor module 1328 includes an output device in the form of a speaker, but can additionally or alternatively include a display, a network module, etc.

As discussed above, wear plates are meant to provide a sliding surface over which an endless belt is conveyed to transport a vehicle. The endless belt is made of a plastic or other suitable material, and the weight of the vehicle being transported on the endless belt is significant. As a result, the wear plates "wear", being eroded by the endless belt over time.

The depth of the gap 1320 is selected to correspond to a wear plate thickness at which a new wear plate 1300 should be ordered for replacement or alternatively the depth of the gap 1320 is selected to correspond to a desired minimum wear plate thickness at which the wear plate 1300 should be replaced to ensure that undue damage is not caused to the endless belt traveling across the wear plate 1320 or to the support deck.

The sensor module 1328 either intermittently, regularly, or continuously generates a voltage differential between the wires 1316 to cause an electrical current to flow through the wires 1316 when they are coupled to the wear plate 1300 when in a first wear condition (i.e. thicker than the desired minimum wear plate thickness, or good operating condition), as is shown in FIG. 48a. When the wear plate 1300 is worn down sufficiently to a second wear condition (i.e., at least to the desired minimum wear plate thickness as shown in FIG. 48b), the electrical conduits 1304, 1308 are fully separated by a gap in the stainless steel of the wear plate 1300, but are held together by a second material having the second electrical conductivity differing from the electrical conductivity of the stainless steel. The second material is a material that has a lower (and preferably insignificant) electrical conductivity than that of the first material, and will maintain its connection to the surrounding wear plate 1300 when the wear 1300 plate is in the second wear condition. In the illustrated embodiment, the second material is a non-conductive epoxy, but can be any other suitable material for use with the first material.

As a result of the full separation of the first electrical conduit 1304 from the second electrical conduit 1308 through the first material, a change in electrical current flowing through the electrical conduits 1304, 1308 is detected by the sensor module 1328. When the sensor module 1328 determines that the change in electrical current flowing through the electrical conduits 1304, 1308 corresponds to a separation between the electrical conduits 1304, 1308 through the stainless steel (based on a maintained drop in electrical current), the sensor module 1328 reports the condition by way of generating an audible signal or alert to indicate that the wear plate 1300 should be replaced.

During replacement of a wear plate 1300, the plugs 1312 are withdrawn from the electrical conduits 1304, 1308, and the worn out wear plate 1300 is removed. The plugs 1312 are connected to the electrical conduits 1304, 1308 of a new wear plate 1300, and it is secured in place.

While in this embodiment, the gap 1320 separating the first electrical conduit 1304 from the second electrical conduit 1308 is ring-shaped, in other embodiments, the gap 1320 can be other shapes to separate connection of the electrical conduits 1304, 1308 through the first material having a first electrical conductivity when the wear plate 1300 is sufficiently worn.

Instead of filling the gap with a second material, it may be left empty, in which case the first electrical conduit will be entirely disconnected from the second electrical conduit when the wear plate is sufficiently worn.

It will be appreciated that, although embodiments of the disclosure have been described and illustrated in detail, various modifications and changes may be made. While preferred embodiments are described above, some of the features described above can be replaced or even omitted. Still further alternatives and modifications may occur to those skilled in the art. All such alternatives and modifications are believed to be within the scope of the disclosure.

The invention claimed is:

1. A return roller assembly for use with a conveyor system, comprising:
a shaft defining an axis and having a first shaft end and a second shaft end;
a bearing member rotatably mounted on the shaft, and having a central bearing member portion upon which is mounted a roller wheel for rotatably supporting a lower return portion of a conveyor belt, a first lateral bearing member portion extending axially from the central bearing member portion towards the first shaft end, and a second lateral bearing member portion extending axially from the central bearing member portion towards the second shaft end;
a first bearing member sleeve structure extending from the bearing member towards the first shaft end, wherein the first bearing member sleeve structure is sealingly mounted to the first lateral bearing member portion, wherein the first sleeve has a shaft engagement surface that is rotatably engaged with the shaft;
a second bearing member sleeve structure extending from the bearing member towards the second shaft end, wherein the second bearing member sleeve structure is sealingly mounted to the second lateral bearing member portion; and
a first shaft sleeve structure fixedly and sealingly mounted to the shaft laterally outboard towards the first shaft end relative to the shaft engagement surface of the first bearing member sleeve structure,
wherein the first bearing member sleeve structure has a first rotation interface sealing surface and the first shaft sleeve structure has a second rotation interface sealing surface, wherein the first and second rotation interface sealing surfaces extend radially and circumferentially and engage one another to seal against migration of contaminants therebetween,
wherein the shaft sleeve structure urges the first and second rotation interface sealing surfaces into engagement with one another.

2. A return roller assembly as claimed in claim 1, wherein the first bearing member sleeve structure is mounted to the first lateral bearing member portion with a first bearing member sleeve structure sealing member therebetween so as to provide sealing engagement therebetween,
and wherein the first shaft sleeve structure is sealingly mounted to the shaft with a first shaft sleeve structure sealing member therebetween so as to provide sealing engagement therebetween.

3. A return roller assembly as claimed in claim 1, wherein the first shaft sleeve structure is fixedly mounted to the shaft via a first shaft sleeve mounting pin that passes through the first shaft sleeve and the shaft.

4. A return roller assembly as claimed in claim 1, wherein the bearing member and the roller wheel are a first bearing member and a first roller wheel respectively, and wherein the return roller assembly further comprises a second bearing member rotatably mounted on the shaft, closer to the second shaft end than is the first bearing member, and having a central bearing member portion upon which is mounted a second roller wheel for rotatably supporting the conveyor belt, a first lateral bearing member portion extending axially from the central bearing member portion towards the second shaft end, and a second lateral bearing member portion extending axially from the central bearing member portion towards the first shaft end,
wherein the return roller assembly further comprises a first bearing member sleeve structure for the second bearing member, extending from the second bearing member towards the second end, and sealingly mounted to the first lateral bearing member portion of the second bearing member, and having a shaft engagement surface that is rotatably engaged with the shaft,
and wherein the return roller assembly further comprises a second bearing member sleeve structure for the second bearing member, extending from the second bearing member towards the first shaft end, wherein the second bearing member sleeve structure for the second bearing member is sealingly mounted to the second lateral bearing member portion of the second bearing member,
and wherein the return roller assembly further comprises a second shaft sleeve structure fixedly and sealingly mounted to the shaft laterally outboard towards the second shaft end relative to the shaft engagement surface of the first bearing member sleeve structure of the second bearing member,
wherein the first bearing member sleeve structure for the second bearing member has a first rotation interface sealing surface and the second shaft sleeve structure has a second rotation interface sealing surface, wherein the first and second rotation interface sealing surfaces on the first bearing member sleeve structure for the second bearing member and the second shaft sleeve structure extend radially and circumferentially and engage one another to seal against migration of contaminants therebetween,
wherein the second shaft sleeve structure urges the first and second rotation interface sealing surfaces into engagement with one another.

5. A return roller assembly as claimed in claim 1, wherein the first bearing member sleeve structure includes a laterally outer portion and a laterally inner portion, wherein the laterally outer portion has a greater inner diameter than does the laterally inner portion and overlaps axially with the first shaft sleeve structure and is spaced radially from the first shaft sleeve structure.

6. A return roller kit for use with a conveyor system, comprising:
a return roller assembly having a rotation axis about which rotates at least one roller wheel for supporting a conveyor belt along a return path, the return roller assembly having a first orientation retention projection extending from an axle of the return roller assembly towards a first end thereof; and
a return roller assembly support having a rest surface upon which the return roller assembly is configured to rest when deployed, the rest surface having a first aperture configured to receive the first orientation retention projection and inhibit rotation of the axle about the rotation axis.

7. A return roller kit as claimed in claim 6, wherein the first orientation retention projection extends orthogonal to the rotation axis.

8. A return roller kit as claimed in claim 6, wherein the return roller assembly has a second orientation retention projection extending from the axle towards a second end thereof that is distal from the first end.

* * * * *